US012516596B2

(12) United States Patent
Benson et al.

(10) Patent No.: US 12,516,596 B2
(45) Date of Patent: Jan. 6, 2026

(54) APPARATUS AND METHODS FOR AUTOMATED SLIDE DRILLING

(71) Applicant: MOTIVE DRILLING TECHNOLOGIES, INC., Dallas, TX (US)

(72) Inventors: Todd W. Benson, Dallas, TX (US); Teddy Chen, Austin, TX (US); Joshua Miles Brinkley, Grand Prairie, TX (US); John Jeremy Cantwell, Fredericksburg, TX (US); Eric Alan Nolte, Denton, TX (US); Robert Tyler Quarles, Dallas, TX (US); Sashmit Bhaduri, Austin, TX (US); Zarko Bizaca, Austin, TX (US); Kevin Mims, Dallas, TX (US); Brian Stokeld, Dallas, TX (US)

(73) Assignee: MOTIVE DRILLING TECHNOLOGIES, INC., Dallas, TX (US)

( * ) Notice: Subject to any disclaimer, the term of this patent is extended or adjusted under 35 U.S.C. 154(b) by 0 days.

(21) Appl. No.: 18/763,070

(22) Filed: Jul. 3, 2024

(65) Prior Publication Data

US 2024/0401463 A1 Dec. 5, 2024

Related U.S. Application Data

(63) Continuation of application No. 18/299,625, filed on Apr. 12, 2023, now Pat. No. 12,065,924, which is a (Continued)

(51) Int. Cl.

*E21B 44/04* (2006.01)
*E21B 3/02* (2006.01)

(Continued)

(52) U.S. Cl.

CPC .............. *E21B 44/04* (2013.01); *E21B 44/02* (2013.01); *E21B 3/022* (2020.05); *E21B 7/06* (2013.01);

(Continued)

(58) Field of Classification Search

CPC . E21B 44/02; E21B 44/04; E21B 7/04; E21B 7/046; E21B 7/06; E21B 7/067; E21B 7/068; E21B 45/00

See application file for complete search history.

(56) References Cited

U.S. PATENT DOCUMENTS

| | | | |
|---|---|---|---|
| 1,011,985 | A | 12/1911 | Mickelsen |
| 1,013,871 | A | 1/1912 | Ellis et al. |

(Continued)

FOREIGN PATENT DOCUMENTS

| | | | |
|---|---|---|---|
| EP | 1335108 | A2 | 8/2003 |
| GB | 2236782 | A | 4/1991 |

(Continued)

OTHER PUBLICATIONS

"Dictionary, Encyclopedia and Thesaurus—The Free Dictionary", Available Online At: https://www.thefreedictionary.com/, Accessed from Internet on Oct. 1, 2020, pp. 1-6.

(Continued)

*Primary Examiner* — Kristyn A Hall

(74) *Attorney, Agent, or Firm* — Kilpatrick Townsend & Stockton LLP

(57) ABSTRACT

A system and method for drilling are provided. The method may comprise receiving well plan and BHA information; determining the BHA is approaching a first zone in which a first slide drilling operation is to occur; and receiving first zone characteristics. The method may further comprise determining an on bottom time to orient the BHA in the first zone; determining an additional time for the first slide (Continued)

drilling operation; and determining an off bottom time to orient the BHA prior to reaching the first zone. The method may further comprise comparing the additional time for the first slide drilling operation in the first zone to the off bottom time to orient the BHA prior to reaching the first zone, and sending one or more control signals to orient the BHA either prior to reaching or at the first zone based at least in part on the comparison.

20 Claims, 39 Drawing Sheets

Related U.S. Application Data continuation of application No. 17/171,936, filed on Feb. 9, 2021, now Pat. No. 11,661,836, which is a continuation of application No. 16/774,528, filed on Jan. 28, 2020, now Pat. No. 10,954,773, which is a continuation of application No. 16/132,256, filed on Sep. 14, 2018, now Pat. No. 10,533,409, which is a continuation of application No. 16/101,161, filed on Aug. 10, 2018, now Pat. No. 10,584,574.

(60) Provisional application No. 62/676,758, filed on May 25, 2018, provisional application No. 62/543,880, filed on Aug. 10, 2017.

(51) Int. Cl.

*E21B 7/06* (2006.01)
*E21B 19/00* (2006.01)
*E21B 21/08* (2006.01)
*E21B 44/02* (2006.01)
*E21B 45/00* (2006.01)
*E21B 49/00* (2006.01)

(52) U.S. Cl.

CPC ............ *E21B 19/008* (2013.01); *E21B 21/08* (2013.01); *E21B 45/00* (2013.01); *E21B 49/003* (2013.01); *G01V 2200/16* (2013.01)

(56) References Cited

U.S. PATENT DOCUMENTS 2,742,265 A 4/1956 Snyder
4,676,310 A 6/1987 Scherbatskoy et al.
4,794,534 A 12/1988 Millheim
5,193,628 A 3/1993 Hill, III et al.
5,220,963 A 6/1993 Patton
5,812,068 A 9/1998 Wisler et al.
5,857,531 A 1/1999 Estep et al.
6,088,294 A 7/2000 Leggett, III et al.
6,233,524 B1 5/2001 Harrell et al.
6,257,356 B1 7/2001 Wassell
6,272,434 B1 8/2001 Wisler et al.
6,279,702 B1 8/2001 Koh
6,408,953 B1 6/2002 Goldman et al.
6,424,919 B1 7/2002 Moran et al.
6,470,977 B1 10/2002 Chen et al.
6,523,623 B1 2/2003 Schuh
6,577,954 B2 6/2003 Alft et al.
6,581,699 B1 6/2003 Chen et al.
6,601,658 B1 8/2003 Downton
6,612,382 B2 9/2003 King
6,732,052 B2 5/2004 Macdonald et al.
6,868,920 B2 3/2005 Hoteit et al.
6,968,909 B2 11/2005 Aldred et al.
7,000,710 B1 2/2006 Umbach
7,003,439 B2 2/2006 Aldred et al.
7,011,156 B2 3/2006 von Gynz-Rekowski
7,032,689 B2 4/2006 Goldman et al.
7,054,750 B2 5/2006 Rodney et al.
7,073,582 B2 7/2006 Connell et al.
7,085,696 B2 8/2006 King
7,136,795 B2 11/2006 Downton
7,142,986 B2 11/2006 Moran
7,191,850 B2 3/2007 Williams
7,342,504 B2 3/2008 Crane et al.
7,357,196 B2 4/2008 Goldman et al.
7,359,844 B2 4/2008 Sung et al.
7,460,957 B2 12/2008 Prange et al.
7,546,209 B2 6/2009 Williams
7,606,666 B2 10/2009 Repin et al.
7,650,241 B2 1/2010 Jogi et al.
7,653,563 B2 1/2010 Veeningen et al.
7,684,929 B2 3/2010 Prange et al.
7,725,263 B2 5/2010 Sugiura
7,802,634 B2 9/2010 Boone
7,823,655 B2 11/2010 Boone et al.
7,860,593 B2 12/2010 Boone
7,861,800 B2 1/2011 Chapman et al.
7,873,476 B2 1/2011 Thorne
7,938,197 B2 5/2011 Boone et al.
7,945,488 B2 5/2011 Karr et al.
7,957,946 B2 6/2011 Pirovolou
8,010,290 B2 8/2011 Illfelder
8,061,440 B2 11/2011 Chapman et al.
8,274,399 B2 9/2012 Strachan et al.
8,278,931 B2 10/2012 Fang et al.
8,360,171 B2 1/2013 Boone et al.
8,463,549 B1 6/2013 Selman et al.
8,463,550 B1 6/2013 Selman et al.
8,489,375 B2 7/2013 Omeragic et al.
8,510,081 B2 8/2013 Boone et al.
8,528,663 B2 9/2013 Boone
8,577,660 B2 11/2013 Wendt et al.
8,614,713 B1 12/2013 Selman et al.
8,615,363 B2 12/2013 Aamodt et al.
8,686,996 B2 4/2014 Cheung et al.
8,768,627 B2 7/2014 Paulk
8,818,779 B2 8/2014 Sadlier et al.
8,875,806 B2 11/2014 Williams
8,939,233 B2 1/2015 Edbury et al.
8,960,326 B2 2/2015 Williams
8,965,703 B2 2/2015 Prakash et al.
9,022,140 B2 5/2015 Marx et al.
9,041,547 B2 5/2015 Hartmann
9,091,140 B1 7/2015 Selman et al.
9,097,096 B1 8/2015 Selman et al.
9,103,192 B2 8/2015 Yang
9,182,517 B1 11/2015 Selman et al.
9,223,041 B2 12/2015 Wendt et al.
9,238,960 B2 1/2016 Benson et al.
9,322,261 B2 4/2016 Selman et al.
9,334,723 B2 5/2016 Yang
9,349,212 B2 5/2016 Cheung et al.
9,528,366 B2 12/2016 Selman et al.
9,528,367 B2 12/2016 Selman et al.
9,528,372 B2 12/2016 Selman et al.
9,549,854 B1 1/2017 Crespo
9,556,728 B2 1/2017 de Reynal, Jr.
9,598,949 B1 3/2017 Selman et al.
9,599,742 B1 3/2017 Selman et al.
9,702,240 B2 7/2017 Bittar et al.
9,720,131 B2 8/2017 Zhuo et al.
10,036,678 B2 7/2018 Fisher, Jr. et al.
10,119,385 B2 11/2018 Williams
10,138,721 B2 11/2018 Veltman
10,151,192 B2 12/2018 Burress et al.
10,215,010 B1 2/2019 Hadi et al.
10,533,409 B2 1/2020 Benson et al.
10,584,574 B2 3/2020 Benson et al.
10,672,154 B2 6/2020 Gillen et al.
10,830,033 B2 11/2020 Weideman et al.
10,954,773 B2 3/2021 Benson et al.
11,414,978 B2 8/2022 Weideman et al.
11,661,836 B2 5/2023 Benson et al.
11,795,806 B2 10/2023 Weideman et al.
11,885,212 B2 1/2024 Jamieson et al.
12,065,924 B2 8/2024 Benson et al.
2001/0042642 A1 11/2001 King

(56) References Cited

U.S. PATENT DOCUMENTS

| | | | |
|---|---|---|---|
| 2001/0054514 A1 | 12/2001 | Sullivan et al. |
| 2002/0070050 A1 | 6/2002 | Wassell |
| 2002/0103630 A1 | 8/2002 | Aldred et al. |
| 2002/0139581 A1 | 10/2002 | Schultz et al. |
| 2003/0024738 A1 | 2/2003 | Schuh |
| 2004/0168811 A1 | 9/2004 | Shaw et al. |
| 2004/0222023 A1 | 11/2004 | Haci et al. |
| 2005/0006145 A1 | 1/2005 | Downton |
| 2005/0150689 A1 | 7/2005 | Jogi et al. |
| 2005/0194130 A1 | 9/2005 | Best et al. |
| 2005/0194185 A1 | 9/2005 | Gleitman |
| 2005/0269082 A1 | 12/2005 | Baron et al. |
| 2006/0074561 A1 | 4/2006 | Xia et al. |
| 2006/0151214 A1 | 7/2006 | Prange et al. |
| 2006/0247903 A1 | 11/2006 | Schottle et al. |
| 2007/0163810 A1 | 7/2007 | Underwood et al. |
| 2007/0221375 A1 | 9/2007 | Baron et al. |
| 2008/0135290 A1 | 6/2008 | Hopwood et al. |
| 2008/0172272 A1 | 7/2008 | Back et al. |
| 2008/0230272 A1 | 9/2008 | Chen et al. |
| 2008/0271925 A1 | 11/2008 | Misselbrook et al. |
| 2009/0000823 A1 | 1/2009 | Pirovolou |
| 2009/0009055 A1 | 1/2009 | Han et al. |
| 2009/0076873 A1 | 3/2009 | Johnson et al. |
| 2009/0090555 A1 | 4/2009 | Boone et al. |
| 2009/0120690 A1 | 5/2009 | Phillips |
| 2010/0139977 A1 | 6/2010 | Watkins et al. |
| 2010/0175922 A1 | 7/2010 | Ignova et al. |
| 2010/0185395 A1 | 7/2010 | Pirovolou et al. |
| 2010/0191516 A1 | 7/2010 | Benish et al. |
| 2010/0252327 A1 | 10/2010 | Beuershausen et al. |
| 2010/0259415 A1 | 10/2010 | Strachan et al. |
| 2011/0024191 A1 | 2/2011 | Boone |
| 2011/0067928 A1 | 3/2011 | Hulden et al. |
| 2011/0153300 A1 | 6/2011 | Holl et al. |
| 2011/0186353 A1 | 8/2011 | Turner et al. |
| 2011/0213601 A1 | 9/2011 | Pirovolou |
| 2012/0024606 A1 | 2/2012 | Pirovolou et al. |
| 2012/0027516 A1 | 2/2012 | Day et al. |
| 2012/0048621 A1 | 3/2012 | Stewart et al. |
| 2012/0285701 A1 | 11/2012 | Cheng et al. |
| 2013/0032401 A1 | 2/2013 | Edbury et al. |
| 2013/0032402 A1 | 2/2013 | Byreddy et al. |
| 2013/0092441 A1 | 4/2013 | Hummes et al. |
| 2013/0112484 A1 | 5/2013 | Chen |
| 2013/0126239 A1 | 5/2013 | Panchal et al. |
| 2013/0140037 A1 | 6/2013 | Sequeira, Jr. et al. |
| 2013/0161096 A1 | 6/2013 | Benson et al. |
| 2013/0238306 A1 | 9/2013 | Lagenwalter et al. |
| 2013/0262048 A1 | 10/2013 | Tang et al. |
| 2013/0340999 A1 | 12/2013 | Benson |
| 2014/0116776 A1 | 5/2014 | Marx et al. |
| 2014/0291023 A1 | 10/2014 | Edbury et al. |
| 2015/0107899 A1 | 4/2015 | Fisher, Jr. et al. |
| 2015/0218914 A1 | 8/2015 | Marx et al. |
| 2015/0267525 A1 | 9/2015 | May et al. |
| 2016/0076357 A1 | 3/2016 | Hbaieb |
| 2016/0237802 A1 | 8/2016 | Boone et al. |
| 2016/0341027 A1 | 11/2016 | Kyllingstad |
| 2016/0370480 A1 | 12/2016 | Shetty et al. |
| 2017/0037722 A1 | 2/2017 | Jeffryes et al. |
| 2017/0152739 A1 | 6/2017 | Benson et al. |
| 2017/0183952 A1 | 6/2017 | Williams |
| 2018/0003839 A1 | 1/2018 | Lowell et al. |
| 2018/0068037 A1 | 3/2018 | Williams |
| 2018/0073351 A9 | 3/2018 | Benson et al. |
| 2018/0135402 A1 | 5/2018 | Jeffryes et al. |
| 2018/0171773 A1 | 6/2018 | Nessjoen et al. |
| 2018/0179823 A1 | 6/2018 | Spatz et al. |
| 2018/0179831 A1 | 6/2018 | Spatz et al. |
| 2018/0258750 A1 | 9/2018 | Hadi et al. |
| 2018/0283156 A1 | 10/2018 | Viens |
| 2018/0283157 A1 | 10/2018 | Hadi et al. |
| 2018/0340406 A1 | 11/2018 | Wagner et al. |
| 2018/0340407 A1 | 11/2018 | Wagner et al. |
| 2018/0343040 A1 | 11/2018 | Luzinski et al. |
| 2018/0371889 A1 | 12/2018 | Hohl et al. |
| 2019/0032466 A1 | 1/2019 | Wilson et al. |
| 2019/0048706 A1 | 2/2019 | Benson et al. |
| 2019/0048707 A1 | 2/2019 | Benson et al. |
| 2020/0284135 A1 | 9/2020 | Benson et al. |
| 2020/0362687 A1 | 11/2020 | Hopwood et al. |

FOREIGN PATENT DOCUMENTS

| | | |
|---|---|---|
| WO | 2009039448 A2 | 3/2009 |
| WO | 2010039317 A1 | 4/2010 |
| WO | 2016102381 A1 | 6/2016 |
| WO | 2016196853 A1 | 12/2016 |
| WO | 2018144169 A1 | 8/2018 |
| WO | 2018152636 A1 | 8/2018 |

OTHER PUBLICATIONS

"The Oilfield Glossary—Schlumberger Oilfield Glossary", Available Online At: https://www.glossary.oilfield.slb.com/, Accessed from Internet on Oct. 1, 2020, 1 page.
U.S. Appl. No. 16/101,161, "Non-Final Office Action", filed Mar. 5, 2019, 19 pages.
U.S. Appl. No. 16/101,161, "Notice of Allowance", filed Oct. 10, 2019, 7 pages.
U.S. Appl. No. 16/132,256, "Final Office Action", filed Jul. 11, 2019, 18 pages.
U.S. Appl. No. 16/132,256, "Non-Final Office Action", filed Dec. 31, 2018, 14 pages.
U.S. Appl. No. 16/132,256, "Notice of Allowance", filed Aug. 26, 2019, 6 pages.
U.S. Appl. No. 16/591,387, "Notice of Allowance", filed Jul. 1, 2020, 8 pages.
U.S. Appl. No. 16/774,528, "Non-Final Office Action", filed Jun. 25, 2020, 11 pages.
U.S. Appl. No. 16/774,528, "Notice of Allowance", filed Nov. 12, 2020, 5 pages.
U.S. Appl. No. 16/774,528, "Notice of Allowance", filed Oct. 5, 2020, 5 pages.
U.S. Appl. No. 17/062,175, "Non-Final Office Action", filed Dec. 24, 2021, 9 pages.
U.S. Appl. No. 17/062,175, "Notice of Allowance", filed Apr. 8, 2022, 5 pages.
U.S. Appl. No. 17/062,175, "Supplemental Notice of Allowability", filed Jun. 2, 2022, 2 pages.
U.S. Appl. No. 17/062,175, "Supplemental Notice of Allowability", filed May 25, 2022, 4 pages.
U.S. Appl. No. 17/171,936, "Non-Final Office Action", filed Jun. 22, 2022, 10 pages.
U.S. Appl. No. 17/171,936, "Notice of Allowance", filed Jan. 9, 2023, 5 pages.
U.S. Appl. No. 17/377,380, "Non-Final Office Action", filed Mar. 15, 2023, 6 pages.
U.S. Appl. No. 17/377,380, "Notice of Allowance", filed Jul. 5, 2023, 5 pages.
U.S. Appl. No. 17/377,380, "Notice of Allowance", filed Sep. 19, 2023, 5 pages.
U.S. Appl. No. 17/812,850, "Non-Final Office Action", filed Dec. 21, 2022, 7 pages.
U.S. Appl. No. 17/812,850, "Notice of Allowance", filed Jun. 14, 2023, 5 pages.
U.S. Appl. No. 18/299,625, "Non-Final Office Action", filed Dec. 14, 2023, 9 pages.
U.S. Appl. No. 18/299,625, "Notice of Allowance", filed Apr. 9, 2024, 5 pages.
U.S. Appl. No. 18/393,215, "Non-Final Office Action", filed Dec. 16, 2024, 10 pages.
U.S. Appl. No. 18/465,864, "Non-Final Office Action", filed Apr. 24, 2024, 13 pages.
U.S. Appl. No. 18/465,864, "Non-Final Office Action", filed Apr. 26, 2024, 13 pages.

(56) References Cited

OTHER PUBLICATIONS

U.S. Appl. No. 18/465,864, "Notice of Allowance", filed Sep. 11, 2024, 6 pages.
AU2018313280, "First Examination Report", Feb. 7, 2023, 5 pages.
AU2018313280, "Notice of Acceptance", Sep. 4, 2023, 3 pages.
AU2023216865, "First Examination Report", Nov. 28, 2023, 3 pages.
AU2023216865, "Notice of Acceptance", Feb. 6, 2024, 3 pages.
AU2023216866, "First Examination Report", Nov. 29, 2023, 3 pages.
AU2023216866, "Notice of Acceptance", Feb. 6, 2024, 3 pages.
CA3071027, "Office Action", Feb. 20, 2024, 4 pages.
EP18844984.7, "Extended European Search Report", Apr. 15, 2021, 10 pages.
EP18844984.7, "Office Action", Mar. 7, 2022, 6 pages.
Pastusek et al, "A Fundamental Model for Prediction of Hole Curvature and Build Rates with Steerable Bollomhole Assemblies", Society of Petroleum Engineers Annual Technical Conference and Exhibition, Oct. 2005, pp. 1-7.
PCT/US2013/047054, "International Preliminary Report on Patentability", Dec. 31, 2014, 10 pages.
PCT/US2013/047054, "International Search Report and Written Opinion", Jun. 25, 2014, 12 pages.
PCT/US2021/041906, "International Preliminary Report on Patentability", Jan. 25, 2024, 12 pages.
PCT/US2021/041906, "International Search Report and Written Opinion", Oct. 27, 2021, 13 pages.
Saputelli et al., "Real-Time Decision-Making for Value Creation While Drilling", Society of Petroleum Engineers/International Association of Drilling Contractors Middle East Drilling Technology Conference and Exhibition, Oct. 20, 2003, pp. 1-19.

USER INTERFACE FOR AUTOMATED SLIDE DRILLING

APPARATUS AND METHODS FOR AUTOMATED SLIDE DRILLING

CROSS-REFERENCES TO RELATED APPLICATIONS

This application is a continuation and claims benefit of priority of U.S. patent application Ser. No. 18/299,625, filed on Apr. 12, 2023, which is a continuation and claims benefit of priority of U.S. patent application Ser. No. 17/171,936, filed on Feb. 9, 2021, now U.S. Pat. No. 11,661,836, issued on May 30, 2023, which is a continuation and claims benefit of priority of U.S. patent application Ser. No. 16/774,528, filed Jan. 28, 2020, now U.S. Pat. No. 10,954,773, issued on Mar. 23, 2021, which is a continuation and claims benefit of priority of U.S. patent application Ser. No. 16/132,256, filed on Sep. 14, 2018, now U.S. Pat. No. 10,533,409, issued on Jan. 14, 2020, which is a continuation and claims benefit of priority of U.S. patent application Ser. No. 16/101,161, filed on Aug. 10, 2018, now U.S. Pat. No. 10,584,574, issued on Mar. 10, 2020, which claims priority to and the benefit of U.S. Provisional Patent Application No. 62/676,758, filed on May 25, 2018, and U.S. Provisional Patent Application No. 62/543,880, filed on Aug. 10, 2017. Each of these applications is hereby incorporated by reference herein in its entirety.

TECHNICAL FIELD

This application is directed to methods and systems for the creation of wells, such as oil or gas wells, and more particularly to the planning and drilling of such wells, such as using an apparatus and methods for automated slide drilling.

BACKGROUND

Drilling a borehole for the extraction of minerals has become an increasingly complicated operation due to the increased depth and complexity of many boreholes, including the complexity added by directional drilling. Drilling is an expensive operation and errors in drilling add to the cost and, in some cases, drilling errors may permanently lower the output of a well for years into the future. Conventional technologies and methods may not adequately address the complicated nature of drilling, and may not be capable of gathering and processing various information from downhole sensors and surface control systems in a timely manner, in order to improve drilling operations and minimize drilling errors.

SUMMARY

In one aspect, a drilling rig system for automated slide drilling is disclosed. The drilling rig system may further include a drilling rig having at least one control system, a drill string coupled to the drilling rig, a drill bit coupled to a first end of the drill string, and a computer system in communication with and operable to control the at least one control system of the drilling rig. In the drilling rig system, the computer system may further include a processor, a memory, and instructions stored in the memory that are capable of execution by the processor. In the drilling rig system, the computer system may be adapted to receive at least one input during operation of the drilling rig, while the instructions may be adapted to perform the following operations: (i) determine that the drilling rig is to enter a slide drilling mode to perform a slide drilling operation in connection with drilling a wellbore, (ii) begin the slide drilling operation either from a rotary drilling mode or after a connection of a pipe or pipe stand to the drill string has been made, (iii) establish a torque value in the drill string, (iv) engage a bottom of the wellbore with the drill bit, (v) determine a target tool face for the slide drilling operation, (vi) maintain the target tool face within predetermined limits during the slide drilling operation, (vii) control the slide drilling mode until the computer system determines that the slide drilling operation is complete, (viii) resume rotary drilling mode or prepare for a survey at an upcoming end of a current drill pipe stand, and (ix) set at least one parameter associated with at least one of: an equipment parameter, a drilling parameter, and a formation parameter.

In any of the disclosed implementations of the drilling rig system, the computer system may be adapted to perform any one or more of the operations (i)-(ix) after first obtaining a user input to proceed.

In any of the disclosed implementations of the drilling rig system, the computer system may be adapted to perform any one or more of the operations (i)-(ix) after first providing a display of the operation or operations to be performed.

In any of the disclosed implementations of the drilling rig system, the at least one input may include at least one of: input from a surface sensor, input from a downhole sensor, and a user input.

In any of the disclosed implementations of the drilling rig system, the user input may be associated with at least one of: the equipment parameter, the drilling parameter, and the formation parameter.

In any of the disclosed implementations of the drilling rig system, the at least one equipment parameter may include information relating to at least one of: a type of drill bit, and a type of bottom hole assembly (BHA).

In any of the disclosed implementations of the drilling rig system, the at least one drilling parameter may include at least one of: weight on bit, rate of penetration, motor torque, motor speed, mechanical specific energy, and pressure differential.

In any of the disclosed implementations of the drilling rig system, the at least one formation parameter may include at least one of: a formation hardness, a formation structure, inclination, a current wellbore zone, a measured depth, a vertical section, and a formation identity.

In any of the disclosed implementations of the drilling rig system, the instructions adapted to perform (iii) may further include instructions for determining the torque value for the drill string for the slide drilling operation, and outputting a first control signal to the at least one control system to establish the torque value.

In any of the disclosed implementations of the drilling rig system, the instructions adapted to perform (v) may further include instructions for determining a target tool face for the slide drilling operation, and outputting a second control signal to the at least one control system to establish the target tool face.

In another aspect, an automated slide drilling system for drilling a well borehole is disclosed. The automated slide drilling system may include at least one processor, and at least one memory coupled to the at least one processor and storing instructions executable by the at least one processor. In the automated slide drilling system, the instructions may include instructions for receiving information from a measurement-while-drilling (MWD) system, at least one sensor, and at least one rig control system during drilling of a well borehole by a drilling rig. In the automated slide drilling system, the drilling rig may further include a drill string having a BHA attached thereto at one end thereof. In the automated slide drilling system, the instructions may further include instructions for determining, responsive to the information received, whether a slide is to be performed and, when the slide is to be performed, determining a length and a direction of the slide, determining a current tool face, determining when a tool face adjustment is indicated for the slide and, when the tool face adjustment is indicated, determining an amount of the tool face adjustment, and sending a first control signal to the at least one drilling rig control system to adjust the tool face by the amount of the tool face adjustment. In the automated slide drilling system, the instructions may further include instructions for determining if oscillation of the drill string will assist the slide and, when the oscillation will assist the slide, identifying a magnitude and a frequency of the oscillation, and sending a second control signal to the at least one drilling rig control system to implement the magnitude and the frequency of the oscillation. In the automated slide drilling system, the instructions may further include instructions for sending a third control signal to the at least one drilling rig control system to rotate the drill bit, maintaining the tool face within a target range during the slide, and determining if the slide is complete and, when the slide is complete, sending a fourth control signal to the at least one drilling rig control system to stop the slide.

In any of the disclosed implementations, the automated slide drilling system may further include instructions for establishing a desired torque in the drill string.

In any of the disclosed implementations, the automated slide drilling system may further include comprising instructions for engaging a bottom of the well borehole with the drill bit.

In any of the disclosed implementations, the automated slide drilling system may further include instructions for resuming rotary drilling after the slide is complete.

In any of the disclosed implementations, the automated slide drilling system may further include instructions for returning control of drilling to another drilling control system or to an operator after the slide is complete.

In any of the disclosed implementations, the automated slide drilling system may further include instructions for displaying a status of the slide during the slide.

In any of the disclosed implementations, the automated slide drilling system may further include instructions for receiving updated information from the MWD system, the at least one sensor, and the at least one rig control systems during the slide, and determining whether at least one drilling parameter should be adjusted for the slide, and, when the at least one drilling parameter is to be adjusted, sending a fifth control signal to adjust the one or more drilling parameters.

In any of the disclosed implementations, the automated slide drilling system may further include instructions for receiving updated information from the MWD system, the at least one sensor, and the at least one rig control system during the slide, and, responsive to at least some of the updated information, displaying an updated status of the slide during the slide.

In any of the disclosed implementations the automated slide drilling system, the at least one sensor may include at least one of: a downhole sensor and a surface sensor.

In any of the disclosed implementations the automated slide drilling system, the instructions may further include instructions for providing a graphical user interface further including at least one of: a plot of current toolface versus a target toolface, a plot of toolface limits, and an indication of a confidence level of at least one toolface reading.

In any of the disclosed implementations the automated slide drilling system, the instructions may further include instructions for obtaining a confidence level from a decoder receiving information from a BHA.

In any of the disclosed implementations the automated slide drilling system, the instructions may further include instructions for comparing a current toolface reading with a previous toolface reading and, based on a difference between the current toolface reading and the previous toolface reading, and the confidence level, determining whether to take an action to correct the toolface.

In another aspect of the disclosure, a computer software program may be provided, wherein the computer software program may comprise instructions in source code or in executable or interpretable form (or a combination of forms) for performing the steps described above with respect to the automated slide drilling system, and may exist as one or more files that may be stored on any type of computer readable media, including a CD, a DVD, a jump or pen drive, a USB drive, in volatile or non-volatile memory, or may be embedded in whole or in part on a semiconductor device.

In still a further aspect, a first method for drilling a well borehole is disclosed. The first method may include determining, by an automated slide drilling system, that a drilling rig should begin slide drilling. In the first method, the slide drilling may be controlled by the automated slide drilling system in communication with at least one control system of the drilling rig. The first method may further include determining, by the automated slide drilling system, whether an operator has indicated that the slide drilling is to be performed without further user input. When the slide drilling is to be performed without further user input, the first method may include determining, by the automated slide drilling system, whether at least one risk mitigation action is indicated. When at least one risk mitigation action is indicated, the first method may include identifying and performing the at least one risk mitigation action. The first method may also include determining, by the automated slide drilling system, a torque in the drill string, setting, by the automated slide drilling system, at least one drilling rig parameter to establish the torque in the drill string, controlling, by the automated slide drilling system, engagement of a drill bit with a bottom of the well borehole, including zeroing the weight on bit (WOB) and differential pressure (DP) values, determining, by the automated slide drilling system, a target range for a tool face orientation for the slide drilling, controlling, by the automated slide drilling system, an orientation of the drill bit within the target range for the tool face orientation, including sending a first control signal to the at least one control system to achieve the tool face orientation within the target range, controlling, by the automated slide drilling system, at least one rig operating parameter during the slide drilling, and determining, by the automated slide drilling system, whether the slide drilling has been completed. When the slide drilling has been completed, the first method may include ceasing the slide drilling by the automated slide drilling system and returning control of the drilling rig to the operator or another control system. When the slide drilling has not been completed, the first method may then include continuing the controlling, by the automated slide drilling system, of the at least one operating parameter until the slide drilling has been completed.

In any of the disclosed implementations, the first method may further include receiving, by the automated slide drilling system, input information from at least one surface sensor or at least one downhole sensor during the slide drilling.

In any of the disclosed implementations, the first method may further include querying, by the automated slide drilling system, updated data during the slide drilling from at least one of: a bit guidance system, a measurement-while-drilling directional system, and the at least one rig control systems.

In any of the disclosed implementations, the first method may further include determining, by the automated slide drilling system, if oscillation of the drill pipe is expected to improve the slide drilling. When oscillation of the drill pipe is expected to improve the slide drilling, the first method may include determining, by the automated slide drilling system, a magnitude, and a frequency of oscillation of the drill pipe, and sending, by the automated slide drilling system without further user input, a second control signal to the at least one rig control system to set the magnitude and the frequency during the slide drilling.

In any of the disclosed implementations, the first method may further include stopping, by the automated slide drilling system, the slide drilling when user input corresponding to a stop command is received.

In any of the disclosed implementations, the first method may further include stopping, by the automated slide drilling system, the slide drilling when input information is not received within a predetermined period.

In any of the disclosed implementations of the first method, the risk mitigation action may further include waiting for an indication from an operator that the slide drilling is to proceed before allowing the slide drilling to be performed.

In any of the disclosed implementations of the first method, the at least one control system may further include a first control system for a top drive of the drilling rig, and a second control system for a draw works of the drilling rig. In the first method, the risk mitigation action may further include using the automated slide drilling system to communicate with the first control system and the second control system to control the top drive and the draw works, respectively, during the slide drilling.

In yet another aspect, a second method for maintaining tool face orientation during drilling is disclosed. The second method may include, determining, by a computer system, whether to modify a rate of penetration (ROP) of a drill bit in a borehole. Responsive to the determining, the second method may include sending, by a computer system, a first signal to at least one control system coupled to a drilling rig to modify at least one of a weight on bit (WOB) and a differential pressure (DP) of a drilling fluid in the borehole to respectively modify the ROP by an ROP offset determined by the computer system, and sending, by the computer system, a second signal to the at least one control system for adjusting an angular rotation of a top drive of the drilling rig to modify the ROP by the ROP offset, wherein a tool face orientation within a desired range of a target tool face orientation is maintained.

In any of the disclosed implementations of the second method, the second method may be performed by a processor executing computer software instructions, while the instructions may include instructions for maintaining the tool face orientation within the desired range by sending the second signal for adjusting the angular rotation of the top drive by an amount corresponding to the ROP offset.

In any of the disclosed implementations of the second method, the amount of angular rotation may be adjusted after a predetermined time interval after the WOB or DP is modified.

In any of the disclosed implementations of the second method, the predetermined time interval may be determined responsive to the length of a drill string in the borehole.

In yet another aspect, a control system for maintaining tool face orientation during drilling is disclosed. The control system may include a processor, a memory coupled to the processor. In the control system, the memory may store computer software instructions executable by the processor, while the instructions may include instructions for determining, by the control system when coupled to a drilling rig, whether to modify a rate of penetration (ROP) of a drill bit in a borehole drilled by the drilling rig, and, when modifying the ROP is indicated, determining an amount to modify the ROP, determining whether to modify at least one of a weight on bit (WOB) and a differential pressure (DP) of a drilling fluid in the borehole to modify the ROP, determining an amount of angular rotation of a top drive of the drilling rig that corresponds to the ROP when modified, adjusting an angular rotation of the top drive, respectively, corresponding to the ROP when modified, and modifying at least one of the WOB and the DP to achieve the amount to modify the ROP.

In any of the disclosed implementations of the control system, the instructions may further include instructions for maintaining, without further user input, a tool face orientation within a range of a target tool face orientation by adjusting the angular rotation of the top drive by an amount calculated to offset the amount to modify the ROP.

In any of the disclosed implementations of the control system, the instructions for modifying the at least one of the WOB and the DP may further include instructions for modifying at least one of the WOB and the DP after a time interval has elapsed after the angular rotation of the top drive has been adjusted.

In any of the disclosed implementations of the control system, the time interval may be determined responsive to the length of a drill string in the borehole.

In still a further aspect, a third method is disclosed for drilling a well borehole. The third method may include determining, by an automated slide drilling system, that a drilling rig should begin slide drilling, wherein the slide drilling is controlled by the automated slide drilling system in communication with at least one control system of the drilling rig, determining, by the automated slide drilling system, whether an operator has indicated that the slide drilling is to be performed without further user input, determining, by the automated slide drilling system, a torque in the drill string, setting, by the automated slide drilling system, at least one drilling rig parameter to establish the torque in the drill string, controlling, by the automated slide drilling system, engagement of a drill bit with a bottom of the well borehole, determining, by the automated slide drilling system, a target range for a tool face orientation for the slide drilling, controlling, by the automated slide drilling system, an orientation of the drill bit within the target range for the tool face orientation, including sending a first control signal to the at least one control system to achieve the tool face orientation within the target range, controlling, by the automated slide drilling system, at least one rig operating parameter during the slide drilling, and determining, by the automated slide drilling system, whether the slide drilling has been completed. When the slide drilling has been completed, the third method may include ceasing the slide drilling by the automated slide drilling system and returning control of the drilling rig to the operator or another control system. When the slide drilling has not been completed, the third method may then include continuing the controlling, by the automated slide drilling system, of the at least one operating parameter until the slide drilling has been completed.

In any of the disclosed implementations, the third method may further include receiving, by the automated slide drilling system, input information from at least one surface sensor or at least one downhole sensor during the slide drilling.

In any of the disclosed implementations, the third method may further include querying, by the automated slide drilling system, updated data during the slide drilling from at least one of: a bit guidance system, a measurement-while-drilling directional system, and the at least one rig control systems.

In any of the disclosed implementations, the third method may further include determining, by the automated slide drilling system, if oscillation of the drill pipe is expected to improve the slide drilling. When oscillation of the drill pipe is expected to improve the slide drilling, the third method may include determining, by the automated slide drilling system, a magnitude, and a frequency of oscillation of the drill pipe, and sending, by the automated slide drilling system without further user input, a second control signal to the at least one rig control system to set the magnitude and the frequency during the slide drilling.

In any of the disclosed implementations, the third method may further include stopping, by the automated slide drilling system, the slide drilling when user input corresponding to a stop command is received.

In any of the disclosed implementations, the third method may further include stopping, by the automated slide drilling system, the slide drilling when input information is not received within a predetermined period.

In any of the disclosed implementations of the third method, the risk mitigation action may further include waiting for an indication from an operator that the slide drilling is to proceed before allowing the slide drilling to be performed.

In any of the disclosed implementations of the third method, the at least one control system may include a first control system for a top drive of the drilling rig, and a second control system for a draw works of the drilling rig, while the method may further include using the automated slide drilling system to communicate with the first control system and the second control system to control the top drive and the draw works, respectively, during the slide drilling.

In another aspect, a drilling control system is disclosed. The drilling control system may comprise a processor and a memory coupled to the processor. The memory may comprise instructions executable by the processor to receive, during drilling of a wellbore, well plan information for the wellbore and information from a BHA located in the wellbore, where the BHA may comprise a drill bit at one end thereof; and determine that the BHA is approaching a first zone during drilling of the wellbore, where the first zone comprises a wellbore portion in which a first slide drilling operation is to occur. The memory may comprise further instructions to receive first zone characteristics associated with the first zone; determine an on bottom time to orient the BHA to have a desired toolface in the first zone when the drill bit contacts rock at a distal end of the wellbore and responsive to the information from the BHA and the first zone characteristics; determine an additional time for the first slide drilling operation in the first zone responsive to the on bottom time to orient the BHA; and determine an off bottom time to orient the BHA to have a desired toolface prior to reaching the first zone when the drill bit is not in contact with the rock at the distal end of the wellbore and responsive to the well plan information and the information from the BHA. Moreover, the memory may comprise further instructions to compare the additional time for the first slide drilling operation in the first zone to the off bottom time to orient the BHA to have the desired toolface prior to reaching the first zone; and send one or more control signals to orient the BHA to the desired toolface either prior to reaching the first zone or at the first zone based at least in part on the comparison.

In any of the disclosed implementations, the instructions may further be executable by the processor to determine a cost associated with the on bottom time to orient the BHA to have the desired toolface in the first zone; and determine a cost associated with the off bottom time to orient the BHA to have the desired toolface prior to reaching the first zone.

In any of the disclosed implementations, the comparison may further comprise comparing the cost associated with the on bottom time to orient the BHA to have the desired toolface in the first zone to the cost associated with the off bottom time to orient the BHA to have the desired toolface prior to reaching the first zone.

In any of the disclosed implementations, the instructions may further be executable by the processor to determine the BHA is approaching a second zone of a plurality of zones during drilling of the wellbore, where the second zone comprises a second wellbore portion in which a second slide drilling operation is to occur; and receive second zone characteristics associated with the second zone. The instructions may further be executable by the processor to determine the on bottom time to orient the BHA to have the desired toolface in the second zone when the drill bit contacts rock at the distal end of the wellbore and responsive to the information from the BHA and the second zone characteristics; determine an additional time for the second slide drilling operation in the second zone responsive to the on bottom time to orient the BHA; and determine the off bottom time to orient the BHA to have the desired toolface prior to reaching the second zone when the drill bit is not in contact with the rock at the distal end of the wellbore and responsive to the information from the BHA and the first zone characteristics. Moreover, the instructions may further be executable by the processor to compare the additional time for the second slide drilling operation in the second zone to the off bottom time to orient the BHA to have the desired toolface prior to reaching the second zone; and send one or more control signals to orient the BHA to the desired toolface either prior to reaching the second zone or at the second zone based at least in part on the comparison.

In any of the disclosed implementations, the off bottom time to orient the BHA to have the desired toolface prior to reaching the first zone is determined responsive to the additional time for the first slide drilling operation in the first zone exceeding a threshold value.

In any of the disclosed implementations, the instructions may further be executable by the processor to determine a target toolface range for the first slide drilling operation, wherein the one or more control signals are sent responsive to the desired toolface being outside the target toolface range.

In any of the disclosed implementations, the wellbore comprises a plurality of zones, wherein each zone of the plurality of zones corresponds to a different wellbore portion according to the well plan information.

In another aspect, a method for drilling is disclosed. The method may comprise receiving, by a drilling control system during drilling of a wellbore, well plan information for the wellbore and information from a BHA located in the wellbore, where the BHA comprises a drill bit at one end thereof; and determining, by the drilling control system, that the BHA is approaching a first zone during drilling of the wellbore, where the first zone comprises a wellbore portion in which a first slide drilling operation is to occur. The method may further comprise receiving, by the drilling control system, first zone characteristics associated with the first zone; determining, by the drilling control system, an on bottom time to orient the BHA to have a desired toolface in the first zone when the drill bit contacts rock at a distal end of the wellbore and responsive to the information from the BHA and the first zone characteristics; determining, by the drilling control system, an additional time for the first slide drilling operation in the first zone responsive to the on bottom time to orient the BHA; and determining, by the drilling control system, an off bottom time to orient the BHA to have a desired toolface prior to reaching the first zone when the drill bit is not in contact with the rock at the distal end of the wellbore and responsive to the well plan information and the information from the BHA. Moreover, the method may further comprise comparing, by the drilling control system, the additional time for the first slide drilling operation in the first zone to the off bottom time to orient the BHA to have the desired toolface prior to reaching the first zone; and sending, by the drilling control system, one or more control signals to orient the BHA to the desired toolface either prior to reaching the first zone or at the first zone based at least in part on the comparison.

In any of the disclosed implementations, the method may further comprise determining a cost associated with the on bottom time to orient the BHA to have the desired toolface in the first zone; and determining a cost associated with the off bottom time to orient the BHA to have the desired toolface prior to reaching the first zone.

In any of the disclose implementations, the method may further comprise determining, by the drilling control system, the BHA is approaching a second zone of a plurality of zones during drilling of the wellbore, where the second zone comprises a second wellbore portion in which a second slide drilling operation is to occur; receiving, by the drilling control system, second zone characteristics associated with the second zone; determining, by the drilling control system, the on bottom time to orient the BHA to have the desired toolface in the second zone when the drill bit contacts rock at the distal end of the wellbore and responsive to the information from the BHA and the second zone characteristics; determining, by the drilling control system, an additional time for the second slide drilling operation in the second zone responsive to the on bottom time to orient the BHA; and determining, by the drilling control system, the off bottom time to orient the BHA to have the desired toolface prior to reaching the second zone when the drill bit is not in contact with the rock at the distal end of the wellbore and responsive to the information from the BHA and the first zone characteristics. The method may further comprise comparing, by the drilling control system, the additional time for the second slide drilling operation in the second zone to the off bottom time to orient the BHA to have the desired toolface prior to reaching the second zone; and sending, by the drilling control system, one or more control signals to orient the BHA to the desired toolface either prior to reaching the second zone or at the second zone based at least in part on the comparison.

In any of the disclosed implementations, the method may further comprise determining, by the drilling control system, a target toolface range for the first slide drilling operation, wherein the one or more control signals are sent responsive to the desired toolface being outside the target toolface range.

In another aspect, a non-transitory computer readable storage medium storing instructions that, upon execution by one or more processors, cause the one or more processors to perform operations is disclosed. The operations may comprise receiving, during drilling of a wellbore, well plan information for the wellbore and information from a BHA located in the wellbore, where the BHA comprises a drill bit at one end thereof; determining that the BHA is approaching a first zone during drilling of the wellbore, wherein the first zone comprises a wellbore portion in which a first slide drilling operation is to occur; receiving first zone characteristics associated with the first zone; determining an on bottom time to orient the BHA to have a desired toolface in the first zone when the drill bit contacts rock at a distal end of the wellbore and responsive to the information from the BHA and the first zone characteristics; determining an additional time for the first slide drilling operation in the first zone responsive to the on bottom time to orient the BHA; and determining an off bottom time to orient the BHA to have a desired toolface prior to reaching the first zone when the drill bit is not in contact with the rock at the distal end of the wellbore and responsive to the well plan information and the information from the BHA. The operations may further comprise comparing the additional time for the first slide drilling operation in the first zone to the off bottom time to orient the BHA to have the desired toolface prior to reaching the first zone; and sending one or more control signals to orient the BHA to the desired toolface either prior to reaching the first zone or at the first zone based at least in part on the comparison.

In any of the disclosed implementations, the instructions may cause the one or more processors to perform additional operations comprising determining a cost associated with the on bottom time to orient the BHA to have the desired toolface in the first zone; and determining a cost associated with the off bottom time to orient the BHA to have the desired toolface prior to reaching the first zone.

In any of the disclosed implementations, the instructions may cause the one or more processors to perform additional operations comprising determining the BHA is approaching a second zone of a plurality of zones during drilling of the wellbore, where the second zone comprises a second wellbore portion in which a second slide drilling operation is to occur; receiving second zone characteristics associated with the second zone; determining the on bottom time to orient the BHA to have the desired toolface in the second zone when the drill bit contacts rock at the distal end of the wellbore and responsive to the information from the BHA and the second zone characteristics; determining an additional time for the second slide drilling operation in the second zone responsive to the on bottom time to orient the BHA; and determining the off bottom time to orient the BHA to have the desired toolface prior to reaching the second zone when the drill bit is not in contact with the rock at the distal end of the wellbore and responsive to the information from the BHA and the first zone characteristics. The operations may further comprise comparing the additional time for the second slide drilling operation in the second zone to the off bottom time to orient the BHA to have the desired toolface prior to reaching the second zone; and sending one or more control signals to orient the BHA to the desired toolface either prior to reaching the second zone or at the second zone based at least in part on the comparison.

In any of the disclosed implementations, the instructions may cause the one or more processors to perform additional operations comprising determining a target toolface range for the first slide drilling operation, wherein the one or more control signals are sent responsive to the desired toolface being outside the target toolface range.

BRIEF DESCRIPTION OF THE DRAWINGS

For a more complete understanding, reference is now made to the following description taken in conjunction with the accompanying drawings in which.

DETAILED DESCRIPTION

Figure 1A:
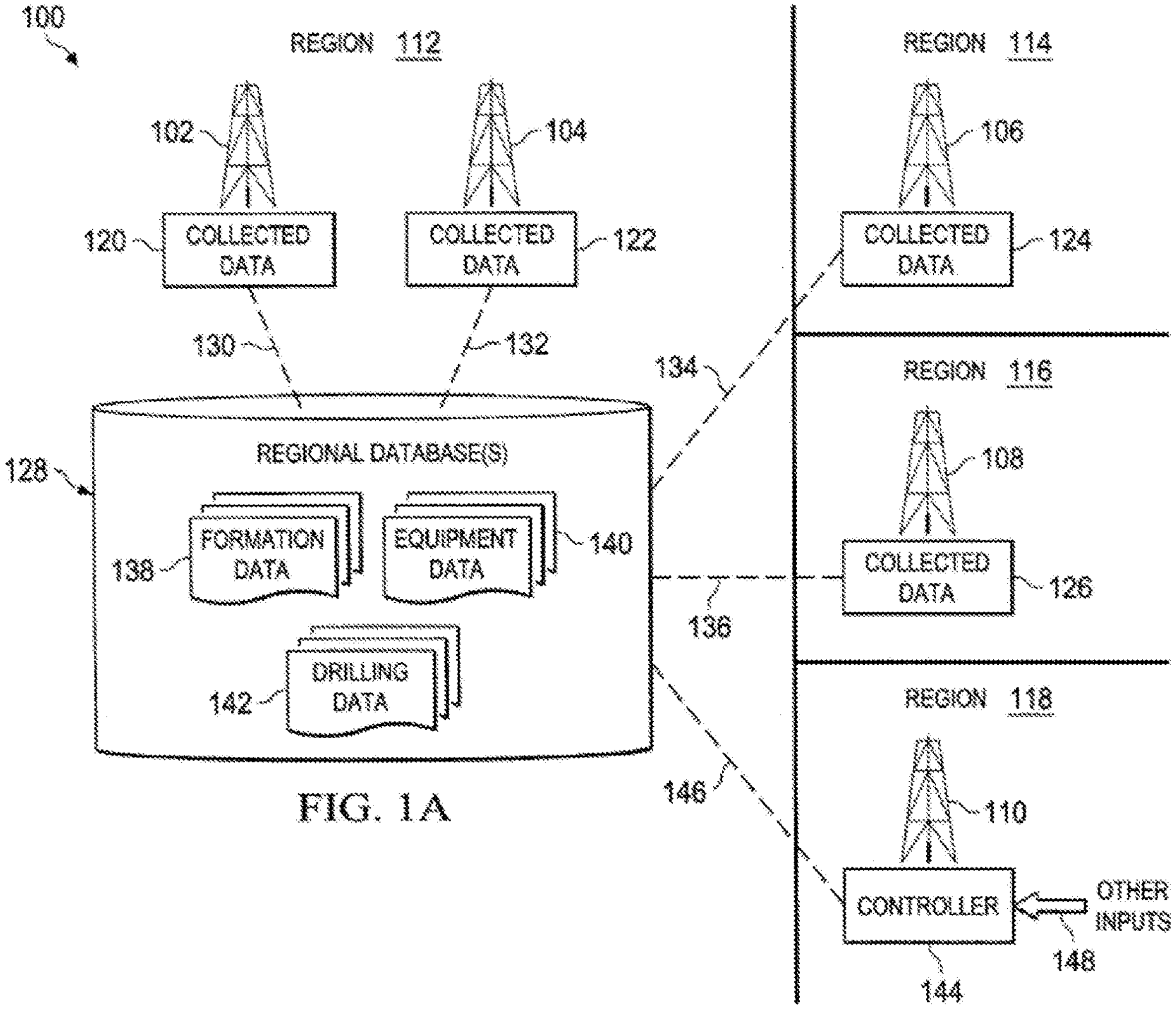
FIG. 1A illustrates one embodiment of a drilling environment in which a surface steerable system using automated slide drilling may operate.

Referring now to the drawings, wherein like reference numbers are used herein to designate like elements throughout, the various views and embodiments of a system and method for surface steerable drilling are illustrated and described, and other possible embodiments are described. The figures are not necessarily drawn to scale, and in some instances the drawings have been exaggerated and/or simplified in places for illustrative purposes only. Many possible applications and variations may be based on the following examples of possible embodiments.

Referring to FIG. 1A, one embodiment of an environment 100 is illustrated with multiple wells 102, 104, 106, 108, and a drilling rig 110. In the present example, the wells 102 and 104 are located in a region 112, the well 106 is located in a region 114, the well 108 is located in a region 116, and the drilling rig 110 is located in a region 118. Each region 112, 114, 116, and 118 may represent a geographic area having similar geological formation characteristics. For example, region 112 may include particular formation characteristics identified by rock type, porosity, thickness, and other geological information. These formation characteristics affect drilling of the wells 102 and 104. Region 114 may have formation characteristics that are different enough to be classified as a different region for drilling purposes, and the different formation characteristics affect the drilling of the well 106. Likewise, formation characteristics in the regions 116 and 118 affect the well 108 and drilling rig 110, respectively.

It is understood the regions 112, 114, 116, and 118 may vary in size and shape depending on the characteristics by which they are identified. Furthermore, the regions 112, 114, 116, and 118 may be sub-regions of a larger region. Accordingly, the criteria by which the regions 112, 114, 116, and 118 are identified is less important for purposes of the present disclosure than the understanding that each region 112, 114, 116, and 118 includes geological characteristics that can be used to distinguish each region from the other regions from a drilling perspective. Such characteristics may be relatively major (e.g., the presence or absence of an entire rock layer in a given region) or may be relatively minor (e.g., variations in the thickness of a rock layer that extends through multiple regions).

Accordingly, drilling a well located in the same region as other wells, such as drilling a new well in the region 112 with already existing wells 102 and 104, means the drilling process is likely to face similar drilling issues as those faced when drilling the existing wells in the same region. For similar reasons, a drilling process performed in one region is likely to face issues different from a drilling process performed in another region. However, even the drilling processes that created the wells 102 and 104 may face different issues during actual drilling as variations in the formation are likely to occur even in a single region.

Drilling a well typically involves a substantial amount of human decision making during the drilling process. For example, geologists and drilling engineers use their knowledge, experience, and the available information to make decisions on how to plan the drilling operation, how to accomplish the plan, and how to handle issues that arise during drilling. However, even the best geologists and drilling engineers perform some guesswork due to the unique nature of each borehole. Furthermore, a directional driller directly responsible for the drilling may have drilled other boreholes in the same region and so may have some similar experience, but it is impossible for a human to mentally track all the possible inputs and factor those inputs into a decision. This can result in expensive mistakes, as errors in drilling can add hundreds of thousands or even millions of dollars to the drilling cost and, in some cases, drilling errors may permanently lower the output of a well, resulting in substantial long term losses.

In the present example, to aid in the drilling process, each well 102, 104, 106, and 108 has corresponding collected data 120, 122, 124, and 126, respectively. The collected data may include the geological characteristics of a particular formation in which the corresponding well was formed, the attributes of a particular drilling rig, including the bottom hole assembly (BHA), and drilling information such as weight-on-bit (WOB), drilling speed, and/or other information pertinent to the formation of that particular borehole. The drilling information may be associated with a particular depth or other identifiable marker so that, for example, it is recorded that drilling of the well 102 from 1000 feet to 1200 feet occurred at a first ROP through a first rock layer with a first WOB, while drilling from 1200 feet to 1500 feet occurred at a second ROP through a second rock layer with a second WOB. The collected data may be used to recreate the drilling process used to create the corresponding well 102, 104, 106, or 108 in the particular formation. It is understood that the accuracy with which the drilling process can be recreated depends on the level of detail and accuracy of the collected data.

The collected data 120, 122, 124, and 126 may be stored in a centralized regional database 128 as indicated by lines 130, 132, 134, and 136, respectively, which may represent any wired and/or wireless communication channel(s). The regional database 128 may be located at a drilling hub (not shown) or elsewhere. Alternatively, the data may be stored on a removable storage medium that is later coupled to the regional database 128 in order to store the data. The collected data 120, 122, 124, and 126 may be stored in the regional database 128 as formation data 138, equipment data 140, and drilling data 142 for example. Formation data 138 may include any formation information, such as rock type, layer thickness, layer location (e.g., depth), porosity, gamma readings, etc. Equipment data 140 may include any equipment information, such as drilling rig configuration (e.g., rotary table or top drive), bit type, mud composition, etc. Drilling data 142 may include any drilling information, such as drilling speed, WOB, differential pressure, tool face orientation, etc. The collected data may also be identified by well, region, and other criteria, and may be sortable to enable the data to be searched and analyzed. It is understood that many different storage mechanisms may be used to store the collected data in the regional database 128.

Figure 1B:
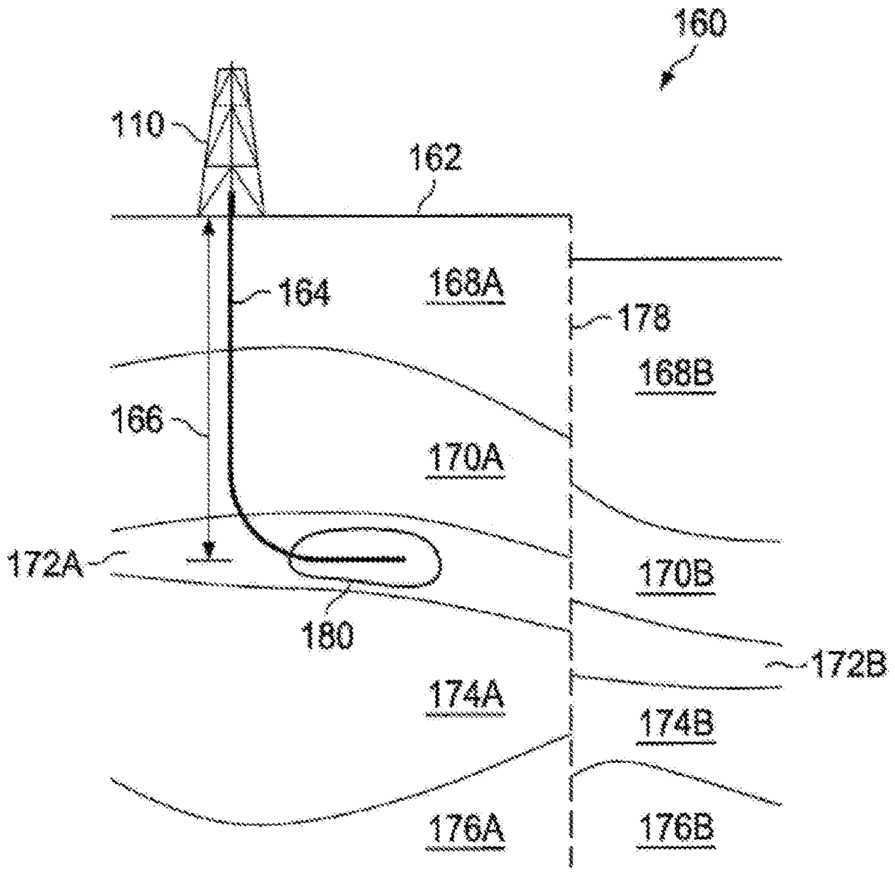
FIG. 1B illustrates one embodiment of a detailed portion of the drilling environment of FIG. 1A.

With additional reference to FIG. 1B, an environment 160 (not to scale) illustrates a more detailed embodiment of a portion of the region 118 with the drilling rig 110 located at the surface 162. A drilling plan has been formulated to drill a borehole 164 extending into the ground to a true vertical depth (TVD) 166. The borehole 164 extends through strata layers 168 and 170, stopping in layer 172, and not reaching underlying layers 174 and 176. The borehole 164 may be directed to a target area 180 positioned in the layer 172. The target 180 may be a subsurface point or points defined by coordinates or other markers that indicate where the borehole 164 is to end or may simply define a depth range within which the borehole 164 is to remain (e.g., the layer 172 itself). It is understood that the target 180 may be any shape and size, and may be defined in any way. Accordingly, the target 180 may represent an endpoint of the borehole 164 or may extend as far as can be realistically drilled. For example, if the drilling includes a horizontal component and the goal is to follow the layer 172 as far as possible, the target may simply be the layer 172 itself and drilling may continue until a limit is reached, such as a property boundary or a physical limitation to the length of the drill string. A fault 178 has shifted a portion of each layer downwards. Accordingly, the borehole 164 is located in non-shifted layer portions 168A-176A, while portions 168B-176B represent the shifted layer portions.

Current drilling techniques frequently involve directional drilling to reach a target, such as the target 180. The use of directional drilling generally increases the amount of reserves that can be obtained and also increases production rate, sometimes significantly. For example, the directional drilling used to provide the horizontal portion shown in FIG. 1B increases the length of the borehole in the layer 172, which is the target layer in the present example. Directional drilling may also be used alter the angle of the borehole to address faults, such as the fault 178 that has shifted the layer portion 172B. Other uses for directional drilling include sidetracking off of an existing well to reach a different target area or a missed target area, drilling around abandoned drilling equipment, drilling into otherwise inaccessible or difficult to reach locations (e.g., under populated areas or bodies of water), providing a relief well for an existing well, and increasing the capacity of a well by branching off and having multiple boreholes extending in different directions or at different vertical positions for the same well. Directional drilling is often not confined to a straight horizontal borehole, but may involve staying within a rock layer that varies in depth and thickness as illustrated by the layer 172. As such, directional drilling may involve multiple vertical adjustments that complicate the path of the borehole.

Figure 1C:
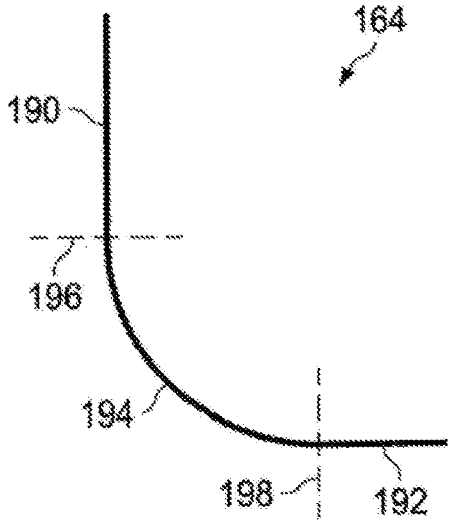
FIG. 1C illustrates one embodiment of a detailed portion of the drilling environment of FIG. 1B.

With additional reference to FIG. 1C, which illustrates one embodiment of a portion of the borehole 164 of FIG. 1B, the drilling of horizontal wells clearly introduces significant challenges to drilling that do not exist in vertical wells. For example, a substantially horizontal portion 192 of the well may be started off of a vertical borehole 190 and one drilling consideration is the transition from the vertical portion of the well to the horizontal portion. This transition is generally a curve that defines a build up section 194 beginning at the vertical portion (called the kick off point and represented by line 196) and ending at the horizontal portion (represented by line 198). The change in inclination per measured length drilled is typically referred to as the build rate and is often defined in degrees per one hundred feet drilled. For example, the build rate may be 6°/100 ft., indicating that there is a six degree change in inclination for every one hundred feet drilled. The build rate for a particular build up section may remain relatively constant or may vary.

The build rate depends on factors such as the formation through which the borehole 164 is to be drilled, the trajectory of the borehole 164, the particular pipe and drill collars/BHA components used (e.g., length, diameter, flexibility, strength, mud motor bend setting, and drill bit), the mud type and flow rate, the required horizontal displacement, stabilization, and inclination. An overly aggressive built rate can cause problems such as severe doglegs (e.g., sharp changes in direction in the borehole) that may make it difficult or impossible to run casing or perform other needed tasks in the borehole 164. Depending on the severity of the mistake, the borehole 164 may require enlarging or the bit may need to be backed out and a new passage formed. Such mistakes cost time and money. However, if the built rate is too cautious, significant additional time may be added to the drilling process as it is generally slower to drill a curve than to drill straight. Furthermore, drilling a curve is more complicated and the possibility of drilling errors increases (e.g., overshoot and undershoot that may occur trying to keep the bit on the planned path).

Two modes of drilling, known as rotating and sliding, are commonly used to form the borehole 164. Rotating, also called rotary drilling, uses a top drive or rotary table to rotate the drill string. Rotating is used when drilling is to occur along a straight path. Sliding, also called steering, uses a downhole mud motor with an adjustable bent housing and does not rotate the drill string. Instead, sliding uses hydraulic power to drive the downhole motor and bit. Sliding is used in order to control well direction.

The conventional approach to accomplish a slide can be briefly summarized as follows. First, the rotation of the drill string is stopped. Based on feedback from measuring equipment such as a MWD tool, adjustments are made to the drill string. These adjustments continue until the downhole tool face that indicates the direction of the bend of the mud motor is oriented to the direction of the desired deviation of the borehole. Once the desired orientation is accomplished, pressure is applied to the drill bit, which causes the drill bit to move in the direction of deviation. Once sufficient distance and angle have been built, a transition back to rotating mode is accomplished by rotating the drill string. This rotation of the drill string neutralizes the directional deviation caused by the bend in the mud motor as it continuously rotates around the centerline of the borehole.

Referring again to FIG. 1A, the formulation of a drilling plan for the drilling rig 110 may include processing and analyzing the collected data in the regional database 128 to create a more effective drilling plan. Furthermore, once the drilling has begun, the collected data may be used in conjunction with current data from the drilling rig 110 to improve drilling decisions. Accordingly, controller 144 is coupled to the drilling rig 110 and may also be coupled to the regional database 128 via one or more wired and/or wireless communication channel(s) 146. The controller 144 may be on-site at the drilling rig 110 located at a remote control center away from the drilling rig 110. Other inputs 148 may also be provided to the on-site controller 144. In some embodiments, the controller 144 may operate as a standalone device with the drilling rig 110. For example, the controller 144 may not be communicatively coupled to the regional database 128. Although shown as being positioned near or at the drilling rig 110 in the present example, it is understood that some or all components of the controller 144 may be distributed and located elsewhere in other embodiments such as a remote central control facility.

The controller 144 may form all or part of a surface steerable system. The regional database 128 may also form part of the surface steerable system. As will be described in greater detail below, the surface steerable system may be used to plan and control drilling operations based on input information, including feedback from the drilling process itself. The surface steerable system may be used to perform such operations as receiving drilling data representing a drill path and other drilling parameters, calculating a drilling solution for the drill path based on the received data and other available data (e.g., rig characteristics), implementing the drilling solution at the drilling rig 110, monitoring the drilling process to gauge whether the drilling process is within a defined margin of error of the drill path, and/or calculating corrections for the drilling process if the drilling process is outside of the margin of error.

Figure 2A:
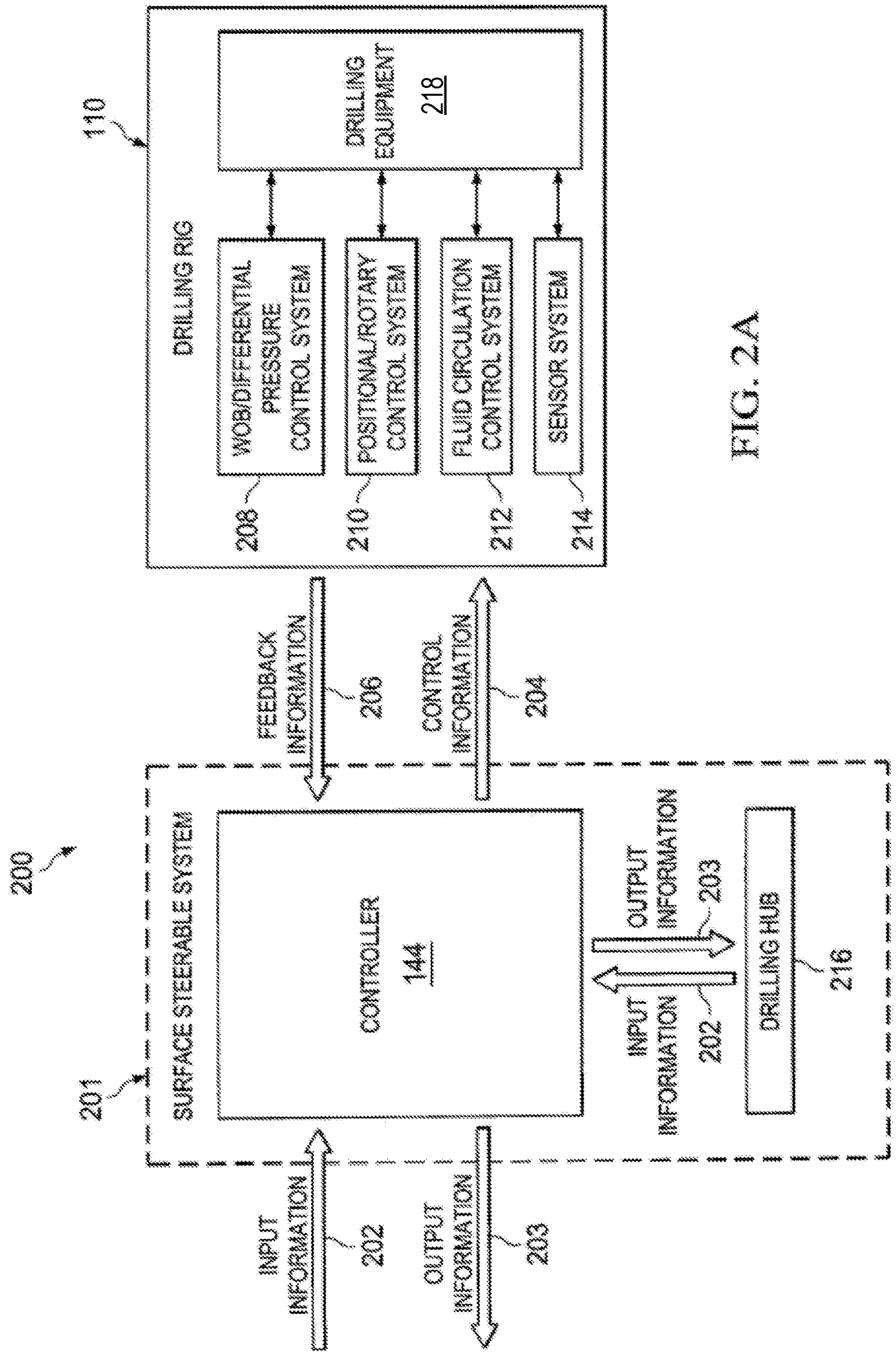
FIG. 2A illustrates one embodiment of the surface steerable system of FIG. 1A with associated information flow.

Referring to FIG. 2A, a diagram 200 illustrates one embodiment of information flow for a surface steerable system 201 from the perspective of the controller 144 of FIG. 1A. In the present example, the drilling rig 110 of FIG. 1A includes drilling equipment 218 used to perform the drilling of a borehole, such as top drive or rotary drive equipment that couples to the drill string and BHA and is configured to rotate the drill string and apply pressure to the drill bit. The drilling rig 110 may include control systems such as a WOB/differential pressure control system 208, a positional/rotary control system 210, and a fluid circulation control system 212. The control systems 208, 210, and 212 may be used to monitor and change drilling rig settings, such as the WOB and/or differential pressure to alter the ROP or the radial orientation of the tool face, change the flow rate of drilling mud, and perform other operations.

The drilling rig 110 may also include a sensor system 214 for obtaining sensor data about the drilling operation and the drilling rig 110, including the downhole equipment. For example, the sensor system 214 may include measuring while drilling (MWD) and/or logging while drilling (LWD) components for obtaining information, such as tool face and/or formation logging information, which may be saved for later retrieval, transmitted with a delay or in real time using any of various communication means (e.g., wireless, wireline, or mud pulse telemetry), or otherwise transferred to the controller 144. Such information may include information related to hole depth, bit depth, inclination, azimuth, true vertical depth, gamma count, standpipe pressure, mud flow rate, rotary rotations per minute (RPM), bit speed, ROP, WOB, and/or other information. It is understood that all or part of the sensor system 214 may be physically incorporated into one or more of the control systems 208, 210, and 212, and/or in the drilling equipment 218. As the drilling rig 110 may be configured in many different ways, it is understood that these control systems may be different in some embodiments, and may be combined or further divided into various subsystems.

The controller 144 receives input information 202. The input information 202 may include information that is pre-loaded, received, and/or updated in real time. The input information 202 may include a well plan, regional formation history, one or more drilling engineer parameters, MWD tool face/inclination information, LWD gamma/resistivity information, economic parameters, reliability parameters, and/or other decision guiding parameters. Some of the inputs, such as the regional formation history, may be available from a drilling hub 216, which may include the regional database 128 of FIG. 1A and one or more processors (not shown), while other inputs may be accessed or uploaded from other sources. For example, a web interface may be used to interact directly with the controller 144 to upload the well plan and/or drilling engineer parameters. The input information 202 feeds into the controller 144 and, after processing by the on-site controller 144, results in control information 204 that is output to the drilling rig 110 (e.g., to the control systems 208, 210, and 212). The drilling rig 110 (e.g., via the systems 208, 210, 212, and 214) provides feedback information 206 to the controller 144. The feedback information 206 then serves as input to the controller 144, enabling the controller 144 to verify that the current control information is producing the desired results or to produce new control information for the drilling rig 110.

The controller 144 also provides output information 203. As will be described later in greater detail, the output information 203 may be stored in the controller 144 and/or sent offsite (e.g., to the regional database 128). The output information 203 may be used to provide updates to the regional database 128, as well as provide alerts, request decisions, and convey other data related to the drilling process.

Figure 2B:
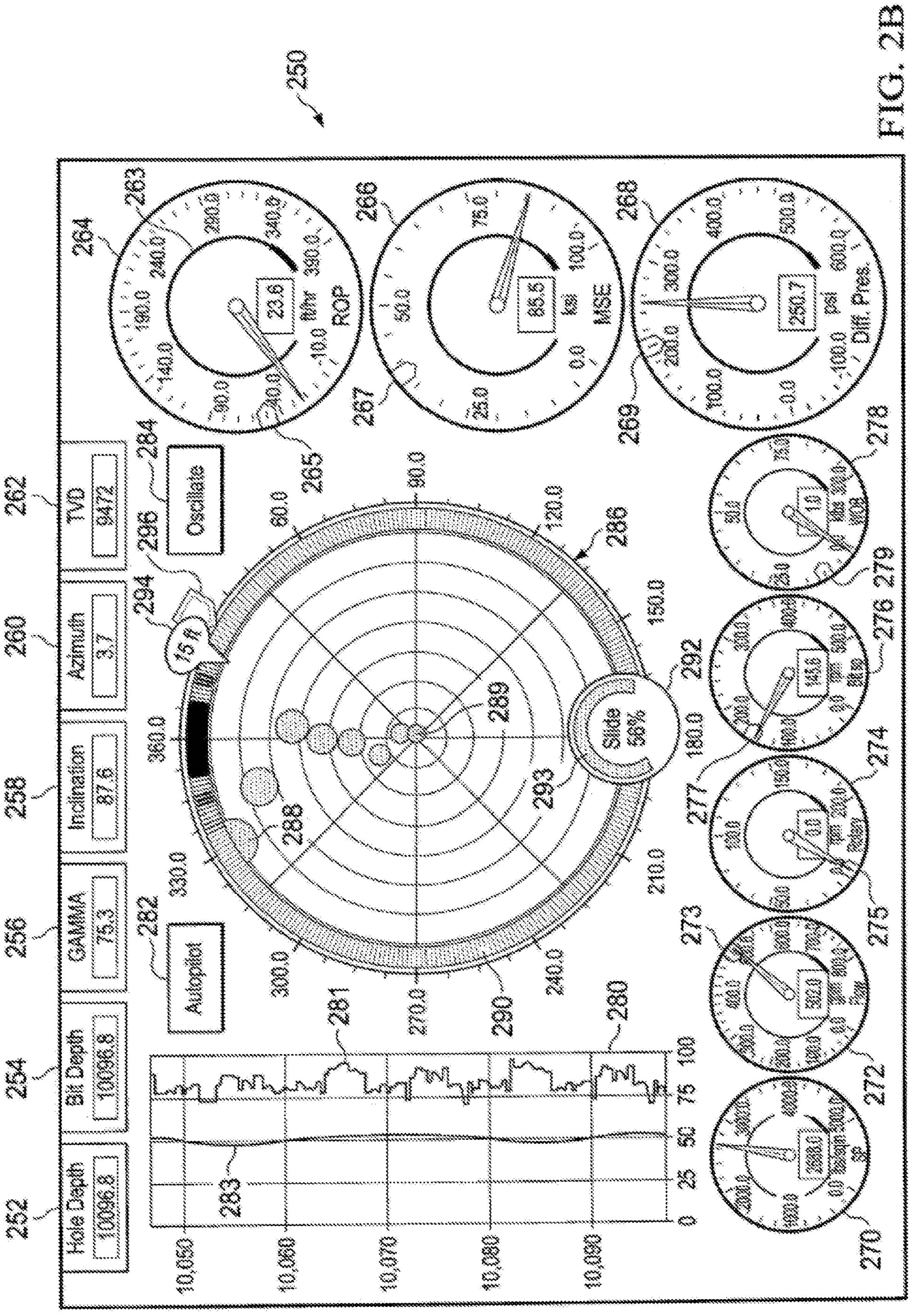
FIG. 2B illustrates one embodiment of a user interface that may be used with a surface steerable system.

Referring to FIG. 2B, one embodiment of a user interface 250 that may be provided by the controller 144 is illustrated. The user interface 250 may provide many different types of information in an easily accessible format. For example, the user interface 250 may be shown on a computer monitor, a television, a viewing screen (e.g., a display) that is coupled to or forms part of the controller 144.

The user interface 250 provides visual indicators such as a hole depth indicator 252, a bit depth indicator 254, a GAMMA indicator 256, an inclination indicator 258, an azimuth indicator 260, and a TVD indicator 262. Other indicators may also be provided, including a ROP indicator 264, a mechanical specific energy (MSE) indicator 266, a differential pressure indicator 268, a standpipe pressure indicator 270, a flow rate indicator 272, a rotary RPM indicator 274, a bit speed indicator 276, and a WOB indicator 278.

Some or all of the indicators 264, 266, 268, 270, 272, 274, 276, and/or 278 may include a marker representing a target value. For purposes of example, markers are set as the following values, but it is understood that any desired target value may be representing. For example, the ROP indicator 264 may include a marker 265 indicating that the target value is fifty ft./hr. The MSE indicator 266 may include a marker 267 indicating that the target value is thirty-seven ksi. The differential pressure indicator 268 may include a marker 269 indicating that the target value is two hundred psi. The ROP indicator 264 may include a marker 265 indicating that the target value is fifty ft./hr. The standpipe pressure indicator 270 may have no marker in the present example. The flow rate indicator 272 may include a marker 273 indicating that the target value is five hundred gpm. The rotary RPM indicator 274 may include a marker 275 indicating that the target value is zero RPM (due to sliding). The bit speed indicator 276 may include a marker 277 indicating that the target value is one hundred and fifty RPM. The WOB indicator 278 may include a marker 279 indicating that the target value is ten klbs. Although only labeled with respect to the indicator 264, each indicator may include a colored band or another marking to indicate, for example, whether the respective gauge value is within a safe range (e.g., indicated by a green color), within a caution range (e.g., indicated by a yellow color), or within a danger range (e.g., indicated by a red color). Although not shown, in some embodiments, multiple markers may be present on a single indicator. The markers may vary in color and/or size.

A log chart 280 may visually indicate depth versus one or more measurements (e.g., may represent log inputs relative to a progressing depth chart). For example, the log chart 280 may have a y-axis representing depth and an x-axis representing a measurement such as GAMMA count 281 (as shown), ROP 283 (e.g., empirical ROP and normalized ROP), or resistivity. An autopilot button 282 and an oscillate button 284 may be used to control activity. For example, the autopilot button 282 may be used to engage or disengage an autopilot, while the oscillate button 284 may be used to directly control oscillation of the drill string or engage/disengage an external hardware device or controller via software and/or hardware.

A circular chart 286 may provide current and historical tool face orientation information (e.g., which way the bend is pointed). For purposes of illustration, the circular chart 286 represents three hundred and sixty degrees. A series of circles within the circular chart 286 may represent a timeline of tool face orientations, with the sizes of the circles indicating the temporal position of each circle. For example, larger circles may be more recent than smaller circles, so the largest circle 288 may be the newest reading and the smallest circle 286 may be the oldest reading. In other embodiments, the circles may represent the energy and/or progress made via size, color, shape, a number within a circle, etc. For example, the size of a particular circle may represent an accumulation of orientation and progress for the period of time represented by the circle. In other embodiments, concentric circles representing time (e.g., with the outside of the circular chart 286 being the most recent time and the center point being the oldest time) may be used to indicate the energy and/or progress (e.g., via color and/or patterning such as dashes or dots rather than a solid line).

The circular chart 286 may also be color coded, with the color coding existing in a band 290 around the circular chart 286 or positioned or represented in other ways. The color coding may use colors to indicate activity in a certain direction. For example, the color red may indicate the highest level of activity, while the color blue may indicate the lowest level of activity. Furthermore, the arc range in degrees of a color may indicate the amount of deviation. Accordingly, a relatively narrow (e.g., thirty degrees) arc of red with a relatively broad (e.g., three hundred degrees) arc of blue may indicate that most activity is occurring in a particular tool face orientation with little deviation. For purposes of illustration, the color blue extends from approximately 22-337 degrees, the color green extends from approximately 15-22 degrees and 337-345 degrees, the color yellow extends a few degrees around the 13 and 345 degree marks, and the color red extends from approximately 347-10 degrees. Transition colors or shades may be used with, for example, the color orange marking the transition between red and yellow and/or a light blue marking the transition between blue and green.

This color coding enables the user interface 250 to provide an intuitive summary of how narrow the standard deviation is and how much of the energy intensity is being expended in the proper direction. Furthermore, the center of energy may be viewed relative to the target. For example, the user interface 250 may clearly show that the target is at ninety degrees, but the center of energy is at forty-five degrees.

Other indicators may be present, such as a slide indicator 292 to indicate how much time remains until a slide occurs and/or how much time remains for a current slide. For example, the slide indicator may represent a time, a percentage (e.g., current slide is fifty-six percent complete), a distance completed, and/or a distance remaining. The slide indicator 292 may graphically display information using, for example, a colored bar 293 that increases or decreases with the slide's progress. In some embodiments, the slide indicator may be built into the circular chart 286 (e.g., around the outer edge with an increasing/decreasing band), while in other embodiments the slide indicator may be a separate indicator such as a meter, a bar, a gauge, or another indicator type. In various implementations, slide indicator 292 may be refreshed by an automated slide drilling system.

An error indicator 294 may be present to indicate a magnitude and/or a direction of error. For example, the error indicator 294 may indicate that the estimated drill bit position is a certain distance from the planned path, with a location of the error indicator 294 around the circular chart 286 representing the heading. For example, FIG. 2B illustrates an error magnitude of fifteen feet and an error direction of fifteen degrees. The error indicator 294 may be any color but is red for purposes of example. It is understood that the error indicator 294 may present a zero if there is no error and/or may represent that the bit is on the path in other ways, such as being a green color. Transition colors, such as yellow, may be used to indicate varying amounts of error. In some embodiments, the error indicator 294 may not appear unless there is an error in magnitude and/or direction. A marker 296 may indicate an ideal slide direction. Although not shown, other indicators may be present, such as a bit life indicator to indicate an estimated lifetime for the current bit based on a value such as time and/or distance.

It is understood that the user interface 250 may be arranged in many different ways. For example, colors may be used to indicate normal operation, warnings, and problems. In such cases, the numerical indicators may display numbers in one color (e.g., green) for normal operation, may use another color (e.g., yellow) for warnings, and may use yet another color (e.g., red) if a serious problem occurs. The indicators may also flash or otherwise indicate an alert. The gauge indicators may include colors (e.g., green, yellow, and red) to indicate operational conditions and may also indicate the target value (e.g., an ROP of 100 ft./hr). For example, the ROP indicator 268 may have a green bar to indicate a normal level of operation (e.g., from 10-300 ft./hr), a yellow bar to indicate a warning level of operation (e.g., from 300-360 ft./hr), and a red bar to indicate a dangerous or otherwise out of parameter level of operation (e.g., from 360-390 ft./hr). The ROP indicator 268 may also display a marker at 100 ft./hr to indicate the desired target ROP.

Furthermore, the use of numeric indicators, gauges, and similar visual display indicators may be varied based on factors such as the information to be conveyed and the personal preference of the viewer. Accordingly, the user interface 250 may provide a customizable view of various drilling processes and information for a particular individual involved in the drilling process. For example, the surface steerable system 201 may enable a user to customize the user interface 250 as desired, although certain features (e.g., standpipe pressure) may be locked to prevent removal. This locking may prevent a user from intentionally or accidentally removing important drilling information from the display. Other features may be set by preference. Accordingly, the level of customization and the information shown by the user interface 250 may be controlled based on who is viewing the display and their role in the drilling process.

Referring again to FIG. 2A, it is understood that the level of integration between the controller 144 and the drilling rig 110 may depend on such factors as the configuration of the drilling rig 110 and whether the controller 144 is able to fully support that configuration. One or more of the control systems 208, 210, and 212 may be part of the controller 144, may be third-party systems, and/or may be part of the drilling rig 110. For example, an older drilling rig 110 may have relatively few interfaces with which the controller 144 is able to interact. For purposes of illustration, if a knob must be physically turned to adjust the WOB on the drilling rig 110, the controller 144 will not be able to directly manipulate the knob without a mechanical actuator. If such an actuator is not present, the controller 144 may output the setting for the knob to a screen, and an operator may then turn the knob based on the setting. Alternatively, the controller 144 may be directly coupled to the knob's electrical wiring.

However, a newer or more sophisticated drilling rig 110, such as a rig that has electronic control systems, may have interfaces with which the controller 144 can interact for direct control. For example, an electronic control system may have a defined interface and the controller 144 may be configured to interact with that defined interface. It is understood that, in some embodiments, direct control may not be allowed even if possible. For example, the controller 144 may be configured to display the setting on a screen for approval, and may then send the setting to the appropriate control system only when the setting has been approved.

Figure 3:
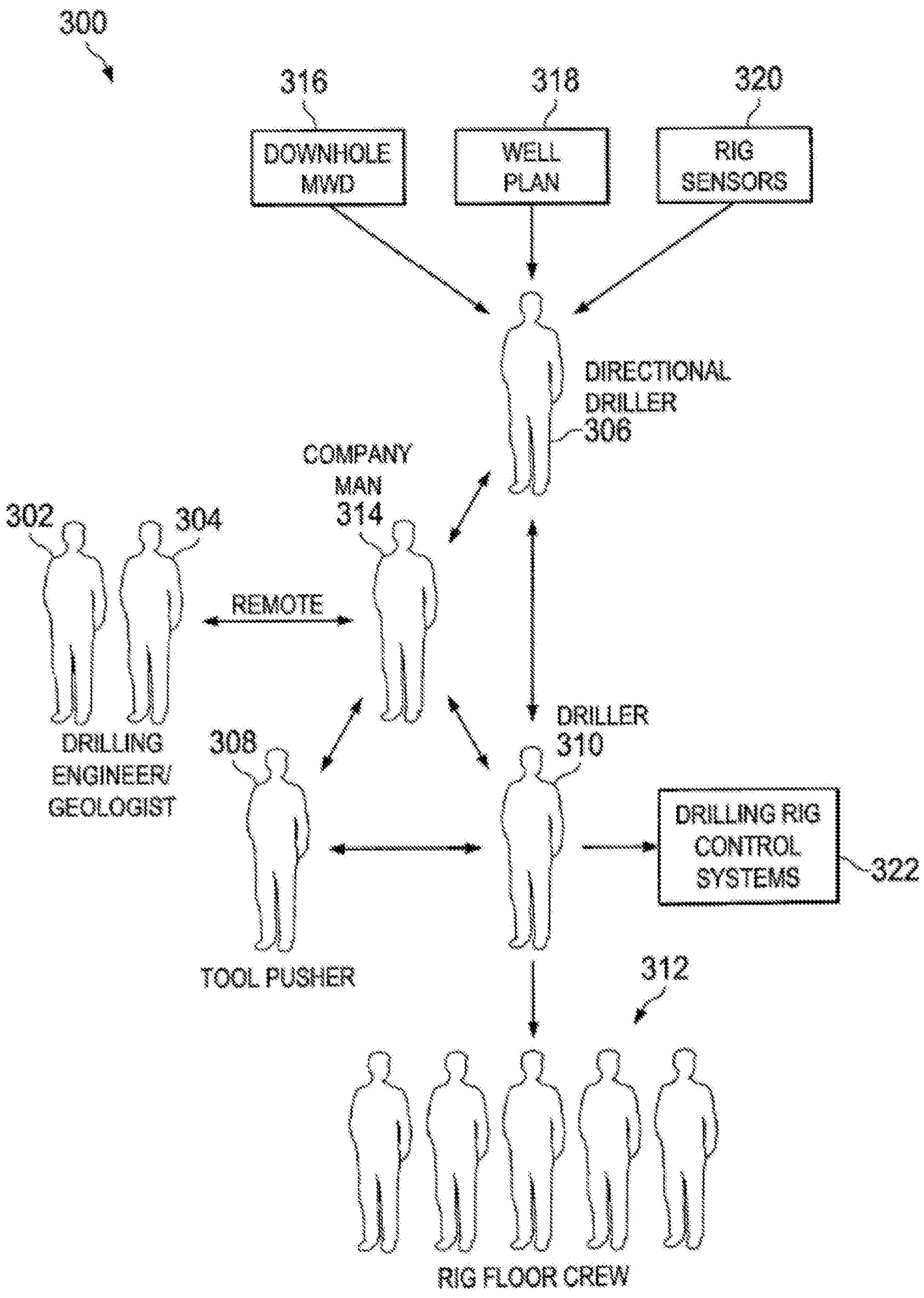
FIG. 3 illustrates one embodiment of a conventional drilling environment.

Referring to FIG. 3, one embodiment of an environment 300 illustrates multiple communication channels (indicated by arrows) that are commonly used in existing directional drilling operations that do not have the benefit of the surface steerable system 201 of FIG. 2A. The communication channels couple various individuals involved in the drilling process. The communication channels may support telephone calls, emails, text messages, faxes, data transfers (e.g., file transfers over networks), and other types of communications.

The individuals involved in the drilling process may include a drilling engineer 302, a geologist 304, a directional driller 306, a tool pusher 308, a driller 310, and a rig floor crew 312. One or more company representatives (e.g., company men) 314 may also be involved. The individuals may be employed by different organizations, which can further complicate the communication process. For example, the drilling engineer 302, geologist 304, and company man 314 may work for an operator, the directional driller 306 may work for a directional drilling service provider, and the tool pusher 308, driller 310, and rig floor crew 312 may work for a rig service provider.

The drilling engineer 302 and geologist 304 are often located at a location remote from the drilling rig (e.g., in a home office/drilling hub). The drilling engineer 302 may develop a well plan 318 and may make drilling decisions based on drilling rig information. The geologist 304 may perform such tasks as formation analysis based on seismic, gamma, and other data. The directional driller 306 is generally located at the drilling rig and provides instructions to the driller 310 based on the current well plan and feedback from the drilling engineer 302. The driller 310 handles the actual drilling operations and may rely on the rig floor crew 312 for certain tasks. The tool pusher 308 may be in charge of managing the entire drilling rig and its operation.

The following is one possible example of a communication process within the environment 300, although it is understood that many communication processes may be used. The use of a particular communication process may depend on such factors as the level of control maintained by various groups within the process, how strictly communication channels are enforced, and similar factors. In the present example, the directional driller 306 uses the well plan 318 to provide drilling instructions to the driller 310. The driller 310 controls the drilling using control systems such as the control systems 208, 210, and 212 of FIG. 2A. During drilling, information from sensor equipment such as downhole MWD equipment 316 and/or rig sensors 320 may indicate that a formation layer has been reached twenty feet higher than expected by the geologist 304. This information is passed back to the drilling engineer 302 and/or geologist 304 through the company man 314, and may pass through the directional driller 306 before reaching the company man 314.

The drilling engineer 302/well planner (not shown), either alone or in conjunction with the geologist 306, may modify the well plan 318 or make other decisions based on the received information. The modified well plan and/or other decisions may or may not be passed through the company man 314 to the directional driller 306, who then tells the driller 310 how to drill. The driller 310 may modify equipment settings (e.g., tool face orientation) and, if needed, pass orders on to the rig floor crew 312. For example, a change in WOB may be performed by the driller 310 changing a setting, while a bit trip may require the involvement of the rig floor crew 312. Accordingly, the level of involvement of different individuals may vary depending on the nature of the decision to be made and the task to be performed. The proceeding example may be more complex than described. Multiple intermediate individuals may be involved and, depending on the communication chain, some instructions may be passed through the tool pusher 308.

The environment 300 presents many opportunities for communication breakdowns as information is passed through the various communication channels, particularly given the varying types of communication that may be used. For example, verbal communications via phone may be misunderstood and, unless recorded, provide no record of what was said. Furthermore, accountability may be difficult or impossible to enforce as someone may provide an authorization but deny it or claim that they meant something else. Without a record of the information passing through the various channels and the authorizations used to approve changes in the drilling process, communication breakdowns can be difficult to trace and address. As many of the communication channels illustrated in FIG. 3 pass information through an individual to other individuals (e.g., an individual may serve as an information conduit between two or more other individuals), the risk of breakdown increases due to the possibility that errors may be introduced in the information.

Even if everyone involved does their part, drilling mistakes may be amplified while waiting for an answer. For example, a message may be sent to the geologist 306 that a formation layer seems to be higher than expected, but the geologist 306 may be asleep. Drilling may continue while waiting for the geologist 306 and the continued drilling may amplify the error. Such errors can cost hundreds of thousands or millions of dollars. However, the environment 300 provides no way to determine if the geologist 304 has received the message and no way to easily notify the geologist 304 or to contact someone else when there is no response within a defined period of time. Even if alternate contacts are available, such communications may be cumbersome and there may be difficulty in providing all the information that the alternate would need for a decision.

Figure 4:
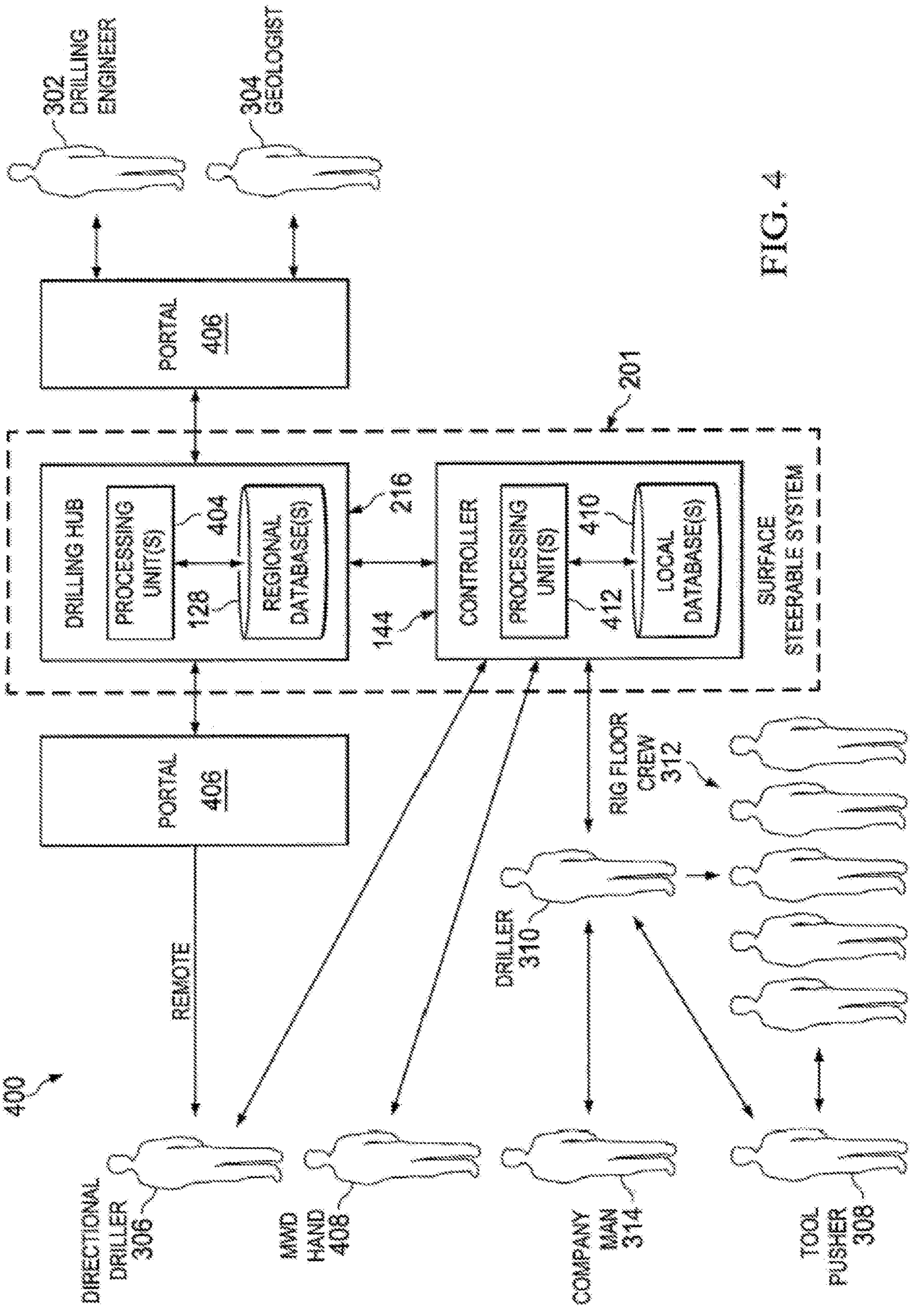
FIG. 4 illustrates one embodiment of a drilling environment including a surface steerable system.

Referring to FIG. 4, one embodiment of an environment 400 illustrates communication channels that may exist in a directional drilling operation having the benefit of the surface steerable system 201 of FIG. 2A. In the present example, the surface steerable system 201 includes the drilling hub 216, which includes the regional database 128 of FIG. 1A and processing unit(s) 404 (e.g., computers). The drilling hub 216 also includes communication interfaces (e.g., web portals) 406 that may be accessed by computing devices capable of wireless and/or wireline communications, including desktop computers, laptops, tablets, smart phones, and personal digital assistants (PDAs). The controller 144 includes one or more local databases 410 (where "local" is from the perspective of the controller 144) and processing unit(s) 412.

The drilling hub 216 is remote from the controller 144, and various individuals associated with the drilling operation interact either through the drilling hub 216 or through the controller 144. In some embodiments, an individual may access the drilling project through both the drilling hub 216 and controller 144. For example, the directional driller 306 may use the drilling hub 216 when not at the drilling site or the controller 144 is remotely located and may use the controller 144 when at the drilling site when the controller 144 is located on-site.

The drilling engineer 302 and geologist 304 may access the surface steerable system 201 remotely via the portal 406 and set various parameters such as rig limit controls. Other actions may also be supported, such as granting approval to a request by the directional driller 306 to deviate from the well plan and evaluating the performance of the drilling operation. The directional driller 306 may be located either at the drilling rig 110 or off-site. Being off-site (e.g., at the drilling hub 216, remotely located controller or elsewhere) enables a single directional driller to monitor multiple drilling rigs. When off-site, the directional driller 306 may access the surface steerable system 201 via the portal 406. When on-site, the directional driller 306 may access the surface steerable system via the controller 144.

The driller 310 may get instructions via the controller 144, thereby lessening the possibly of miscommunication and ensuring that the instructions were received. Although the tool pusher 308, rig floor crew 312, and company man 314 are shown communicating via the driller 310, it is understood that they may also have access to the controller 144. Other individuals, such as a MWD hand 408, may access the surface steerable system 201 via the drilling hub 216, the controller 144, and/or an individual such as the driller 310.

As illustrated in FIG. 4, many of the individuals involved in a drilling operation may interact through the surface steerable system 201. This enables information to be tracked as it is handled by the various individuals involved in a particular decision. For example, the surface steerable system 201 may track which individual submitted information (or whether information was submitted automatically), who viewed the information, who made decisions, when such events occurred, and similar information-based issues. This provides a complete record of how particular information propagated through the surface steerable system 201 and resulted in a particular drilling decision. This also provides revision tracking as changes in the well plan occur, which in turn enables entire decision chains to be reviewed. Such reviews may lead to improved decision making processes and more efficient responses to problems as they occur.

In some embodiments, documentation produced using the surface steerable system 201 may be synchronized and/or merged with other documentation, such as that produced by third party systems such as the WellView product produced by Peloton Computer Enterprises Ltd. of Calgary, Canada. In such embodiments, the documents, database files, and other information produced by the surface steerable system 201 is synchronized to avoid such issues as redundancy, mismatched file versions, and other complications that may occur in projects where large numbers of documents are produced, edited, and transmitted by a relatively large number of people.

The surface steerable system 201 may also impose mandatory information formats and other constraints to ensure that predefined criteria are met. For example, an electronic form provided by the surface steerable system 201 in response to a request for authorization may require that some fields are filled out prior to submission. This ensures that the decision maker has the relevant information prior to making the decision. If the information for a required field is not available, the surface steerable system 201 may require an explanation to be entered for why the information is not available (e.g., sensor failure). Accordingly, a level of uniformity may be imposed by the surface steerable system 201, while exceptions may be defined to enable the surface steerable system 201 to handle various scenarios.

The surface steerable system 201 may also send alerts (e.g., email or text alerts) to notify one or more individuals of a particular problem, and the recipient list may be customized based on the problem. Furthermore, contact information may be time-based, so the surface steerable system 201 may know when a particular individual is available. In such situations, the surface steerable system 201 may automatically attempt to communicate with an available contact rather than waiting for a response from a contact that is likely not available.

As described previously, the surface steerable system 201 may present a customizable display of various drilling processes and information for a particular individual involved in the drilling process. For example, the drilling engineer 302 may see a display that presents information relevant to the drilling engineer's tasks, and the geologist 304 may see a different display that includes additional and/or more detailed formation information. This customization enables each individual to receive information needed for their particular role in the drilling process while minimizing or eliminating unnecessary information.

Figure 5:
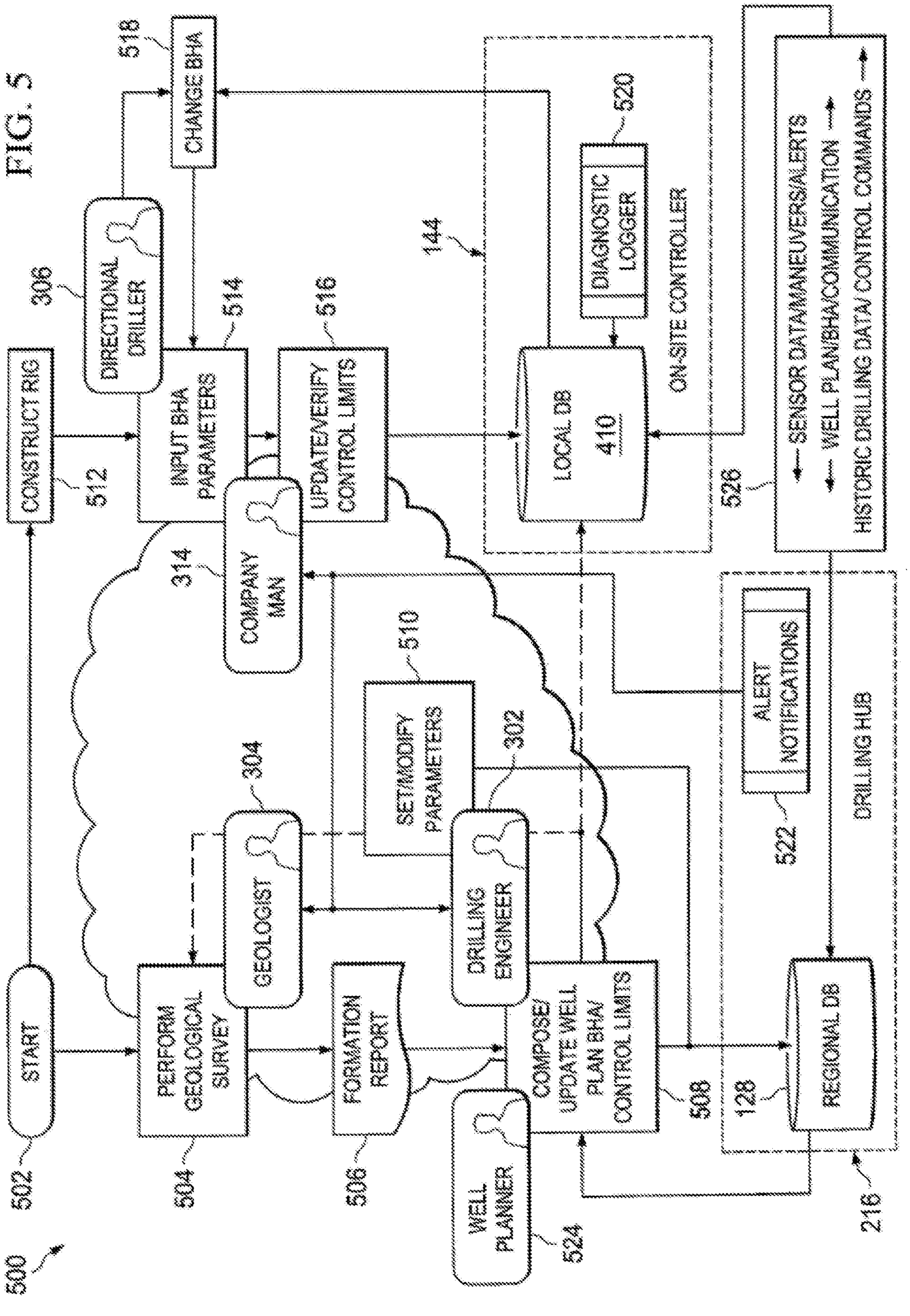
FIG. 5 illustrates one embodiment of data flow that may be supported by a surface steerable system.

Referring to FIG. 5, one embodiment of an environment 500 illustrates data flow that may be supported by the surface steerable system 201 of FIG. 2A. The data flow 500 begins at block 502 and may move through two branches, although some blocks in a branch may not occur before other blocks in the other branch. One branch involves the drilling hub 216 and the other branch involves the controller 144 at the drilling rig 110.

In block 504, a geological survey is performed. The survey results are reviewed by the geologist 304 and a formation report 506 is produced. The formation report 506 details formation layers, rock type, layer thickness, layer depth, and similar information that may be used to develop a well plan. In block 508, a well plan is developed by a well planner 524 and/or the drilling engineer 302 based on the formation report and information from the regional database 128 at the drilling hub 216. Block 508 may include selection of a BHA and the setting of control limits. The well plan is stored in the regional database 128. The drilling engineer 302 may also set drilling operation parameters in step 510 that are also stored in the regional database 128.

In the other branch, the drilling rig 110 is constructed in block 512. At this point, as illustrated by block 526, the well plan, BHA information, control limits, historical drilling data, and control commands may be sent from the regional database 128 to the local database 410. Using the receiving information, the directional driller 306 inputs actual BHA parameters in block 514. The company man 314 and/or the directional driller 306 may verify performance control limits in block 516, and the control limits are stored in the local database 410 of the controller 144. The performance control limits may include multiple levels such as a warning level and a critical level corresponding to no action taken within feet/minutes.

Once drilling begins, a diagnostic logger (described later in greater detail) 520 that is part of the controller 144 logs information related to the drilling such as sensor information and maneuvers and stores the information in the local database 410 in block 526. The information is sent to the regional database 128. Alerts are also sent from the controller 144 to the drilling hub 216. When an alert is received by the drilling hub 216, an alert notification 522 is sent to defined individuals, such as the drilling engineer 302, geologist 304, and company man 314. The actual recipient may vary based on the content of the alert message or other criteria. The alert notification 522 may result in the well plan and the BHA information and control limits being modified in block 508 and parameters being modified in block 510. These modifications are saved to the regional database 128 and transferred to the local database 410. The BHA may be modified by the directional driller 306 in block 518, and the changes propagated through blocks 514 and 516 with possible updated control limits. Accordingly, the surface steerable system 201 may provide a more controlled flow of information than may occur in an environment without such a system.

The flow charts described herein illustrate various exemplary functions and operations that may occur within various environments. Accordingly, these flow charts are not exhaustive and that various steps may be excluded to clarify the aspect being described. For example, it is understood that some actions, such as network authentication processes, notifications, and handshakes, may have been performed prior to the first step of a flow chart. Such actions may depend on the particular type and configuration of communications engaged in by the controller 144 and/or drilling hub 216. Furthermore, other communication actions may occur between illustrated steps or simultaneously with illustrated steps.

The surface steerable system 201 includes large amounts of data specifically related to various drilling operations as stored in databases such as the databases 128 and 410. As described with respect to FIG. 1A, this data may include data collected from many different locations and may correspond to many different drilling operations. The data stored in the regional database 128 and other databases may be used for a variety of purposes, including data mining and analytics, which may aid in such processes as equipment comparisons, drilling plan formulation, convergence planning, recalibration forecasting, and self-tuning (e.g., drilling performance optimization). Some processes, such as equipment comparisons, may not be performed in real time using incoming data, while others, such as self-tuning, may be performed in real time or near real time. Accordingly, some processes may be executed at the drilling hub 216, other processes may be executed at the controller 144, and still other processes may be executed by both the drilling hub 216 and the controller 144 with communications occurring before, during, and/or after the processes are executed. As described below in various examples, some processes may be triggered by events (e.g., recalibration forecasting) while others may be ongoing (e.g., self-tuning).

For example, in equipment comparison, data from different drilling operations (e.g., from drilling the wells 102, 104, 106, and 108) may be normalized and used to compare equipment wear, performance, and similar factors. For example, the same bit may have been used to drill the wells 102 and 106, but the drilling may have been accomplished using different parameters (e.g., rotation speed and WOB). By normalizing the data, the two bits can be compared more effectively. The normalized data may be further processed to improve drilling efficiency by identifying which bits are most effective for particular rock layers, which drilling parameters resulted in the best ROP for a particular formation, ROP versus reliability tradeoffs for various bits in various rock layers, and similar factors. Such comparisons may be used to select a bit for another drilling operation based on formation characteristics or other criteria. Accordingly, by mining and analyzing the data available via the surface steerable system 201, an optimal equipment profile may be developed for different drilling operations. The equipment profile may then be used when planning future wells or to increase the efficiency of a well currently being drilled. This type of drilling optimization may become increasingly accurate as more data is compiled and analyzed.

In drilling plan formulation, the data available via the surface steerable system 201 may be used to identify likely formation characteristics and to select an appropriate equipment profile. For example, the geologist 304 may use local data obtained from the planned location of the drilling rig 110 in conjunction with regional data from the regional database 128 to identify likely locations of the layers 168A-176A (FIG. 1B). Based on that information, the drilling engineer 302 can create a well plan that will include the build curve of FIG. 1C.

Figure 6:
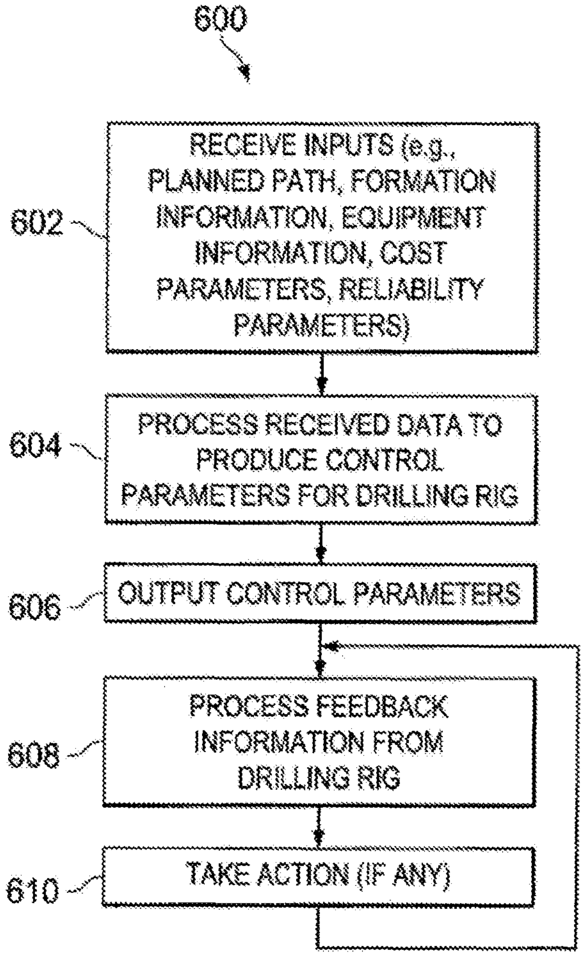
FIG. 6 illustrates one embodiment of a method that may be executed by a surface steerable system.

Referring to FIG. 6, a method 600 illustrates one embodiment of an event-based process that may be executed by the controller 144 of FIG. 2A. For example, software instructions needed to execute the method 600 may be stored on a computer readable storage medium of the on-site controller 144 and then executed by the processor 412 that is coupled to the storage medium and is also part of the on-site controller 144.

In step 602, the on-site controller 144 receives inputs, such as a planned path for a borehole, formation information for the borehole, equipment information for the drilling rig, and a set of cost parameters. The cost parameters may be used to guide decisions made by the controller 144 as will be explained in greater detail below. The inputs may be received in many different ways, including receiving document (e.g., spreadsheet) uploads, accessing a database (e.g., the regional database 128 of FIG. 1A), and/or receiving manually entered data.

In step 604, the planned path, the formation information, the equipment information, and the set of cost parameters are processed to produce control parameters (e.g., the control information 204 of FIG. 2A) for the drilling rig 110. The control parameters may define the settings for various drilling operations that are to be executed by the drilling rig 110 to form the borehole, such as WOB, flow rate of mud, tool face orientation, and similar settings. In some embodiments, the control parameters may also define particular equipment selections, such as a particular bit. In the present example, step 604 is directed to defining initial control parameters for the drilling rig 110 prior to the beginning of drilling, but it is understood that step 604 may be used to define control parameters for the drilling rig 110 even after drilling has begun. For example, the controller 144 may be put in place prior to drilling or may be put in place after drilling has commenced, in which case the method 600 may also receive current borehole information in step 602.

In step 606, the control parameters are output for use by the drilling rig 110. In embodiments where the controller 144 is directly coupled to the drilling rig 110, outputting the control parameters may include sending the control parameters directly to one or more of the control systems of the drilling rig 110 (e.g., the control systems 210, 212, and 214). In other embodiments, outputting the control parameters may include displaying the control parameters on a screen, printing the control parameters, and/or copying them to a storage medium (e.g., a Universal Serial Bus (USB) drive) to be transferred manually.

In step 608, feedback information received from the drilling rig 110 (e.g., from one or more of the control systems 208, 210, and 212 and/or sensor system 214) is processed. The feedback information may provide the on-site controller 144 with the current state of the borehole (e.g., depth and inclination), the drilling rig equipment, and the drilling process, including an estimated position of the bit in the borehole. The processing may include extracting desired data from the feedback information, normalizing the data, comparing the data to desired or ideal parameters, determining whether the data is within a defined margin of error, and/or any other processing steps needed to make use of the feedback information.

In step 610, the controller 144 may take action based on the occurrence of one or more defined events. For example, an event may trigger a decision on how to proceed with drilling in the most cost effective manner. Events may be triggered by equipment malfunctions, path differences between the measured borehole and the planned borehole, upcoming maintenance periods, unexpected geological readings, and any other activity or non-activity that may affect drilling the borehole. It is understood that events may also be defined for occurrences that have a less direct impact on drilling, such as actual or predicted labor shortages, actual or potential licensing issues for mineral rights, actual or predicted political issues that may impact drilling, and similar actual or predicted occurrences. Step 610 may also result in no action being taken if, for example, drilling is occurring without any issues and the current control parameters are satisfactory.

An event may be defined in the received inputs of step 602 or defined later. Events may also be defined on site using the controller 144. For example, if the drilling rig 110 has a particular mechanical issue, one or more events may be defined to monitor that issue in more detail than might ordinarily occur. In some embodiments, an event chain may be implemented where the occurrence of one event triggers the monitoring of another related event. For example, a first event may trigger a notification about a potential problem with a piece of equipment and may also activate monitoring of a second event. In addition to activating the monitoring of the second event, the triggering of the first event may result in the activation of additional oversight that involves, for example, checking the piece of equipment more frequently or at a higher level of detail. If the second event occurs, the equipment may be shut down and an alarm sounded, or other actions may be taken. This enables different levels of monitoring and different levels of responses to be assigned independently if needed.

Figure 7A:
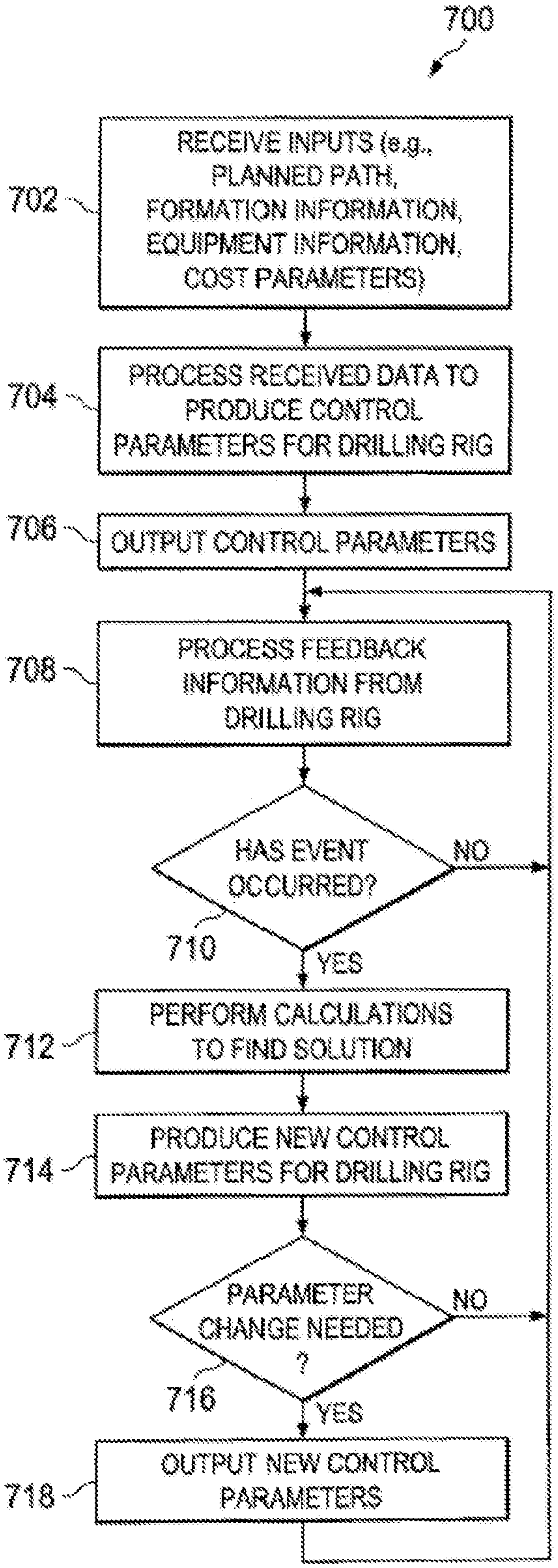
FIG. 7A illustrates a detailed embodiment of the method of FIG. 6.

Referring to FIG. 7A, a method 700 illustrates a more detailed embodiment of the method 600 of FIG. 6, particularly of step 610. As steps 702, 704, 706, and 708 are similar or identical to steps 602, 604, 606, and 608, respectively, of FIG. 6, they are not described in detail in the present embodiment. In the present example, the action of step 610 of FIG. 6 is based on whether an event has occurred, and the action needed if the event has occurred.

Accordingly, in step 710, a determination is made as to whether an event has occurred based on the inputs of steps 702 and 708. If no event has occurred, the method 700 returns to step 708. If an event has occurred, the method 700 moves to step 712, where calculations are performed based on the information relating to the event and at least one cost parameter. It is understood that additional information may be obtained and/or processed prior to or as part of step 712 if needed. For example, certain information may be used to determine whether an event has occurred, and additional information may then be retrieved and processed to determine the particulars of the event.

In step 714, new control parameters may be produced based on the calculations of step 712. In step 716, a determination may be made as to whether changes are needed in the current control parameters. For example, the calculations of step 712 may result in a decision that the current control parameters are satisfactory (e.g., the event may not affect the control parameters). If no changes are needed, the method 700 returns to step 708. If changes are needed, the controller 144 outputs the new parameters in step 718. The method 700 may then return to step 708. In some embodiments, the determination of step 716 may occur before step 714. In such embodiments, step 714 may not be executed if the current control parameters are satisfactory.

In a more detailed example of the method 700, assume that the controller 144 is involved in drilling a borehole and that approximately six hundred feet remain to be drilled. An event has been defined that warns the controller 144 when the drill bit is predicted to reach a minimum level of efficiency due to wear and this event is triggered in step 710 at the six hundred foot mark. The event may be triggered because the drill bit is within a certain number of revolutions before reaching the minimum level of efficiency, within a certain distance remaining (based on strata type, thickness, etc.) that can be drilled before reaching the minimum level of efficiency, or may be based on some other factor or factors. Although the event of the current example is triggered prior to the predicted minimum level of efficiency being reached in order to proactively schedule drilling changes if needed, it is understood that the event may be triggered when the minimum level is actually reached.

The controller 144 may perform calculations in step 712 that account for various factors that may be analyzed to determine how the last six hundred feet is drilled. These factors may include the rock type and thickness of the remaining six hundred feet, the predicted wear of the drill bit based on similar drilling conditions, location of the bit (e.g., depth), how long it will take to change the bit, and a cost versus time analysis. Generally, faster drilling is more cost effective, but there are many tradeoffs. For example, increasing the WOB or differential pressure to increase the rate of penetration may reduce the time it takes to finish the borehole, but may also wear out the drill bit faster, which will decrease the drilling effectiveness and slow the drilling down. If this slowdown occurs too early, it may be less efficient than drilling more slowly. Therefore, there is a tradeoff that must be calculated. Too much WOB or differential pressure may also cause other problems, such as damaging downhole tools. Should one of these problems occur, taking the time to trip the bit or drill a sidetrack may result in more total time to finish the borehole than simply drilling more slowly, so faster may not be better. The tradeoffs may be relatively complex, with many factors to be considered.

In step 714, the controller 144 produces new control parameters based on the solution calculated in step 712. In step 716, a determination is made as to whether the current parameters should be replaced by the new parameters. For example, the new parameters may be compared to the current parameters. If the two sets of parameters are substantially similar (e.g., as calculated based on a percentage change or margin of error of the current path with a path that would be created using the new control parameters) or identical to the current parameters, no changes would be needed. However, if the new control parameters call for changes greater than the tolerated percentage change or outside of the margin of error, they are output in step 718. For example, the new control parameters may increase the WOB and also include the rate of mud flow significantly enough to override the previous control parameters. In other embodiments, the new control parameters may be output regardless of any differences, in which case step 716 may be omitted. In still other embodiments, the current path and the predicted path may be compared before the new parameters are produced, in which case step 714 may occur after step 716.

Figure 7B:
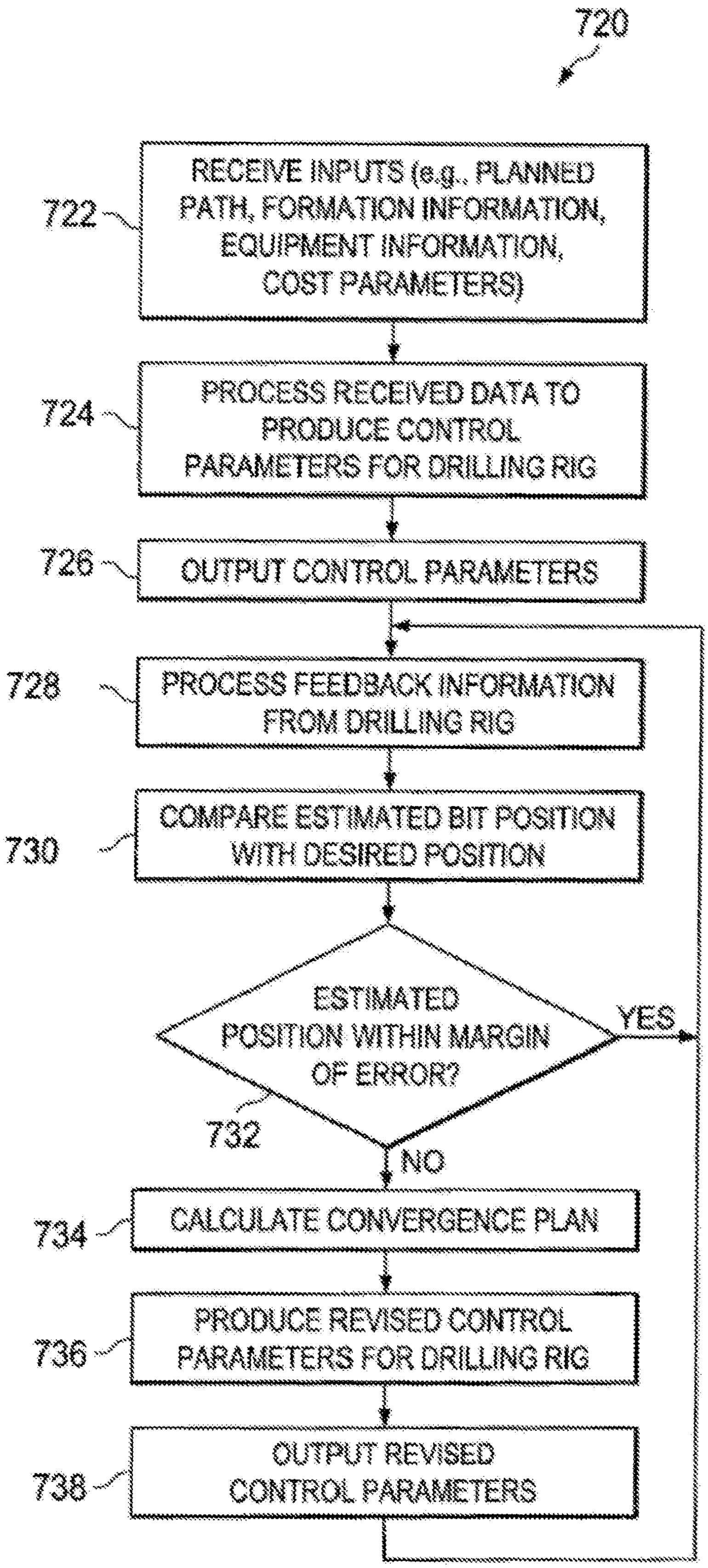
FIG. 7B illustrates a detailed embodiment of the method of FIG. 6.
Figure 7C:
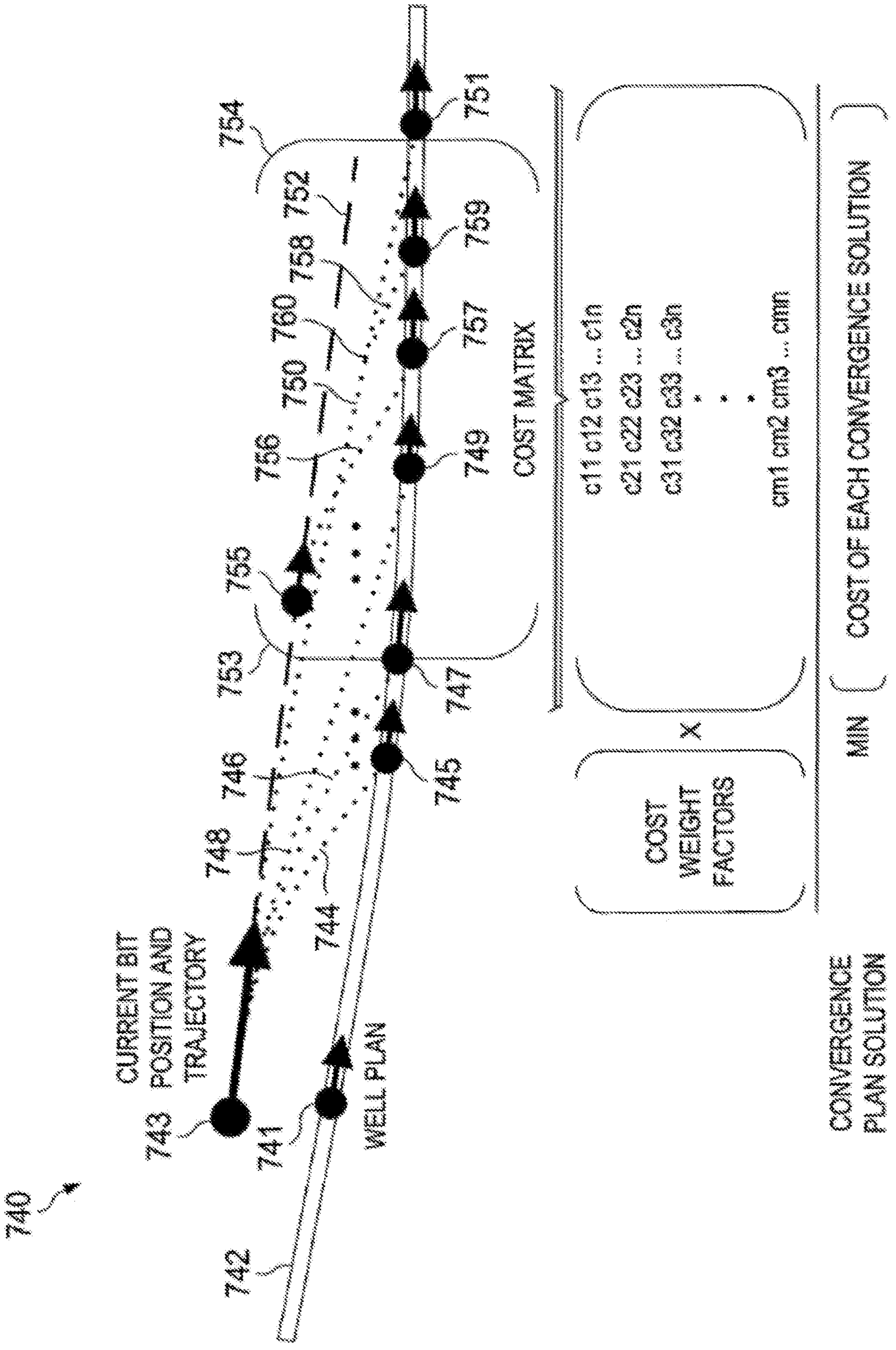
FIG. 7C illustrates one embodiment of a convergence plan diagram with multiple convergence paths.

Referring to FIG. 7B and with additional reference to FIG. 7C, a method 720 (FIG. 7B) and diagram 740 (FIG. 7C) illustrate a more detailed embodiment of the method 600 of FIG. 6, particularly of step 610. As steps 722, 724, 726, and 728 are similar or identical to steps 602, 604, 606, and 608, respectively, of FIG. 6, they are not described in detail in the present embodiment. In the present example, the action of step 610 of FIG. 6 is based on whether the drilling has deviated from the planned path.

In step 730, a comparison may be made to compare the estimated bit position and trajectory with a desired point (e.g., a desired bit position) along the planned path. The estimated bit position may be calculated based on information such as a survey reference point and/or represented as an output calculated by a borehole estimator (as will be described later) and may include a bit projection path and/or point that represents a predicted position of the bit if it continues its current trajectory from the estimated bit position. Such information may be included in the inputs of step 722 and feedback information of step 728 or may be obtained in other ways. It is understood that the estimated bit position and trajectory may not be calculated exactly, but may represent an estimate the current location of the drill bit based on the feedback information. As illustrated in FIG. 7C, the estimated bit position is indicated by arrow 743 relative to the desired bit position 741 along the planned path 742.

In step 732, a determination may be made as to whether the estimated bit position 743 is within a defined margin of error of the desired bit position. If the estimated bit position is within the margin of error, the method 720 returns to step 728. If the estimated bit position is not within the margin of error, the on-site controller 144 calculates a convergence plan in step 734. With reference to FIG. 7C, for purposes of the present example, the estimated bit position 743 is outside of the margin of error.

In some embodiments, a projected bit position (not shown) may also be used. For example, the estimated bit position 743 may be extended via calculations to determine where the bit is projected to be after a certain amount of drilling (e.g., time and/or distance). This information may be used in several ways. If the estimated bit position 743 is outside the margin of error, the projected bit position 743 may indicate that the current bit path will bring the bit within the margin of error without any action being taken. In such a scenario, action may be taken only if it will take too long to reach the projected bit position when a more optimal path is available. If the estimated bit position is inside the margin of error, the projected bit position may be used to determine if the current path is directing the bit away from the planned path. In other words, the projected bit position may be used to proactively detect that the bit is off course before the margin of error is reached. In such a scenario, action may be taken to correct the current path before the margin of error is reached.

The convergence plan identifies a plan by which the bit can be moved from the estimated bit position 743 to the planned path 742. It is noted that the convergence plan may bypass the desired bit position 741 entirely, as the objective is to get the actual drilling path back to the planned path 742 in the most optimal manner. The most optimal manner may be defined by cost, which may represent a financial value, a reliability value, a time value, and/or other values that may be defined for a convergence path.

As illustrated in FIG. 7C, an infinite number of paths may be selected to return the bit to the planned path 742. The paths may begin at the estimated bit position 743 or may begin at other points along a projected path 752 that may be determined by calculating future bit positions based on the current trajectory of the bit from the estimated bit position 752. In the present example, a first path 744 results in locating the bit at a position 745 (e.g., a convergence point). The convergence point 745 is outside of a lower limit 753 defined by a most aggressive possible correction (e.g., a lower limit on a window of correction). This correction represents the most aggressive possible convergence path, which may be limited by such factors as a maximum directional change possible in the convergence path, where any greater directional change creates a dogleg that makes it difficult or impossible to run casing or perform other needed tasks. A second path 746 results in a convergence point 747, which is right at the lower limit 753. A third path 748 results in a convergence point 749, which represents a mid-range convergence point. A third path 750 results in a convergence point 751, which occurs at an upper limit 754 defined by a maximum convergence delay (e.g., an upper limit on the window of correction).

A fourth path 756 may begin at a projected point or bit position 755 that lies along the projected path 752 and result in a convergence point 757, which represents a mid-range convergence point. The path 756 may be used by, for example, delaying a trajectory change until the bit reaches the position 755. Many additional convergence options may be opened up by using projected points for the basis of convergence plans as well as the estimated bit position.

A fifth path 758 may begin at a projected point or bit position 760 that lies along the projected path 750 and result in a convergence point 759. In such an embodiment, different convergence paths may include similar or identical path segments, such as the similar or identical path shared by the convergence points 751 and 759 to the point 760. For example, the point 760 may mark a position on the path 750 where a slide segment begins (or continues from a previous slide segment) for the path 758 and a straight line path segment begins (or continues) for the path 750. The controller 144 may calculate the paths 750 and 758 as two entirely separate paths or may calculate one of the paths as deviating from (e.g., being a child of) the other path. Accordingly, any path may have multiple paths deviating from that path based on, for example, different slide points and slide times.

Each of these paths 744, 746, 748, 750, 756, and 758 may present advantages and disadvantages from a drilling standpoint. For example, one path may be longer and may require more sliding in a relatively soft rock layer, while another path may be shorter but may require more sliding through a much harder rock layer. Accordingly, tradeoffs may be evaluated when selecting one of the convergence plans rather than simply selecting the most direct path for convergence. The tradeoffs may, for example, consider a balance between ROP, total cost, dogleg severity, and reliability. While the number of convergence plans may vary, there may be hundreds or thousands of convergence plans in some embodiments and the tradeoffs may be used to select one of those hundreds or thousands for implementation. The convergence plans from which the final convergence plan is selected may include plans calculated from the estimated bit position 743 as well as plans calculated from one or more projected points along the projected path.

In some embodiments, straight line projections of the convergence point vectors, after correction to the well plan 742, may be evaluated to predict the time and/or distance to the next correction requirement. This evaluation may be used when selecting the lowest total cost option by avoiding multiple corrections where a single more forward thinking option might be optimal. As an example, one of the solutions provided by the convergence planning may result in the most cost effective path to return to the well plan 742, but may result in an almost immediate need for a second correction due to a pending deviation within the well plan. Accordingly, a convergence path that merges the pending deviation with the correction by selecting a convergence point beyond the pending deviation might be selected when considering total well costs.

It is understood that the diagram 740 of FIG. 7C is a two dimensional representation of a three dimensional environment. Accordingly, the illustrated convergence paths in the diagram 740 of FIG. 7C may be three dimensional. In addition, although the illustrated convergence paths all converge with the planned path 742, is it understood that some convergence paths may be calculated that move away from the planned path 742 (although such paths may be rejected). Still other convergence paths may overshoot the actual path 742 and then converge (e.g., if there isn't enough room to build the curve otherwise). Accordingly, many different convergence path structures may be calculated.

Referring again to FIG. 7B, in step 736, the controller 144 produces revised control parameters based on the convergence plan calculated in step 734. In step 738, the revised control parameters may be output. It is understood that the revised control parameters may be provided to get the drill bit back to the planned path 742 and the original control parameters may then be used from that point on (starting at the convergence point). For example, if the convergence plan selected the path 748, the revised control parameters may be used until the bit reaches position 749. Once the bit reaches the position 749, the original control parameters may be used for further drilling. Alternatively, the revised control parameters may incorporate the original control parameters starting at the position 749 or may re-calculate control parameters for the planned path even beyond the point 749. Accordingly, the convergence plan may result in control parameters from the bit position 743 to the position 749, and further control parameters may be reused or calculated depending on the particular implementation of the controller 144.

Figure 8A:
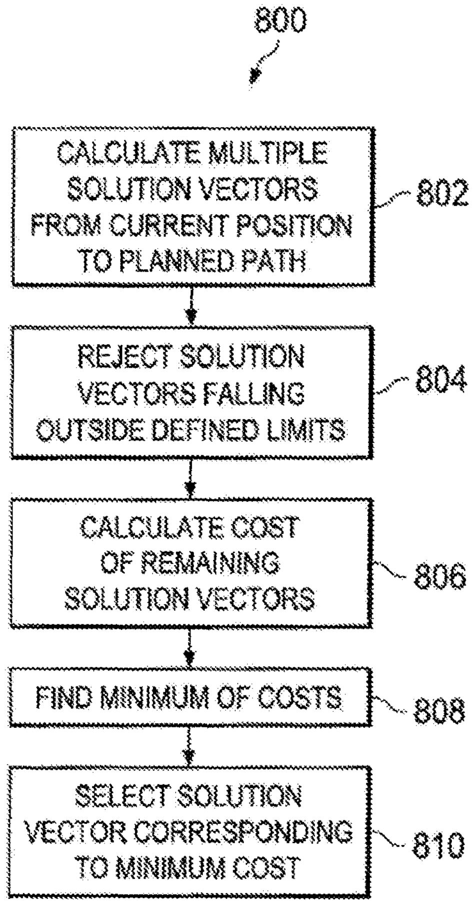
FIG. 8A illustrates a detailed embodiment of a portion of the method of FIG. 7B.

Referring to FIG. 8A, a method 800 illustrates a more detailed embodiment of step 734 of FIG. 7B. It is understood that the convergence plan of step 734 may be calculated in many different ways, and that 800 method provides one possible approach to such a calculation when the goal is to find the lowest cost solution vector. In the present example, cost may include both the financial cost of a solution and the reliability cost of a solution. Other costs, such as time costs, may also be included. For purposes of example, the diagram 740 of FIG. 7C is used.

In step 802, multiple solution vectors are calculated from the current position 743 to the planned path 742. These solution vectors may include the paths 744, 746, 748, and 750. Additional paths (not shown in FIG. 7C) may also be calculated. The number of solution vectors that are calculated may vary depending on various factors. For example, the distance available to build a needed curve to get back to the planned path 742 may vary depending on the current bit location and orientation relative to the planned path. A greater number of solution vectors may be available when there is a greater distance in which to build a curve than for a smaller distance since the smaller distance may require a much more aggressive build rate that excludes lesser build rates that may be used for the greater distance. In other words, the earlier an error is caught, the more possible solution vectors there will generally be due to the greater distance over which the error can be corrected. While the number of solution vectors that are calculated in this step may vary, there may be hundreds or thousands of solution vectors calculated in some embodiments.

In step 804, any solution vectors that fall outside of defined limits are rejected, such as solution vectors that fall outside the lower limit 753 and the upper limit 754. For example, the path 744 would be rejected because the convergence point 745 falls outside of the lower limit 753. It is understood that the path 744 may be rejected for an engineering reason (e.g., the path would require a dogleg of greater than allowed severity) prior to cost considerations, or the engineering reason may be considered a cost.

In step 806, a cost is calculated for each remaining solution vector. As illustrated in FIG. 7C, the costs may be represented as a cost matrix (that may or may not be weighted) with each solution vector having corresponding costs in the cost matrix. In step 808, a minimum of the solution vectors may be taken to identify the lowest cost solution vector. It is understood that the minimum cost is one way of selecting the desired solution vector, and that other ways may be used. Accordingly, step 808 is concerned with selecting an optimal solution vector based on a set of target parameters, which may include one or more of a financial cost, a time cost, a reliability cost, and/or any other factors, such as an engineering cost like dogleg severity, which may be used to narrow the set of solution vectors to the optimal solution vector.

By weighting the costs, the cost matrix can be customized to handle many different cost scenarios and desired results. For example, if time is of primary importance, a time cost may be weighted over financial and reliability costs to ensure that a solution vector that is faster will be selected over other solution vectors that are substantially the same but somewhat slower, even though the other solution vectors may be more beneficial in terms of financial cost and reliability cost. In some embodiments, step 804 may be combined with step 808 and solution vectors falling outside of the limits may be given a cost that ensures they will not be selected. In step 810, the solution vector corresponding to the minimum cost is selected.

Figure 8B:
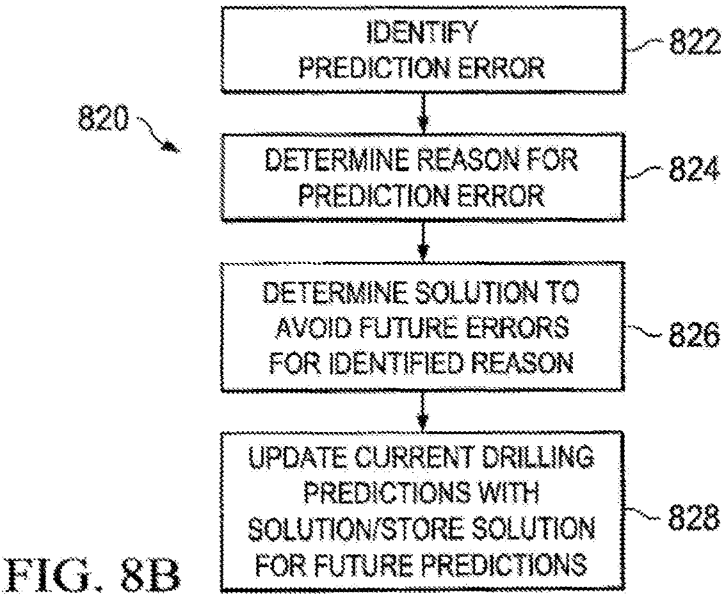
FIG. 8B illustrates a detailed embodiment of a portion of the method of FIG. 6.

Referring to FIG. 8B, a method 820 illustrates one embodiment of an event-based process that may be executed by the controller 144 of FIG. 2A. It is understood that an event may represent many different scenarios in the surface steerable system 201. In the present example, in step 822, an event may occur that indicates that a prediction is not correct based on what has actually occurred. For example, a formation layer is not where it is expected (e.g., too high, or low), a selected bit did not drill as expected, or a selected mud motor did not build curve as expected. The prediction error may be identified by comparing expected results with actual results or by using other detection methods.

In step 824, a reason for the error may be determined as the surface steerable system 201 and its data may provide an environment in which the prediction error can be evaluated. For example, if a bit did not drill as expected the method 820 may examine many different factors, such as whether the rock formation was different than expected, whether the drilling parameters were correct, whether the drilling parameters were correctly entered by the driller, whether another error and/or failure occurred that caused the bit to drill poorly, and whether the bit simply failed to perform. By accessing and analyzing the available data, the reason for the failure may be determined.

In step 826, a solution may be determined for the error. For example, if the rock formation was different than expected, the regional database 128 may be updated with the correct rock information and new drilling parameters may be obtained for the drilling rig 110. Alternatively, the current bit may be tripped and replaced with another bit more suitable for the rock. In step 828, the current drilling predictions (e.g., well plan, build rate, slide estimates) may be updated based on the solution and the solution may be stored in the regional database 128 for use in future predictions. Accordingly, the method 820 may result in benefits for future wells as well as improving current well predictions.

Figure 8C:
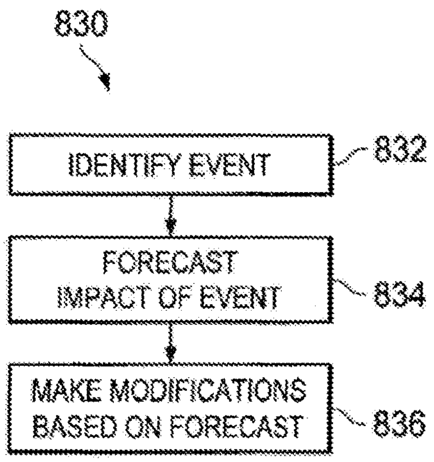
FIG. 8C illustrates a detailed embodiment of a portion of the method of FIG. 6.

Referring to FIG. 8C, a method 830 illustrates one embodiment of an event-based process that may be executed by the controller 144 of FIG. 2A. The method 830 is directed to recalibration forecasting that may be triggered by an event, such as an event detected in step 610 of FIG. 6. It is understood that the recalibration described in this embodiment may not be the same as calculating a convergence plan, although calculating a convergence plan may be part of the recalibration. As an example of a recalibration triggering event, a shift in ROP and/or GAMMA readings may indicate that a formation layer (e.g., the layer 170A of FIG. 1B) is actually twenty feet higher than planned. This will likely impact the well plan, as build rate predictions and other drilling parameters may need to be changed. Accordingly, in step 832, this event is identified.

In step 834, a forecast may be made as to the impact of the event. For example, the surface steerable system 201 may determine whether the projected build rate needed to land the curve can be met based on the twenty foot difference. This determination may include examining the current location of the bit, the projected path, and similar information.

In step 836, modifications may be made based on the forecast. For example, if the projected build rate can be met, then modifications may be made to the drilling parameters to address the formation depth difference, but the modifications may be relatively minor. However, if the projected build rate cannot be met, the surface steerable system 201 may determine how to address the situation by, for example, planning a bit trip to replace the current BHA with a BHA capable of making a new and more aggressive curve.

Such decisions may be automated or may require input or approval by the drilling engineer 302, geologist 304, or other individuals. For example, depending on the distance to the kick off point, the surface steerable system 201 may first stop drilling and then send an alert to an authorized individual, such as the drilling engineer 302 and/or geologist 304. The drilling engineer 302 and geologist 304 may then become involved in planning a solution or may approve of a solution proposed by the surface steerable system 201 (see FIG. 2). In some embodiments, the surface steerable system 201 may automatically implement its calculated solution. Parameters may be set for such automatic implementation measures to ensure that drastic deviations from the original well plan do not occur automatically while allowing the automatic implementation of more minor measures.

It is understood that such recalibration forecasts may be performed based on many different factors and may be triggered by many different events. The forecasting portion of the process is directed to anticipating what changes may be needed due to the recalibration and calculating how such changes may be implemented. Such forecasting provides cost advantages because more options may be available when a problem is detected earlier rather than later. Using the previous example, the earlier the difference in the depth of the layer is identified, the more likely it is that the build rate can be met without changing the BHA.

Figure 8D:
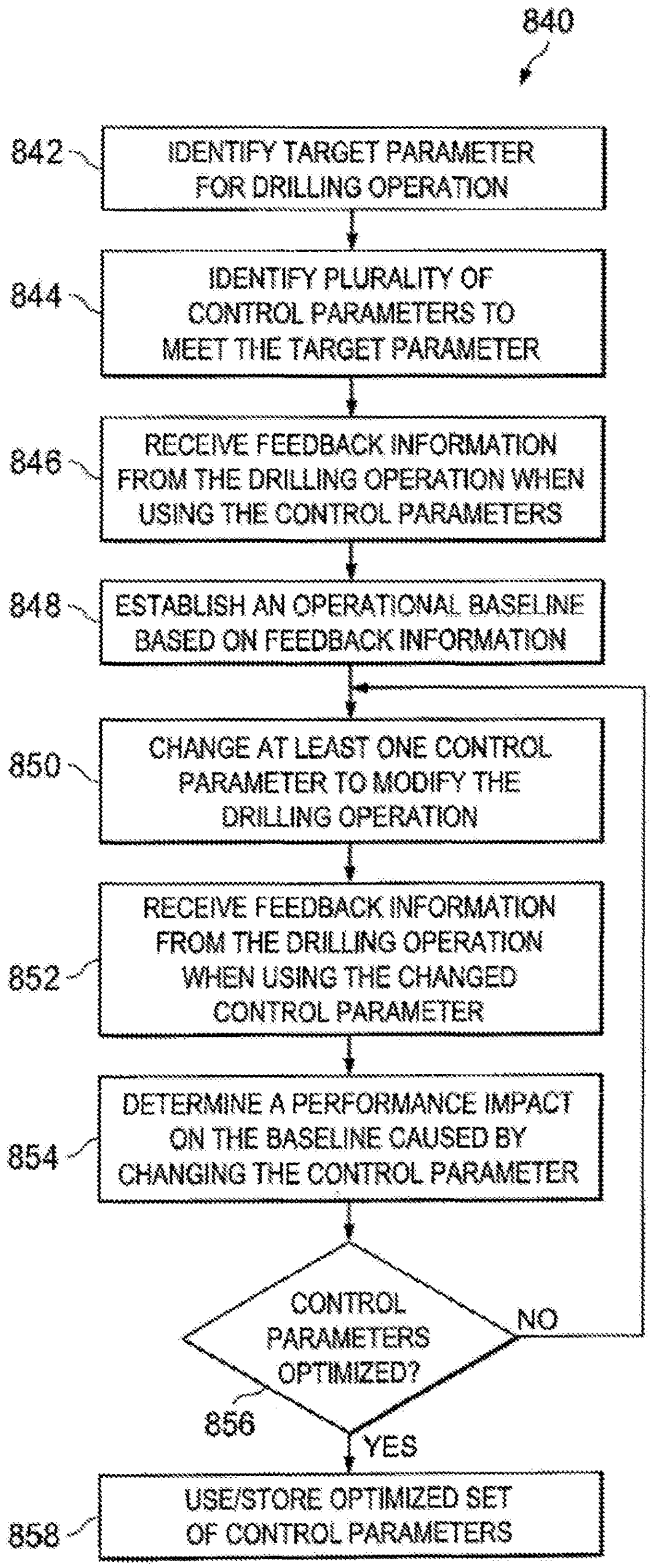
FIG. 8D illustrates a detailed embodiment of a portion of the method of FIG. 6.

Referring to FIG. 8D, a method 840 illustrates one embodiment of an event-based process that may be executed by the controller 144 of FIG. 2A. The method 840 is directed to self-tuning that may be performed by the controller 144 based on factors such as ROP, total cost, and reliability. By self-tuning, the controller 144 may execute a learning process that enables it to optimize the drilling performance of the drilling rig 110. Furthermore, the self-tuning process enables a balance to be reached that provides reliability while also lowering costs. Reliability in drilling operations is often tied to vibration and the problems that vibration can cause, such as stick-slip and whirling. Such vibration issues can damage or destroy equipment and can also result in a very uneven surface in the borehole that can cause other problems such as friction loading of future drilling operations as pipe/casing passes through that area of the borehole. Accordingly, it is desirable to minimize vibration while optimizing performance, since over-correcting for vibration may result in slower drilling than necessary. It is understood that the present optimization may involve a change in any drilling parameter and is not limited to a particular piece of equipment or control system. In other words, parameters across the entire drilling rig 110 and BHA may be changed during the self-tuning process. Furthermore, the optimization process may be applied to production by optimizing well smoothness and other factors affecting production. For example, by minimizing dogleg severity, production may be increased for the lifetime of the well.

Accordingly, in step 842, one or more target parameters are identified. For example, the target parameter may be an MSE of 50 ksi or an ROP of 100 ft./hr that the controller 144 is to establish and maintain. In step 844, a plurality of control parameters are identified for use with the drilling operation. The control parameters are selected to meet the target MSE of 50 ksi or ROP of 100 ft./hr. The drilling operation is started with the control parameters, which may be used until the target MSE or ROP is reached. In step 846, feedback information is received from the drilling operation when the control parameters are being used, so the feedback represents the performance of the drilling operation as controlled by the control parameters. Historical information may also be used in step 846. In step 848, an operational baseline is established based on the feedback information.

In step 850, at least one of the control parameters is changed to modify the drilling operation, although the target MSE or ROP should be maintained. For example, some or all of the control parameters may be associated with a range of values and the value of one or more of the control parameters may be changed. In step 852, more feedback information is received, but this time the feedback reflects the performance of the drilling operation with the changed control parameter. In step 854, a performance impact of the change is determined with respect to the operational baseline. The performance impact may occur in various ways, such as a change in MSE or ROP and/or a change in vibration. In step 856, a determination is made as to whether the control parameters are optimized. If the control parameters are not optimized, the method 840 returns to step 850. If the control parameters are optimized, the method 840 moves to step 858. In step 858, the optimized control parameters are used for the current drilling operation with the target MSE or ROP and stored (e.g., in the regional database 128) for use in later drilling operations and operational analyses. This may include linking formation information to the control parameters in the regional database 128.

Figure 9:
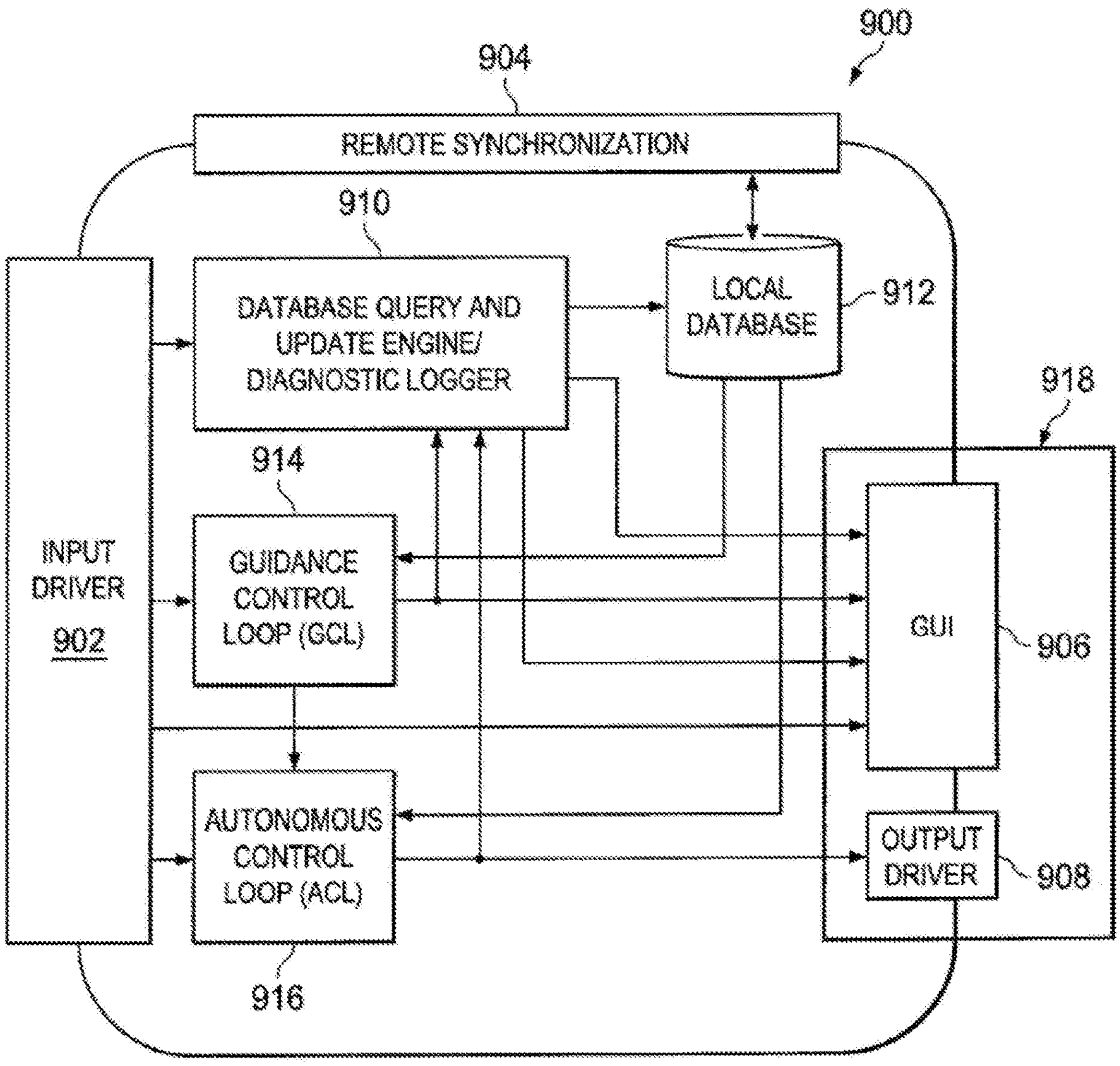
FIG. 9 illustrates one embodiment of a system architecture that may be used for a surface steerable system.

Referring to FIG. 9, one embodiment of a system architecture 900 is illustrated that may be used for the on-site controller 144 of FIG. 1A, which may represent a surface steerable computer system that is capable of automated slide drilling, as disclosed herein. The system architecture 900 includes interfaces configured to interact with external components and internal modules configured to process information. The interfaces may include an input driver 902, a remote synchronization interface 904, and an output interface 918, which may include at least one of a graphical user interface (GUI) 906 and an output driver 908. The internal modules may include a database query and update engine/diagnostic logger 910, a local database 912 (which may be similar or identical to the database 410 of FIG. 4), a guidance control loop (GCL) module 914, and an autonomous control loop (ACL) module 916. It is understood that the system architecture 900 is merely one example of a system architecture that may be used for the controller 144 and the functionality may be provided for the controller 144 using many different architectures. Accordingly, the functionality described herein with respect to particular modules and architecture components may be combined, further separated, and organized in many different ways.

It is understood that the controller 144 may perform certain computations to prevent errors or inaccuracies from accumulating and throwing off calculations. For example, as will be described later, the input driver 902 may receive Wellsite Information Transfer Specification (WITS) input representing absolute pressure, while the controller 144 needs differential pressure and needs an accurate zero point for the differential pressure. Generally, the driller will zero out the differential pressure when the drill string is positioned with the bit off bottom and full pump flow is occurring. However, this may be a relatively sporadic event. Accordingly, the controller 144 may recognize when the bit is off bottom and target flow rate has been achieved and zero out the differential pressure.

Another computation may involve block height, which needs to be calibrated properly. For example, block height may oscillate over a wide range, including distances that may not even be possible for a particular drilling rig. Accordingly, if the reported range is sixty feet to one hundred and fifty feet and there should only be one hundred feet, the controller 144 may assign a zero value to the reported sixty feet and a one hundred foot value to the reported one hundred and fifty feet. Furthermore, during drilling, error gradually accumulates as the cable is shifted and other events occur. The controller 144 may compute its own block height to predict when the next connection occurs and other related events, and may also take into account any error that may be introduced by cable issues.

Referring specifically to FIG. 9, the input driver 902 provides output to the GUI 906, the database query and update engine/diagnostic logger 910, the GCL 914, and the ACL 916. The input driver 902 is configured to receive input for the controller 144. It is understood that the input driver 902 may include the functionality needed to receive various file types, formats, and data streams. The input driver 902 may also be configured to convert formats if needed. Accordingly, the input driver 902 may be configured to provide flexibility to the controller 144 by handling incoming data without the need to change the internal modules. In some embodiments, for purposes of abstraction, the protocol of the data stream can be arbitrary with an input event defined as a single change (e.g., a real time sensor change) of any of the given inputs.

The input driver 902 may receive various types of input, including rig sensor input (e.g., from the sensor system 214 of FIG. 2A), well plan data, and control data (e.g., engineering control parameters). For example, rig sensor input may include hole depth, bit depth, tool face, inclination, azimuth, true vertical depth, gamma count, standpipe pressure, mud flow rate, rotary RPMs, bit speed, ROP, and WOB. The well plan data may include information such as projected starting and ending locations of various geologic layers at vertical depth points along the well plan path, and a planned path of the borehole presented in a three dimensional space. The control data may be used to define maximum operating parameters and other limitations to control drilling speed, limit the amount of deviation permitted from the planned path, define levels of authority (e.g., can an on-site operator make a particular decision or should it be made by an off-site engineer), and similar limitations. The input driver 902 may also handle manual input, such as input entered via a keyboard, a mouse, or a touch screen. In some embodiments, the input driver 902 may also handle wireless signal input, such as from a cell phone, a smart phone, a PDA, a tablet, a laptop, or any other device capable of wirelessly communicating with the controller 144 through a network locally and/or offsite.

The database query and update engine/diagnostic logger 910 receives input from the input driver 902, the GCL 914, and ACL 916, and provides output to the local database 912 and GUI 906. The database query and update engine/diagnostic logger 910 is configured to manage the archiving of data to the local database 912. The database query and update engine/diagnostic logger 910 may also manage some functional requirements of a remote synchronization server (RSS) via the remote synchronization interface 904 for archiving data that will be uploaded and synchronized with a remote database, such as the regional database 128 of FIG. 1A. The database query and update engine/diagnostic logger 910 may also be configured to serve as a diagnostic tool for evaluating algorithm behavior and performance against raw rig data and sensor feedback data.

The local database 912 receives input from the database query and update engine/diagnostic logger 910 and the remote synchronization interface 904, and provides output to the GCL 914, the ACL 916, and the remote synchronization interface 904. It is understood that the local database 912 may be configured in many different ways. As described in previous embodiments, the local database 912 may store both current and historic information representing both the current drilling operation with which the controller 144 is engaged as well as regional information from the regional database 128.

The GCL 914 receives input from the input driver 902 and the local database 912, and provides output to the database query and update engine/diagnostic logger 910, the GUI 906, and the ACL 916. Although not shown, in some embodiments, the GCL 906 may provide output to the output driver 908, which enables the GCL 914 to directly control third party systems and/or interface with the drilling rig alone or with the ACL 916. An embodiment of the GCL 914 is discussed below with respect to FIG. 11.

The ACL 916 receives input from the input driver 902, the local database 912, and the GCL 914, and provides output to the database query and update engine/diagnostic logger 910 and output driver 908. An embodiment of the ACL 916 is discussed below with respect to FIG. 12.

The output interface 918 receives input from the input driver 902, the GCL 914, and the ACL 916. In the present example, the GUI 906 receives input from the input driver 902 and the GCL 914. The GUI 906 may display output on a monitor or other visual indicator. The output driver 908 receives input from the ACL 916 and is configured to provide an interface between the controller 144 and external control systems, such as the control systems 208, 210, and 212 of FIG. 2A.

It is understood that the system architecture 900 of FIG. 9 may be configured in many different ways. For example, various interfaces and modules may be combined or further separated. Accordingly, the system architecture 900 provides one example of how functionality may be structured to provide the controller 144, but the controller 144 is not limited to the illustrated structure of FIG. 9.

Figure 10:
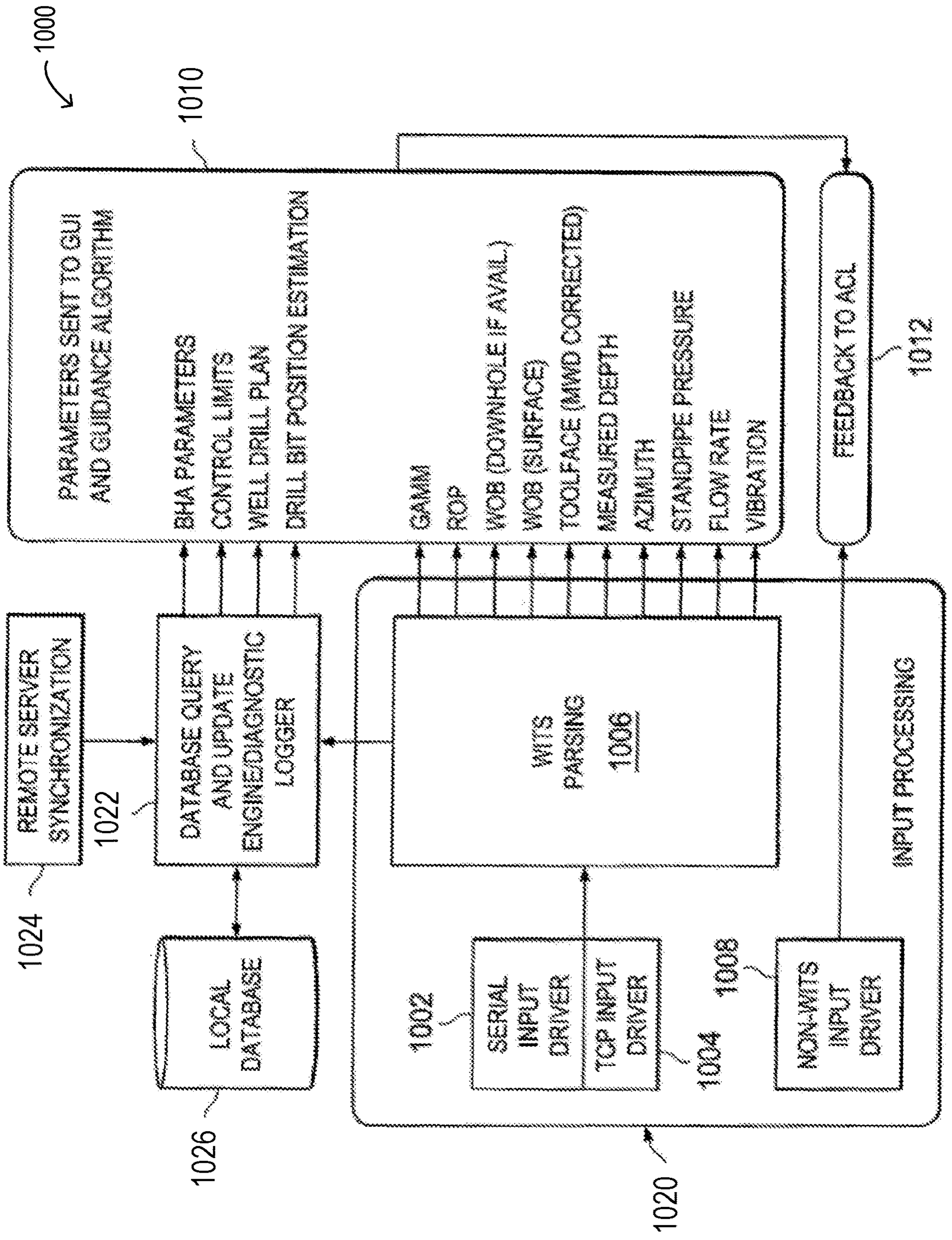
FIG. 10 illustrates one embodiment of a system architecture that may be used for a surface steerable system.

Referring to FIG. 10, one embodiment of a system architecture 1000 is depicted and may include at least some of the elements, or similar analogous elements, as depicted previously with respect to FIG. 9. In particular, system architecture 1000 may include an input driver 1020 that may represent a particular implementation of input driver 902 shown in the system architecture 900 of FIG. 9. In the system architecture 1000, the input driver 1020 may be configured to receive input via different input interfaces, such as a serial input driver 1002 and a Transmission Control Protocol (TCP) driver 1004. Both the serial input driver 1002 and the TCP input driver 1004 may feed into a WITS parser 1006. In the system architecture 1000, a remove server synchronization interface 1024 (similar to remote synchronization interface 904 in FIG. 9) may update a database query and update engine/diagnostic logger 1022, which can access a local database 1026 (similar to local database 912 in FIG. 9).

The WITS parser 1006 in the system architecture 1000 may be configured in accordance with a specification such as WITS and/or using a standard such as Wellsite Information Transfer Standard Markup Language (WITSML). WITS is a specification for the transfer of drilling rig-related data and uses a binary file format. WITS may be replaced or supplemented in some embodiments by WITSML, which relies on extensible Markup Language (XML) for transferring such information. The WITS parser 1006 in input driver 1020 may feed into the database query and update engine/diagnostic logger 1022, which may be similar or analogous to logger 910. Accordingly, the WITS parser 1020 may also output various parameters, shown as block 1010, that may be available to and represent feedback to the GCL 914 and GUI 906 (see FIG. 9). The input driver 1020 may also include a non-WITS input driver 1008 that provides input to the ACL 916 as illustrated by block 1012 that represents feedback to the ACL 916.

Figure 11:
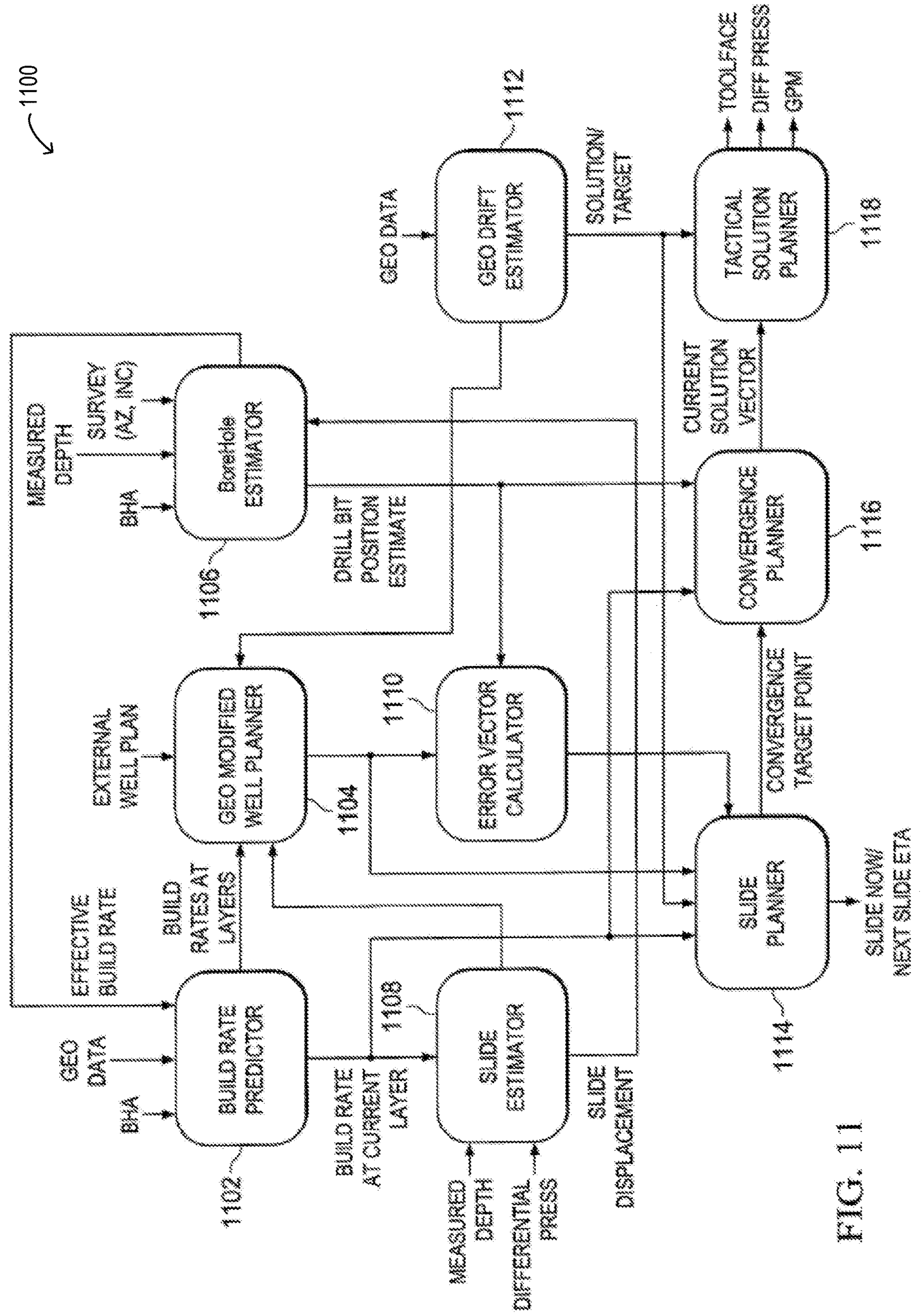
FIG. 11 illustrates one embodiment of a guidance control loop.

Referring to FIG. 11, one embodiment of a GCL 1100 is shown in further detail GCL 1100 in FIG. 11 may represent an embodiment of GCL 914 of FIG. 9. GCL 1100 may include various functional modules, including a build rate predictor 1102, a geo modified well planner 1104, a borehole estimator 1106, a slide estimator 1108, an error vector calculator 1110, a geological drift estimator 1112, a slide planner 1114, a convergence planner 1116, and a tactical solution planner 1118. In the following description of the GCL 1100, the term external input refers to input received from outside the GCL 1100 (e.g., from the input driver 902 of FIG. 9), while internal input refers to input received by a GCL module from another GCL module.

The build rate predictor 1102 may receive external input representing BHA and geological information, receives internal input from the borehole estimator 1106, and provides output to the geo modified well planner 1104, slide estimator 1108, slide planner 1114, and convergence planner 1116. The build rate predictor 1102 is configured to use the BHA and geological information to predict the drilling build rates of current and future sections of a well. For example, the build rate predictor 1102 may determine how aggressively the curve will be built for a given formation with given BHA and other equipment parameters.

The build rate predictor 1102 may use the orientation of the BHA to the formation to determine an angle of attack for formation transitions and build rates within a single layer of a formation. For example, if there is a layer of rock with a layer of sand above it, there is a formation transition from the sand layer to the rock layer. Approaching the rock layer at a ninety degree angle may provide a good face and a clean drill entry, while approaching the rock layer at a forty-five degree angle may build a curve relatively quickly. An angle of approach that is near parallel may cause the bit to skip off the upper surface of the rock layer. Accordingly, the build rate predictor 1102 may calculate BHA orientation to account for formation transitions. Within a single layer, the build rate predictor 1102 may use BHA orientation to account for internal layer characteristics (e.g., grain) to determine build rates for different parts of a layer.

The BHA information may include bit characteristics, mud motor bend setting, stabilization, and mud motor bit to bend distance. The geological information may include formation data such as compressive strength, thicknesses, and depths for formations encountered in the specific drilling location. Such information enables a calculation-based prediction of the build rates and ROP that may be compared to both real-time results (e.g., obtained while drilling the well) and regional historical results (e.g., from the regional database 128) to improve the accuracy of predictions as the drilling progresses. Future formation build rate predictions may be used to plan convergence adjustments and confirm that targets can be achieved with current variables in advance.

The geo modified well planner 1104 may receive external input representing a well plan, internal input from the build rate predictor 1102 and the geo drift estimator 1112, and provides output to the slide planner 1114 and the error vector calculator 1110. The geo modified well planner 1104 uses the input to determine whether there is a more optimal path than that provided by the external well plan while staying within the original well plan error limits. More specifically, the geo modified well planner 1104 takes geological information (e.g., drift) and calculates whether another solution to the target may be more efficient in terms of cost and/or reliability. The outputs of the geo modified well planner 1104 to the slide planner 1114 and the error vector calculator 1110 may be used to calculate an error vector based on the current vector to the newly calculated path and to modify slide predictions.

In some embodiments, the geo modified well planner 1104 (or another module) may provide functionality needed to track a formation trend. For example, in horizontal wells, the geologist 304 may provide the controller 144, which may control surface steerable drilling, with a target inclination that the controller 144 is to attempt to hold. For example, the geologist 304 (see FIG. 3) may provide a target to the directional driller 306 of 90.5-91 degrees of inclination for a section of the well. The geologist 304 may enter this information into the controller 144 and the directional driller 306 may retrieve the information from the controller 144. The geo modified well planner 1104 may then treat the target as a vector target, for example, either by processing the information provided by the geologist 304 to create the vector target or by using a vector target entered by the geologist 304. The geo modified well planner 1104 may accomplish this while remaining within the error limits of the original well plan.

In some embodiments, the geo modified well planner 1104 may be an optional module that is not used unless the well plan is to be modified. For example, if the well plan is marked in the surface steerable system 201 as non-modifiable, the geo modified well planner 1104 may be bypassed altogether or the geo modified well planner 1104 may be configured to pass the well plan through without any changes.

The borehole estimator 1106 may receive external inputs representing BHA information, measured depth information, survey information (e.g., azimuth and inclination), and may provide outputs to the build rate predictor 1102, the error vector calculator 1110, and the convergence planner 1116. The borehole estimator 1106 may be configured to provide a real time or near real time estimate of the actual borehole and drill bit position and trajectory angle. This estimate may use both straight line projections and projections that incorporate sliding. The borehole estimator 1106 may be used to compensate for the fact that a sensor is usually physically located some distance behind the bit (e.g., fifty feet), which makes sensor readings lag the actual bit location by fifty feet. The borehole estimator 1106 may also be used to compensate for the fact that sensor measurements may not be continuous (e.g., a sensor measurement may occur every one hundred feet).

The borehole estimator 1106 may use two techniques to accomplish this. First, the borehole estimator 1106 may provide the most accurate estimate from the surface to the last survey location based on the collection of all survey measurements. Second, the borehole estimator 1106 may take the slide estimate from the slide estimator 1108 (described below) and extend this estimation from the last survey point to the real time drill bit location. Using the combination of these two estimates, the borehole estimator 1106 may provide the on-site controller 144 with an estimate of the drill bit's location and trajectory angle from which guidance and steering solutions can be derived. An additional metric that can be derived from the borehole estimate is the effective build rate that is achieved throughout the drilling process. For example, the borehole estimator 1106 may calculate the current bit position and trajectory 743, as described above with respect to FIG. 7C.

The slide estimator 1108 may receive external inputs representing measured depth and differential pressure information, receives internal input from the build rate predictor 1102, and provides output to the borehole estimator 1106 and the geo modified well planner 1104. The slide estimator 1108, which may operate in real time or near real time, may be configured to sample tool face orientation, differential pressure, measured depth (MD) incremental movement, MSE, and other sensor feedback to quantify/estimate a deviation vector and progress while sliding.

Traditionally, deviation from the slide would be predicted by a human operator based on experience. The operator would, for example, use a long slide cycle to assess what likely was accomplished during the last slide. However, the results are generally not confirmed until the MWD survey sensor point passes the slide portion of the borehole, often resulting in a response lag defined by the distance of the sensor point from the drill bit tip (e.g., approximately fifty feet). This lag introduces inefficiencies in the slide cycles due to over/under correction of the actual path relative to the planned path.

With the slide estimator 1108, each tool face update may be algorithmically merged with the average differential pressure of the period between the previous and current tool faces, as well as the MD change during this period to predict the direction, angular deviation, and MD progress during that period. As an example, the periodic rate may be between ten (10) and sixty (60) seconds per cycle depending on the tool face update rate of the MWD tool. With a more accurate estimation of the slide effectiveness, the sliding efficiency can be improved. The output of the slide estimator 1108 may accordingly be periodically provided to the borehole estimator 1106 for accumulation of well deviation information, as well to the geo modified well planner 1104. Some or all of the output of the slide estimator 1108 may be output via a display, such as shown in the user interface 250 of FIG. 2B.

The error vector calculator 1110 may receive internal input from the geo modified well planner 1104 and the borehole estimator 1106. The error vector calculator 1110 may be configured to compare the planned well path to the actual borehole path and drill bit position estimate. The error vector calculator 1110 may provide the metrics used to determine the error (e.g., how far off) the current drill bit position and trajectory are from the plan. For example, the error vector calculator 1110 may calculate the error between the current bit position and trajectory 743 of FIG. 7C to the planned path 742 and the desired bit position 741. The error vector calculator 1110 may also calculate a projected bit position/projected path representing the future result of a current error as described previously with respect to FIG. 7B.

The geological drift estimator 1112 may receive external input representing geological information and provides outputs to the geo modified well planner 1104, slide planner 1114, and tactical solution planner 1118. During drilling, drift may occur as the particular characteristics of the formation affect the drilling direction. More specifically, there may be a trajectory bias that is contributed by the formation as a function of drilling rate and BHA. The geological drift estimator 1112 is configured to provide a drift estimate as a vector. This vector can then be used to calculate drift compensation parameters that can be used to offset the drift in a control solution.

The slide planner 1114 may receive internal input from the build rate predictor 1102, the geo modified well planner 1104, the error vector calculator 1110, and the geological drift estimator 1112, and provides output to the convergence planner 1116 as well as an estimated time to the next slide. The slide planner 1114 may be configured to evaluate a slide/drill ahead cost equation and plan for sliding activity, which may include factoring in BHA wear, expected build rates of current and expected formations, and the well plan path. During drill ahead, the slide planner 1114 may attempt to forecast an estimated time of the next slide to aid with planning. For example, if additional lubricants (e.g., fluorinated beads) are needed for the next slide and pumping the lubricants into the drill string needs to begin thirty minutes before the slide, the estimated time of the next slide may be calculated and then used to schedule when to start pumping the lubricants.

Functionality for a loss circulation material (LCM) planner may be provided as part of the slide planner 1114 or elsewhere (e.g., as a stand-alone module or as part of another module described herein). The LCM planner functionality may be configured to determine whether additives need to be pumped into the borehole based on indications such as flow-in versus flow-back measurements. For example, if drilling through a porous rock formation, fluid being pumped into the borehole may get lost in the rock formation. To address this issue, the LCM planner may control pumping LCM into the borehole to clog up the holes in the porous rock surrounding the borehole to establish a more closed-loop control system for the fluid.

The slide planner 1114 may also look at the current position relative to the next connection. A connection may happen every ninety to one hundred feet (or some other distance or distance range based on the particulars of the drilling operation) and the slide planner 1114 may avoid planning a slide when close to a connection and/or when the slide would carry through the connection. For example, if the slide planner 1114 is planning a fifty foot slide but only twenty feet remain until the next connection, the slide planner 1114 may calculate the slide starting after the next connection and make any changes to the slide parameters that may be needed to accommodate waiting to slide until after the next connection. Such flexible implementation avoids inefficiencies that may be caused by starting the slide, stopping for the connection, and then having to reorient the tool face before finishing the slide. During slides, the slide planner 1114 may provide some feedback as to the progress of achieving the desired goal of the current slide.

In some embodiments, the slide planner 1114 may account for reactive torque in the drill string. More specifically, when rotating is occurring, there is a reactional torque wind up in the drill string. When the rotating is stopped, the drill string unwinds, which changes tool face orientation and other parameters. When rotating is started again, the drill string starts to wind back up. The slide planner 1114 may account for this reactional torque so that tool face references are maintained rather than stopping rotation and then trying to adjust to an optimal tool face orientation. While not all MWD tools may provide tool face orientation when rotating, using one that does supply such information for the GCL 1100 may significantly reduce the transition time from rotating to sliding.

The convergence planner 1116 receives internal inputs from the build rate predictor 1102, the borehole estimator 1106, and the slide planner 1114, and provides output to the tactical solution planner 1118. The convergence planner 1116 is configured to provide a convergence plan when the current drill bit position is not within a defined margin of error of the planned well path. The convergence plan represents a path from the current drill bit position to an achievable and optimal convergence target point along the planned path. The convergence plan may take account the amount of sliding/drilling ahead that has been planned to take place by the slide planner 1114. The convergence planner 1116 may also use BHA orientation information for angle of attack calculations when determining convergence plans as described above with respect to the build rate predictor 1102. The solution provided by the convergence planner 1116 defines a new trajectory solution for the current position of the drill bit. The solution may be real time, near real time, or future (e.g., planned for implementation at a future time). For example, the convergence planner 1116 may calculate a convergence plan as described previously with respect to FIGS. 7C and 8.

The tactical solution planner 1118 receives internal inputs from the geological drift estimator 1112 and the convergence planner 1116, and provides external outputs representing information such as tool face orientation, differential pressure, and mud flow rate. The tactical solution planner 1118 is configured to take the trajectory solution provided by the convergence planner 1116 and translate the solution into control parameters that can be used to control the drilling rig 110. For example, the tactical solution planner 1118 may take the solution and convert the solution into settings for the control systems 208, 210, and 212 to accomplish the actual drilling based on the solution. The tactical solution planner 1118 may also perform performance optimization as described previously. The performance optimization may apply to optimizing the overall drilling operation as well as optimizing the drilling itself (e.g., how to drill faster).

Other functionality may be provided by the GCL 1100 in additional modules or added to an existing module. For example, there is a relationship between the rotational position of the drill pipe on the surface and the orientation of the downhole tool face. Accordingly, the GCL 1100 may receive information corresponding to the rotational position of the drill pipe on the surface. The GCL 1100 may use this surface positional information to calculate current and desired tool face orientations. These calculations may then be used to define control parameters for adjusting the top drive or Kelly drive (included in drilling equipment 218) to accomplish adjustments to the downhole tool face in order to steer the well.

For purposes of example, an object-oriented software approach may be utilized to provide a class-based structure that may be used with the GCL 1100 and/or other functionality provided by the controller 144. In the present embodiment, a drilling model class is defined to capture and define the drilling state throughout the drilling process. The class may include real-time information. This class may be based on the following components and sub-models: a drill bit model, a borehole model, a rig surface gear model, a mud pump model, a WOB/differential pressure model, a positional/rotary model, an MSE model, an active well plan, and control limits. The class may produce a control output solution and may be executed via a main processing loop that rotates through the various modules of the GCL 1100.

The drill bit model may represent the current position and state of the drill bit. This model includes a three dimensional position, a drill bit trajectory, BHA information, bit speed, and tool face (e.g., orientation information). The three dimensional position may be specified in north-south (NS), east-west (EW), and true vertical depth (TVD). The drill bit trajectory may be specified as an inclination and an azimuth angle. The BHA information may be a set of dimensions defining the active BHA. The borehole model may represent the current path and size of the active borehole. This model includes hole depth information, an array of survey points collected along the borehole path, a gamma log, and borehole diameters. The hole depth information is for the current drilling job. The borehole diameters may represent the diameters of the borehole as drilled over the current drill job.

The rig surface gear model may represent pipe length, block height, and other models, such as the mud pump model, WOB/differential pressure model, positional/rotary model, and MSE model. The mud pump model represents mud pump equipment and includes flow rate, standpipe pressure, and differential pressure. The WOB/differential pressure model represents draw works or other WOB/differential pressure controls and parameters, including WOB. The positional/rotary model represents top drive or other positional/rotary controls and parameters including rotary RPM and spindle position. The active well plan represents the target borehole path and may include an external well plan and a modified well plan. The control limits represent defined parameters that may be set as maximums and/or minimums. For example, control limits may be set for the rotary RPM in the top drive model to limit the maximum RPMs to the defined level. The control output solution may represent the control parameters for the drilling rig 110.

The main processing loop can be handled in many different ways. For example, the main processing loop can run as a single thread in a fixed time loop to handle rig sensor event changes and time propagation. If no rig sensor updates occur between fixed time intervals, a time only propagation may occur. In other embodiments, the main processing loop may be multi-threaded.

Each functional module of the GCL 1100 may have its behavior encapsulated within its own respective class definition. During its processing window, the individual units may have an exclusive portion in time to execute and update the drilling model. For purposes of example, the processing order for the modules may be in the sequence of geo modified well planner 1104, build rate predictor 1102, slide estimator 1108, borehole estimator 1106, error vector calculator 1110, slide planner 1114, convergence planner 1116, geological drift estimator 1112, and tactical solution planner 1118. It is understood that other sequences may be used in different implementations.

Figure 12:
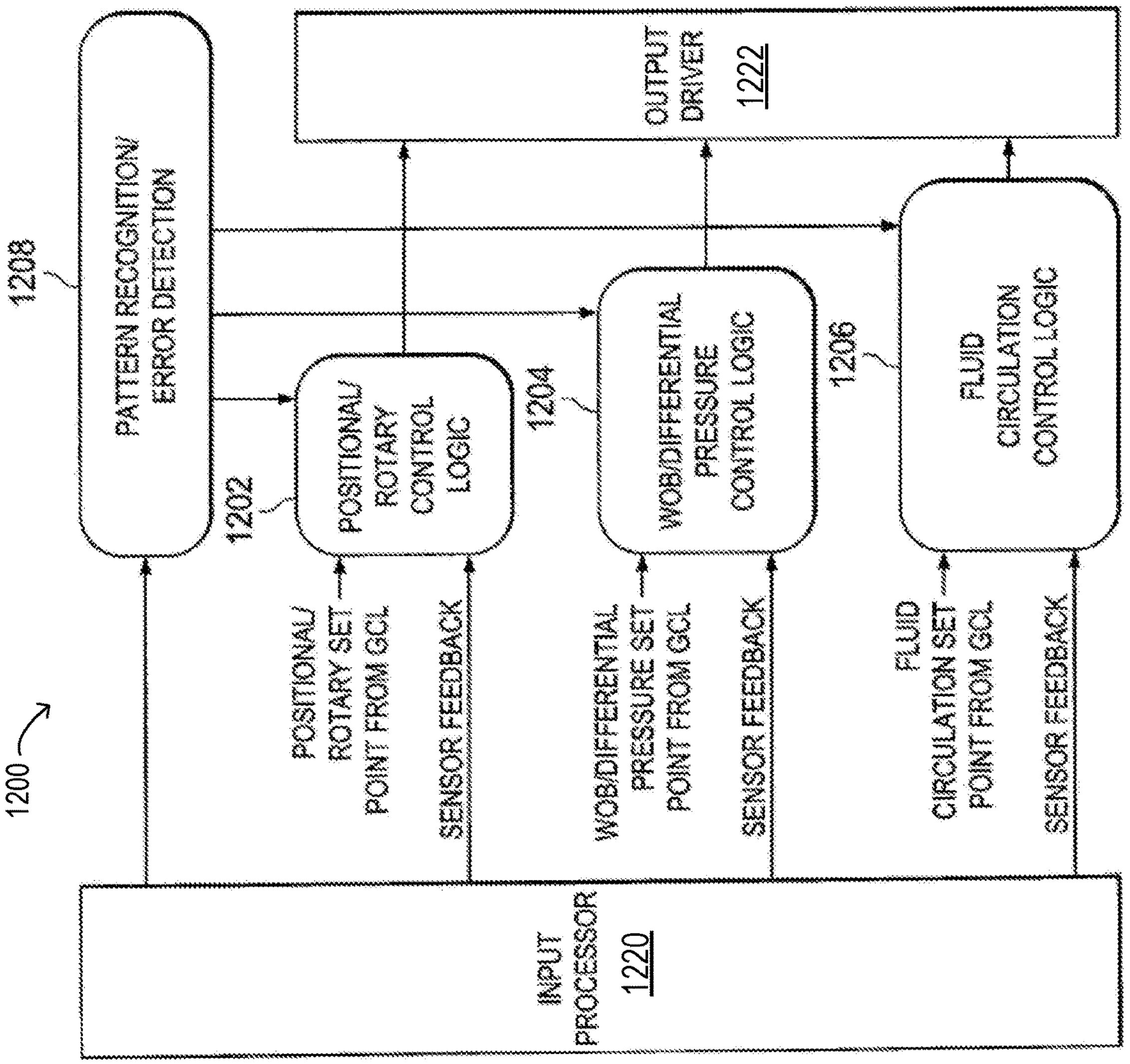
FIG. 12 illustrates one embodiment of an autonomous control loop that may be used with a surface steerable system.

In FIG. 11, the GCL 1100 may rely on a programmable timer module that provides a timing mechanism to provide timer event signals to drive the main processing loop. While the controller 144 may rely purely on timer and date calls driven by the programming environment (e.g., Java® Software, Oracle® Corp.), this would limit timing to be exclusively driven by system time. In situations where it may be advantageous to manipulate the clock (e.g., for evaluation and/or testing), the programmable timer module may be used to alter the time. For example, the programmable timer module may enable a default time set to the system time and a time scale of 1.0, may enable the system time of the controller 144 to be manually set, may enable the time scale relative to the system time to be modified, and/or may enable periodic event time requests scaled to the time scale to be requested. Referring to FIG. 12, one embodiment of an ACL 1200 is shown as a system architecture. In FIG. 12, ACL 1200 may represent an embodiment of ACL 916 shown in FIG. 9. Accordingly, ACL 1200 may include an input processor 1220 that may be similar or analogous to input driver 902, and an output driver 1222, which may be similar or analogous to output interface 918. As shown, ACL 1200 may represent various different functionality associated with the controller 144, such as software or code executable by the controller 144 that implements the functionality in ACL 1200. The ACL 1200 may represent a second feedback control loop that operates in conjunction with a first feedback control loop provided by the GCL 914 or GCL 1100 described above. The ACL 1200 may also provide actual instructions to the drilling rig 110, either directly to the drilling equipment 218 or via the control systems 208, 210, and 212. The ACL 1200 may include a positional/rotary control logic block 1202, a WOB/differential pressure control logic block 1204, a fluid circulation control logic block 1206, and a pattern recognition/error detection block 1208.

One function of the ACL 1200 is to establish and maintain a target parameter (e.g., an ROP of a defined value of ft./hr), such as based on input from the GCL 1100. The regulation of the target parameter may be accomplished via control loops using at least one of the positional/rotary control logic block 1202, the WOB/differential pressure control logic block 1204, and the fluid circulation control logic block 1206. The positional/rotary control logic block 1202 may receive sensor feedback information from the input processor 1220 and set point information from the GCL 1100 (e.g., from the tactical solution planner 1118). The differential pressure control logic block 1204 may receive sensor feedback information from the input processor 1220 and set point information from the GCL 1100 (e.g., from the tactical solution planner 1118). The fluid circulation control logic block 1206 may receive sensor feedback information from the input processor 1220 and set point information from the GCL 1100 (e.g., from the tactical solution planner 1118).

The ACL 1200 may use the sensor feedback information and the set points from the GCL 1100 to attempt to maintain the established target parameter. More specifically, the ACL 1200 may have control over various parameters via the positional/rotary control logic block 1202, the WOB/differential pressure control logic block 1204, and the fluid circulation control logic block 1206, and may modulate the various parameters to achieve the target parameter. The ACL 1200 may also modulate the parameters in light of cost-driven and reliability-driven drilling goals, which may include parameters such as a trajectory goal, a cost goal, and/or a performance goal. It is understood that the parameters may be limited (e.g., by control limits set by the drilling engineer 306) and the ACL 1200 may vary the parameters to achieve the target parameter without exceeding the defined limits. If this is not possible, the ACL 1200 may notify the on-site controller 144 or otherwise indicate that the target parameter is currently unachievable.

In some embodiments, the ACL 1200 in FIG. 12 may continue to modify the parameters to identify an optimal set of parameters with which to achieve the target parameter for the particular combination of drilling equipment and formation characteristics. In such embodiments, the controller 144 may export the optimal set of parameters to the regional database 128 for use in formulating drilling plans for other drilling projects.

Another function of the ACL 1200 is error detection. Error detection is directed to identifying problems in the current drilling process and may monitor for sudden failures and gradual failures. In this capacity, the pattern recognition/error detection block 1208 may receive input from the input processor 1220. The input may include the sensor feedback received by the positional/rotary control logic block 1202, the WOB/differential pressure control logic block 1204, and the fluid circulation control logic block 1206. The pattern recognition/error detection block 1208 may monitor the input information for indications that a failure has occurred or for sudden changes that are illogical.

For example, a failure may be indicated by an ROP shift, a radical change in build rate, or any other significant changes. As an illustration, assume the drilling is occurring with an expected ROP of 100 ft./hr. If the ROP suddenly drops to 50 ft./hr with no change in parameters and remains there for some defined amount of time, the sudden change in ROP may be indicative of an equipment failure, formation shift, or another event. Another error may be indicated when MWD sensor feedback has been steadily indicating that drilling has been heading north for hours and the sensor feedback suddenly indicates that drilling has reversed in a few feet and is heading south. Such a change in sensor feedback may be an indication that a failure has occurred. Certain parameter or sensor value changes may be predefined, or the pattern recognition/error detection block 1208 may be configured to watch for deviations of a certain magnitude. The pattern recognition/error detection block 1208 may also be configured to detect deviations that occur over a period of time in order to catch more gradual failures or safety concerns, such as a slight drift of a given value.

When an error is identified based on a significant shift in input values, the controller 114 may send an alert. The alert may enable an individual to review the error and determine whether action needs to be taken. For example, if an error indicates that there is a significant loss of ROP and an intermittent change/rise in pressure, the individual may determine that mud motor chunking has likely occurred with rubber tearing off and plugging the bit. In this case, the BHA may be tripped, and the damage repaired before more serious damage is done. Accordingly, the error detection may be used to identify potential issues that occur before the issues become more serious and more costly to repair.

Another function of the ACL 1200 in FIG. 12 is pattern recognition. Pattern recognition may identify safety concerns for rig workers and may provide warnings (e.g., if a large increase in pressure is identified, personnel safety may be compromised) and also may identify problems that are not necessarily related to the current drilling process, but may impact the drilling process if ignored. In this capacity, the pattern recognition/error detection block 1208 may receive input from the input driver 902. The input may include the sensor feedback received by the positional/rotary control logic block 1202, the WOB/differential pressure control logic block 1204, and the fluid circulation control logic block 1206. The pattern recognition/error detection block 1208 may monitor the input information for specific defined conditions. A condition may be relatively common (e.g., may occur multiple times in a single borehole) or may be relatively rare (e.g., may occur once every two years). Differential pressure, standpipe pressure, and any other desired conditions may be monitored. If a condition indicates a particular recognized pattern, the ACL 1200 may determine how the condition is to be addressed. For example, if a pressure spike is detected, the ACL 1200 may determine that the drilling needs to be stopped in a specific manner to enable a safe exit. Accordingly, while error detection may simply indicate that a problem has occurred, pattern recognition is directed to identifying future problems and attempting to provide a solution to the problem before the problem occurs or becomes more serious.

Figure 13:
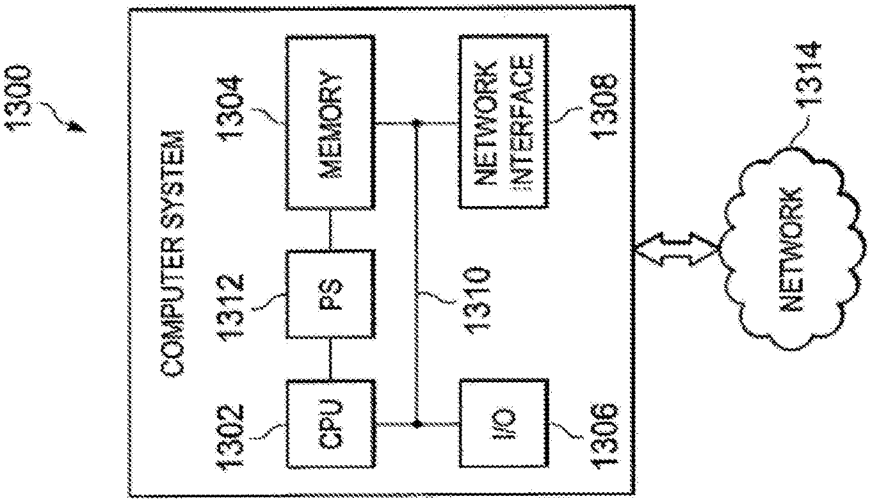
FIG. 13 illustrates one embodiment of a computer system that may be used with a surface steerable system.

Referring to FIG. 13, one embodiment of a computer system 1300 is illustrated. The computer system 1300 may be one possible example of a system component or device such as the on-site controller 144 of FIG. 1A. In scenarios where the computer system 1300 is on-site, such as at the location of the drilling rig 110 of FIG. 1A, the computer system may be contained in a relatively rugged, shock-resistant case that is hardened for industrial applications and harsh environments.

The computer system 1300 may include a central processing unit ("CPU") 1302, a memory unit 1304, an input/output ("I/O") device 1306, and a network interface 1308. The components 1302, 1304, 1306, and 1308 are interconnected by a transport system (e.g., a bus) 1310. A power supply (PS) 1312 may provide power to components of the computer system 1300, such as the CPU 1302 and memory unit 1304. It is understood that the computer system 1300 may be differently configured and that each of the listed components may actually represent several different components. For example, the CPU 1302 may actually represent a multi-processor or a distributed processing system; the memory unit 1304 may include different levels of cache memory, main memory, hard disks, and remote storage locations; the I/O device 1306 may include monitors, keyboards, and the like; and the network interface 1308 may include one or more network cards providing one or more wired and/or wireless connections to a network 1314. Therefore, a wide range of flexibility is anticipated in the configuration of the computer system 1300.

The computer system 1300 may use any operating system (or multiple operating systems), including various versions of operating systems provided by Microsoft (such as WINDOWS), Apple (such as Mac OS X), UNIX, and LINUX, and may include operating systems specifically developed for handheld devices, personal computers, and servers depending on the use of the computer system 1300. The operating system, as well as other instructions (e.g., software instructions for performing the functionality described in previous embodiments) may be stored in the memory unit 1304 and executed by the processor 1302. For example, if the computer system 1300 is the controller 144, the memory unit 1304 may include instructions (not shown in FIG. 13) for performing methods such as the method 600 of FIG. 6, the method 700 of FIG. 7A, the method 720 of FIG. 7B, the method 800 of FIG. 8A, the method 820 of FIG. 8B, the method 830 of FIG. 8C, the method 840 of FIG. 8D. If the computer system 1300 is ASDS 4210 (see FIG. 42), the memory unit 1304 may include instructions (not shown in FIG. 13) for performing methods such as the method 2100 of FIG. 21, the methods 2200 and 2201 of FIG. 22, the method 2300 of FIG. 23, the method 2400 of FIG. 24, the method 2500 of FIG. 25, the method 2600 of FIG. 26, the method 2700 of FIG. 27, the method 2800 of FIG. 28, the method 2900 of FIG. 29, the method 3000 of FIG. 30, the method 3100 of FIG. 31, the method 3200 of FIG. 32, the method 3300 of FIG. 33, the method 3400 of FIG. 34, the method 3600 of FIG. 36A, the method 3601 of FIG. 36B, the methods of FIGS. 37 and 38, the method 4000 of FIG. 40A, and the method 4001 of FIG. 40B.

Figure 14:
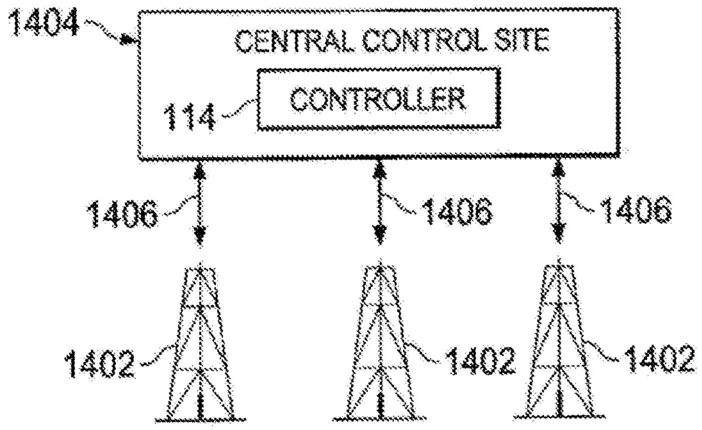
FIG. 14 illustrates one embodiment of a controller for a surface steerable system located at a central control location for operation with multiple drilling rigs.

Referring now to FIG. 14, there is illustrated an embodiment wherein the controller 114 rather than being located at the drilling rig 1402 is located at a central control site 1404. The controller 114 can be located at the central control site 1404 to multiple drilling rigs 1402 via various types of communication links 1406. Use of the controller 114 at a central control site 1404 allows for centralization of control and data storage functions at a single location to enable more cost effective control of the drilling process.

Oil and gas wells may be drilled directionally for several purposes. An oil or gas well that is directional may follow a specific path that begins at the rotary table of the rig to intersect particular geological targets underground, and may be directional drilled for various use cases. Directional drilling may be used for drilling horizontally into shale or other formations (often referred to as an "unconventional well"). Directional drilling may be used for increasing an exposed section of a conventional reservoir by drilling through the reservoir at an angle. Directional drilling may enable drilling into the reservoir where vertical access is difficult or not possible (e.g., to reach an oilfield under a town, under a lake, or underneath a difficult-to-drill formation). Directional drilling may allow more wellheads to be grouped together on one surface location leading to fewer rig moves, less surface area disturbance, and wells that are easier and cheaper to complete and produce. For instance, on an oil platform or jack-up rig offshore, 40 or more wells can be grouped together. The wells paths may fan out from the platform into a subterranean reservoir. The use of multiple wellheads grouped together is being applied to land wells, allowing multiple subsurface locations to be reached from one pad, which can reduce costs. Directional drilling may be performed along the underside of a reservoir-constraining fault to allow multiple productive sands to be completed at the highest stratigraphic points. Directional drilling may be used for a so-called "relief well" to relieve the pressure of a well producing without restraint (i.e., a "blowout"), such as when the relief well is a second well that can be drilled starting from at a safe distance away from the blowout, in order to intersect the wellbore of the blowout well. Then, a heavy fluid (i.e., a kill fluid) may be pumped into the relief well to suppress the high pressure in the blowout wellbore.

As will be described in further detail below, an automated slide drilling system is disclosed that can perform directional drilling with little or no user input during drilling.

Oil and gas well drillers (referring to the role of a human operator) are typically provided with a well plan (also referred to as a well path, a drilling plan, a drilling path, or a steering plan) to follow that may be predetermined by engineers and geologists before drilling commences on a planned well. In many instances, the well plan may define individual zones or intervals along the planned well, and may include tracking information for drilling progress, such as formation targets, markers, survey data, and certain measurements. For example, during the drilling of the planned well, periodic surveys associated with a current drilling location may be taken with a downhole instrument to provide survey data (such as an inclination angle and an azimuth angle) of the well bore at various intervals. The intervals may be between 30-500 feet (10-150 meters) or at another distance, such as specified by federal and state regulations. A common survey interval during the drilling of curves and lateral sections may be 90 feet (30 meters), while distances of 200-300 feet (60-100 meters) may be typically used during the drilling of vertical portions of the planned well.

As the name implies, directional drilling is enabled by controlling a direction of (also referred to as "steering") the drilling of the well. Directional drilling is enabled by a BHA that utilizes a downhole mud motor driven by the hydraulic power of drilling mud that is circulated down the drill string. The drill string may use a bent-sub to drill in a direction other than straight ahead. The use of the bent-sub and downhole mud motor allows a driller (also referred to as a "directional driller" when using the mud motor) to "steer" the wellbore trajectory to follow a specific well plan.

It should be noted that a well plan may change while the well is being drilled. In addition, the use of a bent-sub for slide drilling may allow for drilling in a particular direction, such as to correct an error, avoid a potential problem, or to mitigate an existing problem. For example, it may be that an unanticipated fault is encountered that places the target formation higher or lower than expected and as set forth in the original well plan. A correction to the wellbore trajectory may be desired to place the wellbore in the target formation. Similarly, it may be that drilling through a particular formation should be done at a higher or lower angle (relative to the formation) than initially planned in the well plan in order to avoid having a bit stuck in an undesired formation or to avoid missing a nearby target formation.

Drilling directionally (for example, by using a mud motor with a bent-sub or similar equipment) may involve occasionally stopping rotation of the drill pipe and then "slide drilling" (also referred to as "sliding"). Slide drilling may include orienting the bent-sub in a specific orientation and then drilling with the mud motor only (without rotation of the drill pipe driven by a top drive located at the surface). As the mud motor cuts a directional path in a specific orientation (usually given in degrees per 100 feet or in degrees per 30 meters), the wellbore trajectory deviates according to the curved path. Slide drilling can be difficult in some formations, and may often be slower and, therefore, more expensive than rotary drilling.

In conventional slide drilling, the role of the directional driller (referring to a human operator) typically includes analyzing data in order to make crucial and time-dependent decisions, such as when to rotationally drill and when to slide drill (including which tool face orientation to use when slide drilling), with an overall goal of hitting the specified targets in the well plan.

One important directional drilling problem that has been identified for unconventional wells is the inability to consistently follow a prescribed well path, and to hit targets while staying within the specified variances identified in the well plan. It has been observed that two primary limitations often contribute to the problem of consistent and accurate steering: in order to follow the prescribed path in the well plan, it is within the purview of the directional driller to determine a) when to begin slide drilling; and b) at which orientation to align the tool face for slide drilling. When making these decisions, directional drillers are faced with a wide array of parameters, variable factors and often unable to properly compensate for multiple parameters including variations in rotary walk and build, effective formation stresses, BHA dynamics, deflections, BHA potential, along with other factors such as hydrocarbon production potential related to drilling accuracy, lease boundaries, and tortuosity risks. In some cases, there may be so many rapidly changing variables for the directional driller to consider and react to in real-time, that the normal cognitive capabilities of a human operator become overstretched and are unable to keep up with the extensive information flow.

Once the decision has been made about when to slide and when to rotate, a driller performing conventional slide drilling may then control the drilling rig to execute the slide. Due to the lack of an industry standard of how to perform a slide, an inexperienced driller executing the slide may face a high risk of performing non-optimal slides, such as slides lacking in precision and in accuracy. The execution of non-optimal slides may lead to degraded borehole quality, longer durations in slide execution time, and poor accuracy. These errors may typically be due to the directional driller following one particular slide approach, or style, which may not be equally successful in each and every well. Over time and with more experience, directional drillers may adapt their approach, which may lead to higher quality boreholes and more consistent completion times, as the driller gains a blend of downhole knowledge and prior geographically-based experience with particular formations. The reasons for variances in the slide process can be attributed to at least some of the following factors: a) certain regions or formations may react differently when sliding through them; b) different BHAs may vary in their slide characteristics; c) physical forces and reactions while sliding may differ based on depth and well geometry; and d) an optimal approach may involve a challenging balance of ROP performance and directional control.

Even though experience with slide drilling may improve performance, even the most successful directional drillers are still a) working with limited information and b) have limited situational awareness during the course of slide drilling that may decrease the chances for optimal sliding.

At least some of these problems can be solved with the MOTIVE Directional Drilling Bit Guidance System (BGS), the industry's first use of cognitive computing to guide the directional drilling process, for example, to overcome the lack of information provided to the driller. The BGS has been successfully tested while guiding over three and a half million feet of directional and horizontal drilling to successfully determine rotate and slide start and stop depths along with setting and maintaining a targeted tool face orientation when sliding. When followed by a skilled driller, the algorithm-driven BGS system can improve the driller's ability to accurately position the bit, reduce the average drilling time, reduce tortuosity, and increase the hydrocarbon production potential of the completed well, which are desirable economic results.

As previously stated, due to the uncertainty of how to perform a slide, an inexperienced driller executing the slide may have a high risk of performing non-optimal slides (lacking in precision and in accuracy). Also, slides performed by an experienced driller may be subject to additional improvement.

In order to improve the consistency, accuracy, speed, and quality of sliding, an automated slide drilling system, as disclosed herein, may be used to perform slide drilling. The automated slide drilling system disclosed herein for drilling rigs may analyze a variety of data inputs and control the rig equipment (e.g., top drive, draw works, etc.) to continuously adjust the orientation, or tool face of the BHA before and during a slide.

The automated slide drilling system may be a dedicated sliding system which is operated separately and apart from any automated rotational drilling systems. Since the driller has responsibilities for both sliding and rotating intervals, keeping the automated slide drilling system contextually centered on sliding avoids confusion and responsibility overlap with rotational drilling that may introduce risk or confusion, which is undesirable.

It will be appreciated that the automated slide drilling systems and methods described and disclosed herein can be useful and can be implemented at various levels of automation, such as in accordance with various levels the Sheridan-Verplanck 10 levels of automation. In other words, at least the following levels of automation may be used in accordance with the present disclosure:

1. The automated slide drilling controller offers a set of alternatives which the human operator may ignore in making decision.
2. The automated slide drilling controller offers a restricted set of alternatives, and the human operator decides which to implement.
3. The automated slide drilling controller offers a restricted set of alternatives and suggests one, but the human operator still makes and implements final decision.
4. The automated slide drilling controller offers a restricted set of alternatives and suggests one, which it will implement if the human operator approves.
5. The automated slide drilling controller makes a decision but gives the human operator an option to veto prior to implementation.
6. The automated slide drilling controller makes and implements a decision, but must inform the human operator after the fact.
7. The automated slide drilling controller makes and implements a decision, and informs the human operator only when asked to.
8. The automated slide drilling controller makes and implements a decision, and sends a notice to the human operator only if the notice is determined to be warranted (i.e., only certain elevated alarms are reported).
9. The automated slide drilling controller makes and implements a decision if the decision is determined to be warranted, and sends a notice to the human operator only if the notice is determined to be warranted.

In one embodiment, an auto slide refers to the completion of some or all the following steps by a drilling rig system in drilling a well: (i) automatically (i.e., without further user input) determine that the drilling rig should enter slide mode; (ii) automatically enter slide mode directly from rotary drilling operations or after a connection of a pipe to the drill string has been made, based on a software recommendation; (iii) automatically establish the correct torque in the drill string based on a software recommendation; (iv) automatically engage the bottom of the wellbore with the drill bit; (v) automatically determine and achieve a target tool face; (vi) control the slide drilling until the slide is completed; and (vii) automatically resume rotary drilling or prepare for a survey at the end of the current drill pipe stand. Various embodiments of systems and methods useful for performing automated slide drilling of a well are described in more detail below.

In another embodiment, a drilling rig system may be provided, which is operable to provide auto slide drilling methods, and which may comprise: a drilling rig, a drill string coupled to said drilling rig, a drill bit coupled to a first end of said drill string, a computer system having a processor, memory, and instructions stored on said memory capable of execution with the processor, wherein said instructions comprise instructions for performing any one or more of the following steps: (i) automatically determining that a drilling rig should enter a slide drilling mode; (ii) automatically enter the slide drilling mode directly either from rotary drilling operations or after a connection to a pipe in the drill string has been made, based on a software recommendation; (iii) automatically establishing a determined torque value in a drill string coupled to the drilling rig based on a software recommendation; (iv) automatically engaging a bottom of the wellbore with a drill bit attached at one end of the drill string; (v) automatically determining and achieving a determined tool face for a slide drilling operation; (vi) controlling the slide drilling mode until the computer system determines that the determined slide is completed; (vii) automatically resuming rotary drilling mode or preparing for a survey at an upcoming end of a current drill pipe stand.

As noted above, during conventional slide drilling operations, the human operator performs the control and regulation and bases decisions on the system inputs and their own personal training, experience, and skill. Such persons are usually known as directional drillers. Due to human nature, manual control may result in somewhat of an inconsistent control result because of reliance on the level of personal experience and skill of the particular directional driller, which varies from person to person.

In one example, a general operational process for manual slide drilling is as follows: a directional driller is provided with a predefined well path to follow, and is tasked with following the well plan as closely as possible. The directional driller orients the drill bit tool face to the desired magnetic or gravity-referenced orientation and begins slide drilling (or sliding). While sliding, the downhole telemetry equipment may relay information regarding the position and orientation of the drill bit to the surface. If the drill bit varies away from the desired well path, the directional driller can make an adjustment of the tool face orientation to correct for the deviation. In addition to correcting for well path deviations, the directional driller can also implement a drill string oscillation routine that may help to reduce downhole friction in the wellbore. The directional driller can set the top drive to rotate a certain number of degrees in one direction, return to center, rotate a certain number of degrees the opposite direction, return to center, and repeat this process until the directional driller decides to stop. The directional driller may also utilize many other types of information to control conventional slide drilling operations, such as, but not limited to, rate of penetration (ROP), pressure differential (ΔP), weight on bit (WOB), pump strokes per minute, among others. All this information may be utilized to keep the drill bit as close to the desired well path as possible and to perform slide drilling as quickly and consistently as possible.

The automated slide drilling system disclosed herein may implement a hands off, closed-loop control system for slide drilling from when the automated slide drilling operation is initiated until when the automated slide drilling system hands drilling control back over to the driller (i.e. a human operator), for example, to re-initiate rotary drilling operations. Some or all of the downhole and rig-based telemetry measurements discussed above can be measured in real time and input or provided to the automated slide drilling system and can be utilized to calculate ideal outputs for other the rig control system set points, including set points for WOB, ROP, ΔP, pump strokes per minute, and tool face orientation, among others.

The automated slide drilling system at the surface can receive downhole telemetry information regarding actual bit position. The automated slide drilling system can compare the actual bit position information to the anticipated bit position and determine if there has been a deviation from the desired well path. When a deviation is calculated, the control system can determine a course correction route back to the desired well path and adjust the rig system set points, e.g. tool face orientation and WOB, to implement the desired course adjustment. The course adjustment can be implemented through the rig control system and the top drive by rotating the drill string in the desired direction to build torque. Once the torque overcomes the downhole friction and reaches the BHA, the tool face can be rotated to the new desired set point. It will be appreciated that the torque that overcomes the downhole friction can originate from the surface as noted above, but torque to obtain this result may also be obtained by increasing the WOB or the differential pressure to create downhole reactional torque to accomplish the same result.

The automated slide drilling system can also receive downhole telemetry information regarding tool face orientation. The automated slide drilling system can continuously monitor the received tool face orientation for comparison to the target tool face (i.e., the desired set point for the tool face orientation). If a deviation from the desired set point is identified, automated slide drilling system can calculate the required adjustment and output a new set point to reflect the desired change in tool face orientation. The automated slide drilling system also can implement a drill string oscillation routine to reduce the downhole friction between the wellbore and the drill string. For example, the automated slide drilling system can set the top drive to rotate a certain number of degrees in one direction, return to center, rotate a certain number of degrees in the opposite direction, return to center, and repeat this process until the automated slide drilling system indicates that the oscillation of the top drive is to stop.

In one embodiment, a tunable approach to automatic slide optimization can be used, and this tunable approach can also be used in conjunction with machine learning. The tunable approach can allow a variety of physical factors regarding the automated slide drilling system, the rig, the formation, the well, and the like to be considered, as well as allowing a variety of economic, performance, and risk-driven factors to be considered. The tunable approach can also allow an operator to set and reset, and otherwise adjust how the automated slide drilling system accounts for the various factors and preferences that might apply, which can be adjusted as the well is being drilled. Moreover, the tunable approach may allow such factors to be adjusted in real time and during drilling operations, as desired. For example, tunable approach may allow a human operator to adjust the manner in which the control system responds to various inputs by adjusting the inputs for various rigs, formations, or drilling preferences. In one example, the automated slide drilling system may dynamically handle slide drilling differently when the slide drilling occurs in different well zones.

Referring again now to the drawings, FIGS. 15-18 illustrate examples of user interfaces for various factors which may allow a user to adjust various parameters for a given zone of a given well to allow the automated slide drilling system to wholly or partially automate the slide drilling process. The parameters displayed in the user interfaces depicted in FIGS. 15-18 can also be used to determine and select other parameters, such as for the top drive of the drilling rig system. As shown in FIGS. 15-18, the various factors or variables can be adjusted by an operator using a series of sliders, such as in response to the operator viewing the sliders in on a display with appropriate labels and ranges/values like those shown in FIGS. 15-18. It will be appreciated that the sliders can be displayed on a touch screen such that the operator can move the sliders to adjust the factors as used by the automated slide drilling system, and that the sliders can appear analog in nature (i.e., no preset points, such as allowing continuous numeric values from 0 to 10), or may have preset values (such as 1, 2, 3, 4, and 5) that are predetermined. It should also be appreciated that the automated slide drilling system and methods disclosed herein allowing such a tunable approach can be provided without a touch screen. For example, a user could simply input one or more data points for the corresponding one or more variables that the user wishes to set or adjust. It will also be appreciated that the sliders can be provided in a user interface that does not directly receive user input via the display. For example, the automated slide drilling system can include software which obtains user inputs as to a variety of factors, such as those relating to the drilling environment, drilling mode, well zone, drill bit, BHA, and other equipment, and additionally as illustrated in FIGS. 15-18, for example. The automated slide drilling system can further include software which not only stores the information from the user interface elements (i.e., sliders) for use, but also uses this information to set the drilling parameters accordingly. For example, automated slide drilling system may automatically (without further user input) generate settings and then display the settings visually as appropriate settings for the slide bars, such as those shown in FIGS. 15-18. Although certain specific limits and values are shown for the parameters described with respect to FIGS. 15-18 as examples, it should be noted that other limits, values, and ranges for parameters may be used. In some implementations, the limits, values, and ranges shown in FIGS. 15-18 may be editable and may be determined by user input to change the user interface element.

Figure 15:
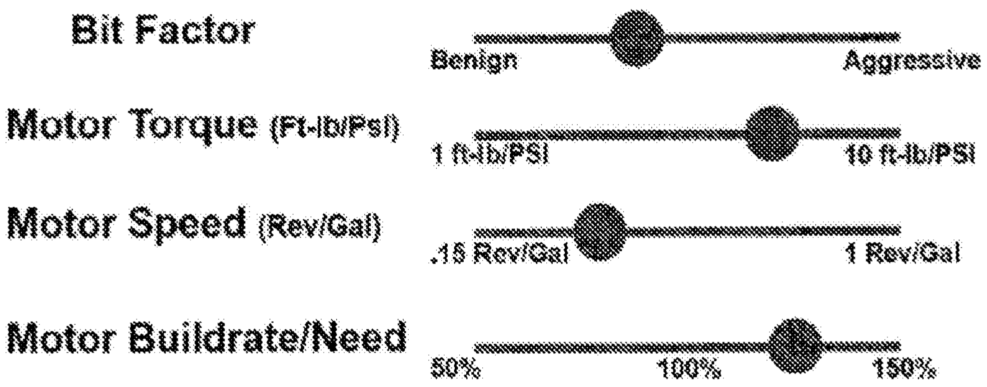
FIG. 15 illustrates one embodiment of a user interface for use with a surface steerable system to enable user input related to a slide motor.

FIG. 15 illustrates one embodiment of a user interface for use with a surface steerable system to enable user input related to a slide motor. For example, a bit factor in FIG. 15 can be adjusted with the depicted slider that is suitable for user input, such as touch input or mouse input, based on the type of drill bit being used. The scale for the bit factor is given between "Benign" and "Aggressive," which may correspond to how "grabby" the bit is in the formation, how hard it is to control, and so on. ("Grabby" is a term sometimes used in connection with the dynamically variable reactional torque caused by bit engagement, often with laminated or highly non-homogeneous rock structures. Variations as to bit cutter size, rake angle, density, cutter depth, and the use of depth limiting components for the drill bit can also impact the amount of dynamic reactive torque and the challenges it can pose.) Also shown in FIG. 15 are user interface elements (e.g., sliders) for motor torque in the units of [ft.*lb/psi] with a numeric range of 1 to 10; for (mud) motor speed in the units of [rev/gal] with a numeric range of −15 to 1; and a motor build rate/need in [%] with a numeric range of 50% to 150%. It will be understood that different units, such as metric units, and ranges may be used with the user interface elements depicted in FIG. 15.

Figure 16:
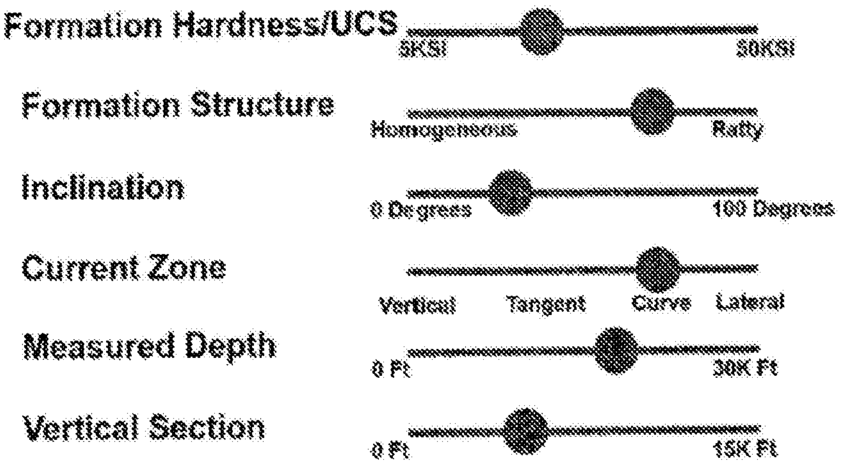
FIG. 16 illustrates one embodiment of a user interface for use with a surface steerable system to enable user input related to a formation.

FIG. 16 illustrates one embodiment of a user interface for use with a surface steerable system to enable user input related to a formation. Similarly, in FIG. 16, the formation hardness (such as determined by its unconfined compressive strength), inclination, and other factors can be adjusted. Accordingly, shown in FIG. 16 are user interface elements (e.g., sliders) for formation hardness/UCS in the units of [KSI] with a numeric range of 5 to 50; for formation structure with a range spanning from homogenous to ratty; for inclination in the units of [degrees] with a numeric range of 0 to 100; for current zone selection with a set of discrete values including vertical, tangent, curve, and lateral; for measured depth in the units of [ft.] with a numeric range of 0 to 30 k; and a vertical section in units of [ft.] with a numeric range of 0 to 15 k. It will be understood that different units, such as metric units, and ranges may be used with the user interface elements depicted in FIG. 16.

Figure 17:
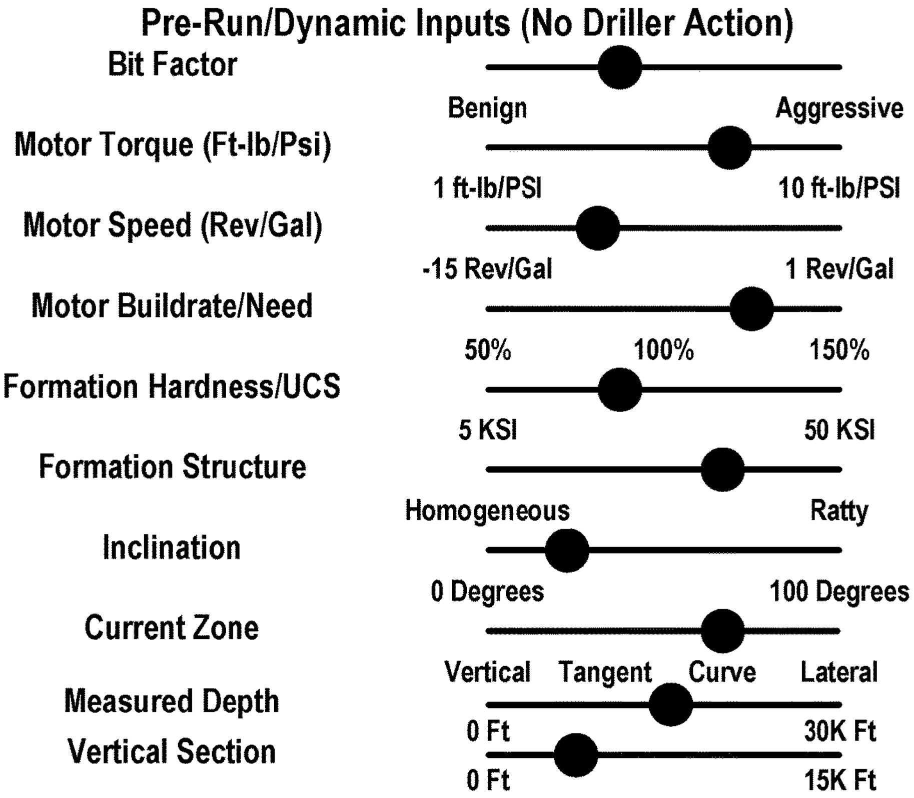
FIG. 17 illustrates one embodiment of a user interface for use with a surface steerable system to enable user input absent drilling actions.

FIG. 17 illustrates one embodiment of a user interface for use with a surface steerable system to enable user input absent drilling actions. FIG. 17 shows a combination of the user interface elements described above with respect to FIGS. 15 and 16, which are not directly associated with a driller action.

Figure 18:
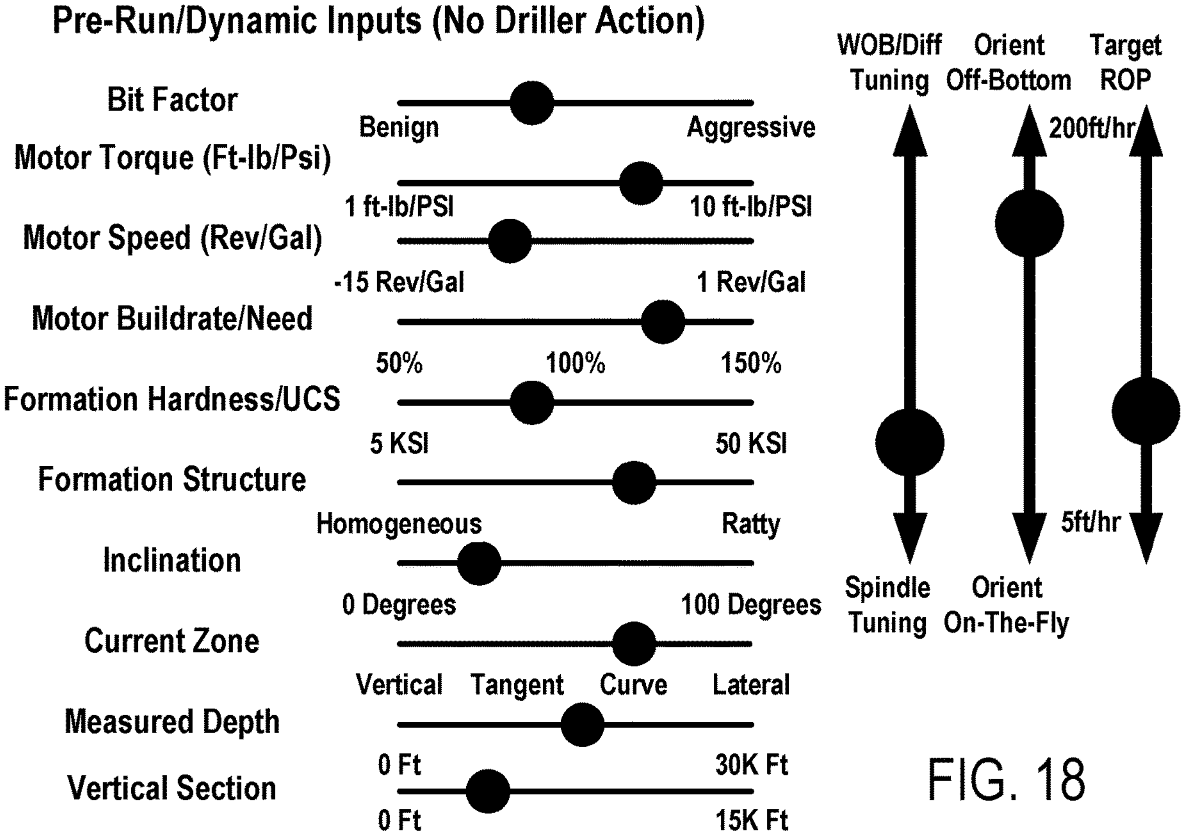
FIG. 18 illustrates one embodiment of a user interface for use with a surface steerable system to enable user input including drilling actions.

FIG. 18 illustrates one embodiment of a user interface for use with a surface steerable system to enable user input including drilling actions. In addition to the user interface elements shown in FIG. 17 (no driller action), FIG. 18 shows additional three user interface elements that control driller actions. Accordingly, shown in FIG. 18 are user interface elements (e.g., sliders) for tuning to adjust a degree of tuning between WOB/diff. tuning to spindle tuning; for orientations to adjust an orientation reference selected between off-bottom and on-the-fly; and for target ROP in the units of [ft./hr] with a numeric range of 5 to 200. It will be understood that different units, such as metric units, and ranges may be used with the user interface elements depicted in FIG. 18.

Figure 19:
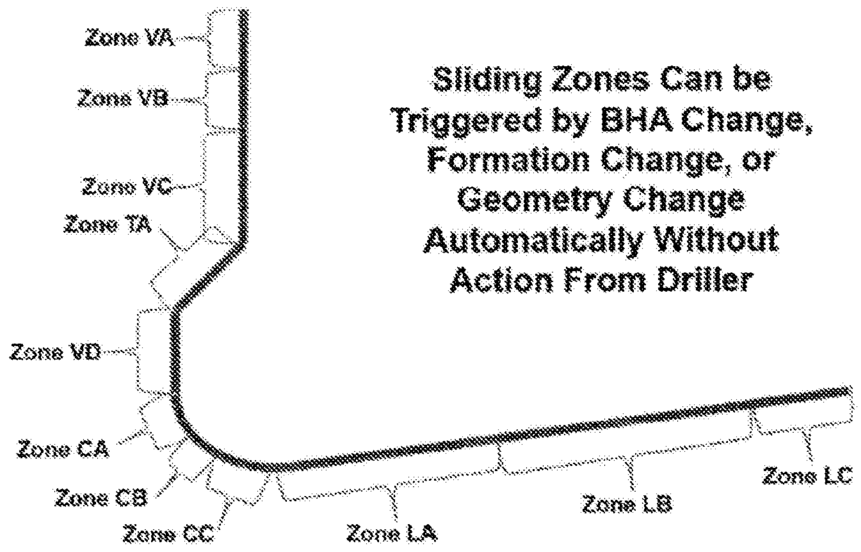
FIG. 19 illustrates one embodiment of different zones in a well plan for a well.

FIG. 19 illustrates one embodiment of different zones in a well plan for a well. FIG. 19 is an illustrative example of the different zones into which a well can be categorized. The detection of sliding zones, and particularly transitions between adjacent sliding zones, can be triggered by BHA change, formation change, or geometry change automatically without action from a human operator by the automated slide drilling system. As noted, one advantage of the present disclosure is the ability to provide different inputs for different factors which the automated slide drilling system can then use more accurately for automated slide drilling in various zones of the same well. It will also be appreciated that the factor settings or inputs used in one well (or one zone of a well, for example) may be used in a corresponding well (or corresponding zone of a second well).

It will be appreciated that automation of slide drilling with an automated slide drilling system can also be used to perform any one or more of the following:

(a) Preplan mud property slide enhancing efforts, and digitally time addition of lubricating beads in the mud to reach bottom for planned slides;

(b) Automate flow rate changes to change bit RPM and impact dogleg capacity of the BHA;

(c) Automate testing and calculation of break over torque;

(d) Automate BHA hang-up detection while sliding with visualization;

(e) Perform drill string variation prediction and simulation;

(f) Preplan and adjust automation approaches for different component changes such as drill pipe diameter; and (g) Measure reactive torque and control the tool face as a method of formation evaluation. It should be appreciated that the methods and systems disclosed herein can be used to include some or all of the foregoing, as may be desired. For example, (d) Automate BHA hang-up detection while sliding with visualization may encompass various actions to successfully navigate a borehole transition from rotary drilling to slide drilling that may be associated with a discontinuity or contour irregularity along the inner surface of the wellbore. Firstly, the contour irregularity may be predicted based on information in the well plan, including formation information and predefined sliding zones that occur in between rotary drilling, along with information about the BHA being used. For example, a BHA having stabilizers protruding outward may be recognized as an indication of increased susceptibility to a hang up. In addition to prediction and avoidance or mitigation of the risk of a hang up, as well as the recognition of a hang up, the automated slide drilling system disclosed herein may be enabled for autonomous reaction and correction of a hang up condition, which may include stopping and starting drilling, increasing, or decreasing WOB, moving the BHA forwards or backwards, setting a given tool face orientation, and other possible configurations of the BHA where available. The procedure for hang up detection and mitigation may be performed by the automated slide drilling system without user input or without user notification in real time or both, in various implementations, for example, to facilitate a rapid and cost-effective response to the hang up that does not negatively impact ROP.

Figure 20:
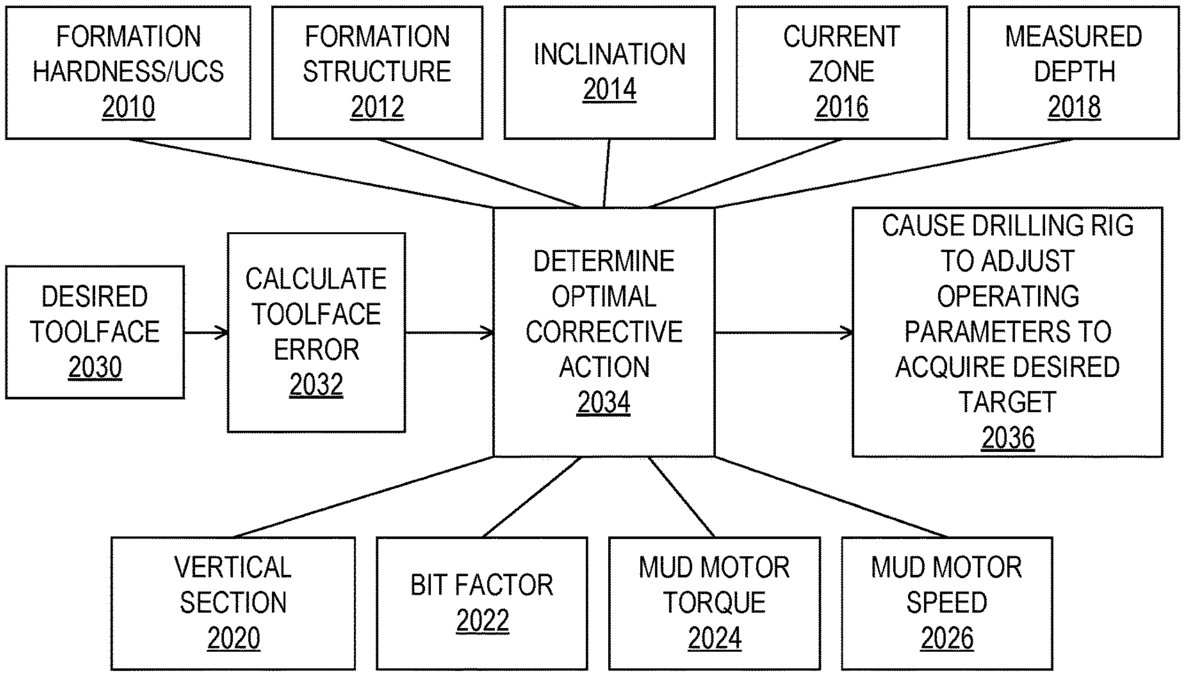
FIG. 20 illustrates one embodiment of different inputs for determining an optimal corrective action in the form of adjusting operating parameters to achieve a desired tool face.

FIG. 20 illustrates one embodiment of different inputs for determining an optimal corrective action in the form of adjusting operating parameters to achieve a desired tool face. FIG. 20 illustrates a variety of the inputs that can be used to determine an optimum corrective action.

As shown in FIG. 20, the inputs include formation hardness/USC 2010, formation structure 2012, inclination 2014, current zone 2016, measured depth 2018, desired tool face 2030, vertical section 2020, bit factor 2022, mud motor torque 2024, and mud motor speed 2026. In FIG. 20, desired tool face 2030 is provided to calculate tool face error 2032, which outputs the tool face error to determine optimal corrective action 2034, which receives all the other inputs listed above. Then, at block 2034, the corrective action may be determined and output for various implementations.

As shown in FIG. 20, the corrective action is causing drilling rig to adjust operating parameters to acquire desired target 2036, which may be performed by the automated slide drilling system without further user input or user intervention, in one implementation.

In other implementations (not shown), the corrective action may be provided or communicated (by display, SMS message, email, or otherwise) to one or more human operators, who may then take appropriate action. In FIG. 20, the corrective action may be provided or communicated (by display, SMS message, email, or otherwise) to one or more other devices or other human operators, such as members of a rig crew, either or both of which may be located at or near the drill site location, or may be located remotely from the drill site.

Figure 21:
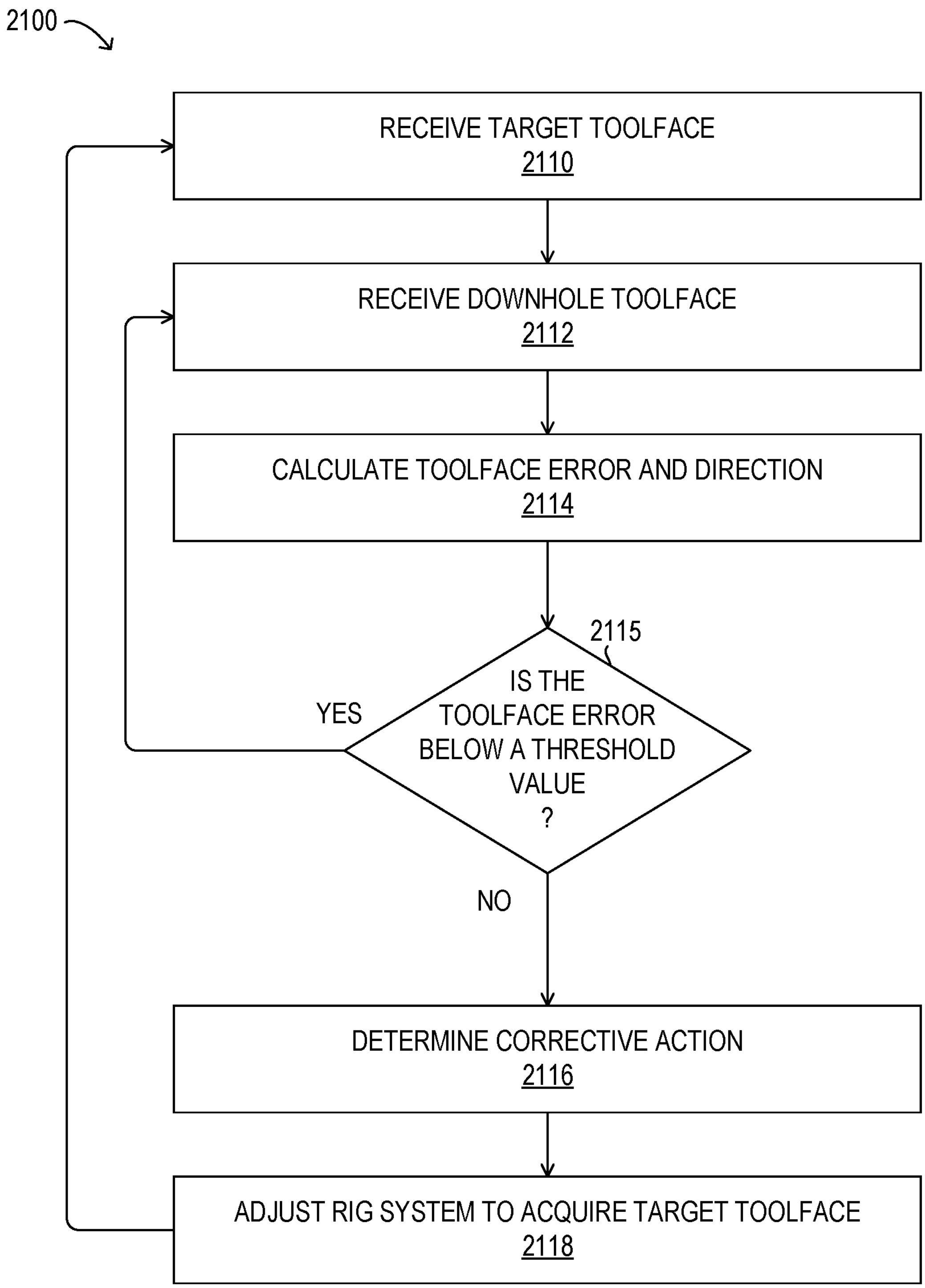
FIG. 21 illustrates one embodiment of a flow chart describing a method for correcting a downhole tool face during slide drilling.

FIG. 21 illustrates one embodiment of a flow chart describing a method 2100 for correcting a downhole tool face during slide drilling. Method 2100 may represent a high level explanation of a control loop with the goal of adjusting operating parameters on the surface to obtain a desired downhole tool face while sliding. Method 2100 may begin at step 2110 by receiving the target tool face. At step 2112, the downhole tool face is received. At step 2114, the tool face error and direction may be calculated. The tool face error may be calculated as a difference between the target tool face and the actual downhole tool face at a given point in time. Additionally, a tool face error threshold or tool face limits may be implemented in a way that limits reactions to tool face errors to a predefined minimum limit, so as to avoid overcorrections and overregulation of the tool face, which may not be desirable because of the reduced effectiveness to compensate for small errors that may actually result in increased costs and increased errors. Accordingly, at step 2115, a decision may be made whether the tool face error is below a threshold value or within a tool face limits. When the result of step 2115 is YES, and the tool face error is below the threshold value or within limits, method 2100 loops back to step 2112. When the result of step 2115 is NO, and the tool face error is not below the threshold value, or the tool face is outside of the tool face limits, at step 2116, corrective action is determined. It is noted that the tool face threshold value or limits may depend on various factors, such as formation characteristics, oscillation mode being used, ranges of drilling parameters such as ROP, WOB, build rate, etc. At step 2118, the rig system is adjusted to acquire the target tool face. After step 2118 the method may loop back to step 2110.

Figure 22A:
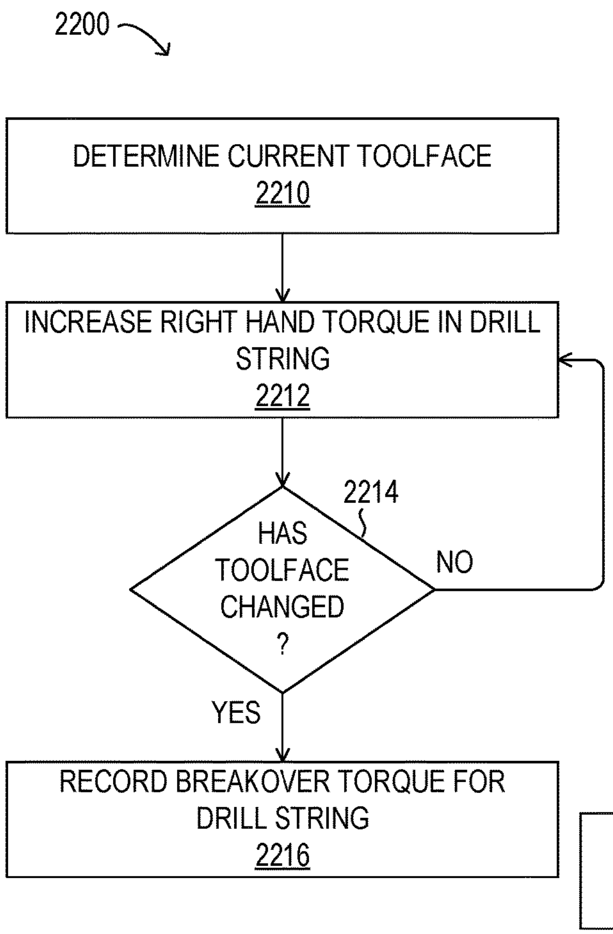
FIG. 22A illustrates one embodiment of a flow chart describing a method for determining static friction and establishing a desired torque in a static mode.
Figure 22B:
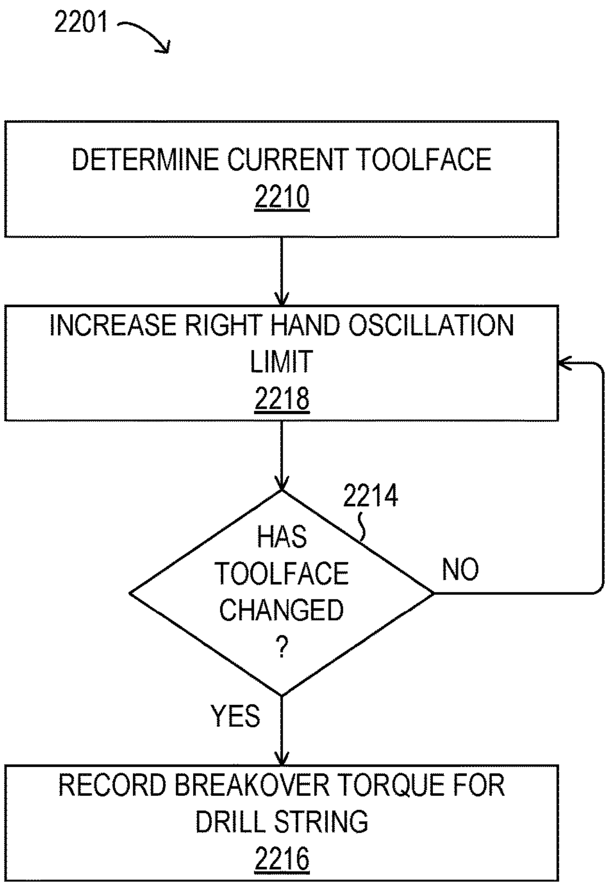
FIG. 22B illustrates one embodiment of a flow chart describing a method for determining static friction and establishing a desired torque in an oscillation mode.

FIGS. 22A and 22B are flow charts of methods 2200 and 2201, respectively, that can be used to determine the static friction limit before torque is delivered to the BHA. Once determined, this static friction limit can be used to established required bump torque and subsequent wraps. The method 2200 is to determine the static friction limit in a static mode (FIG. 22A). The method 2201 is to determine the static friction limit in an oscillation mode (FIG. 22B), and can be done in right hand or left hand torque modes (right hand only shown).

FIG. 22A illustrates one embodiment of a flow chart describing a method 2200 for determining static friction and establishing a desired torque in a static mode. The method 2200 may begin at step 2210 by determining the current tool face. At step 2212 the right hand torque is increased in the drill string. At step 2214 a decision is made whether the tool face has changed. When the result of step 2214 is NO and the tool face has not changed, a loopback to step 2212 occurs. When the result of step 2214 is YES and the tool face has changed, at step 2216 the break over torque is recorded for the drill string.

FIG. 22B illustrates one embodiment of a flow chart describing a method 2201 for determining static friction and establishing a desired torque in an oscillation mode. Method 2201 may begin at step 2210 by determining the current tool face. At step 2218 the right hand oscillation limit is increased. At step 2214 a decision is made whether the tool face has changed. When the result of step 2214 is NO and the tool face has not changed, a loopback to step 2212 occurs. When the result of step 2214 is YES and the tool face has changed, at step 2216 the break over torque is recorded for the drill string.

Multiple approaches can be used to start a slide. The two most common approaches involve a) spending time orienting the off-bottom tool face to prepare for engagement in the ideal pre-compensated direction to account for reactional torque or b) to go directly to bottom and adjust on-the-fly to accomplish the desired tool face. Although the approaches a) and b) are historically driven by style of directional drillers, the automated slide drilling system can determine in real time which approach is better or ideal. The determination of the approach can change based on criteria of the well and downhole tools that might advantage either of these two example approaches. Additional variations of approaches throughout the well may also be evaluated in real-time by the automated slide drilling system. On a long lateral section of the well, it might make sense to go to bottom immediately for weight transfer concerns and the time involved with orienting off-bottom. By contrast, in a curved section of the well, where the build rate may be a higher priority to achieve, it might make sense to orient off-bottom to ensure an ideal tool face while sliding.

Figure 23:
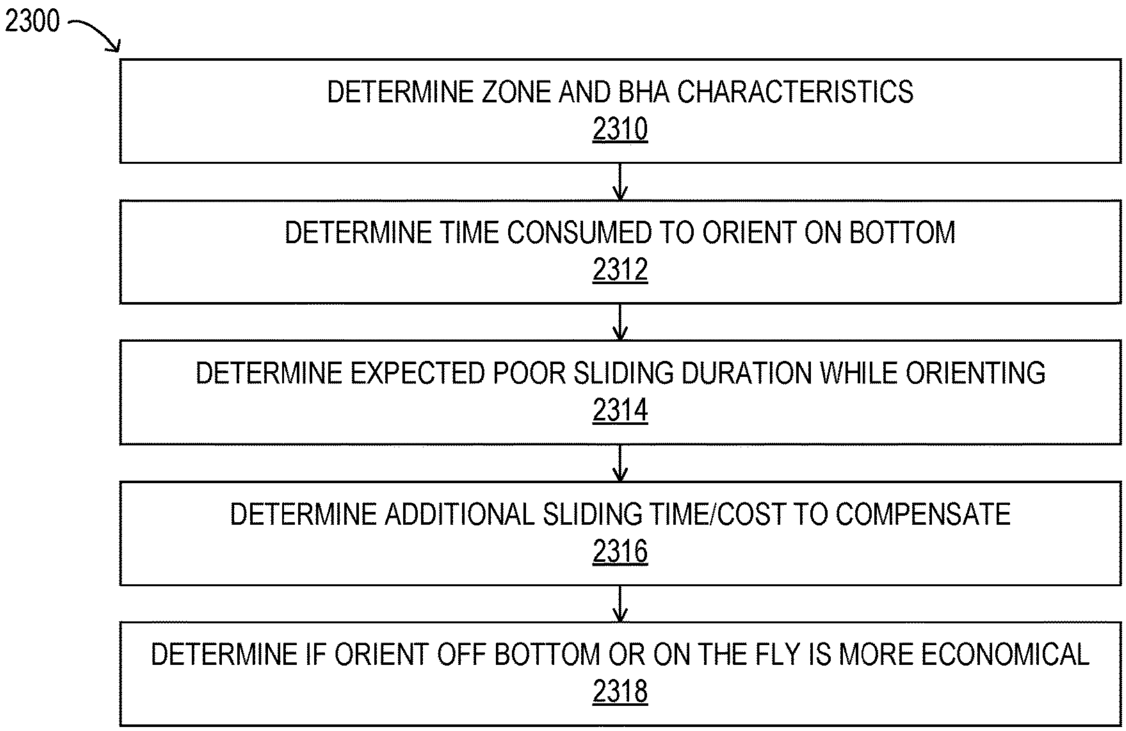
FIG. 23 illustrates one embodiment of a flow chart describing a method for determining when slide drilling is indicated.

FIG. 23 illustrates one embodiment of a flow chart describing a method 2300 for determining when slide drilling is indicated. FIG. 23 provides a flow chart showing a series of steps that can be used to determine when and how to perform a slide during the drilling of a well. Method 2300 may begin at step 2310 by determining zone and BHA characteristics. At step 2312, the time consumed to orient on bottom is determined. At step 2314, an expected poor sliding duration while orienting is determined. At step 2316, additional sliding time/cost is determined. At step 2318, it is determined if orient off-bottom or on-the-fly (on-bottom) is more economical. At step 2318, various factors for off-bottom or on-bottom tool face orientation may be evaluated. Specifically, off-bottom orientation may take more time, while on-bottom orientation may be preferred for faster or more economical drilling. Furthermore, a speed of the decision to obtain and adjust the tool face orientation may itself be a factor to avoid tortuosity in the wellbore path, which may again favor an on-bottom fully automated tool face orientation without stopping drilling progress.

Multiple approaches can be used to adjust tool face targets during a slide. The two most common approaches involve a) rotating the drill string to cause the desired change or b) to increase or decrease the operating parameters of the BHA to create more or less reactive torque. Each approach has valid use cases, but these can change based on operating limits or weight transfer capability during the drilling of well. In some cases the drilling operations may approach the limits of the BHA's operating parameters or the ability of the rock or bit to create the resistance needed to create the desired reactive torque. In other cases, the additional rotary torque delivered by the rig on the surface to adjust the downhole tool face may destabilize the rotational friction at the BHA that allows the tool face to remain stable. The system can determine which of these two approaches or other approaches can be used based on a variety of inputs in real time.

Figure 24:
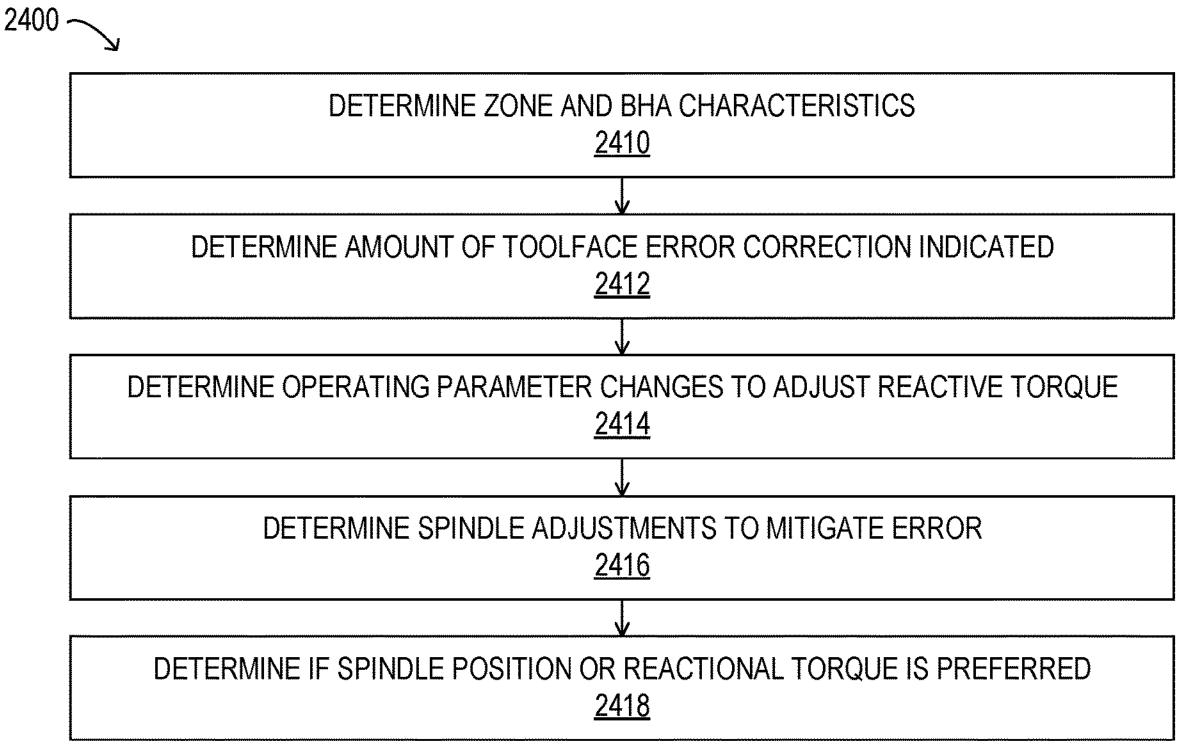
FIG. 24 illustrates one embodiment of a flow chart describing a method for adjusting a tool face orientation for slide drilling.

FIG. 24 illustrates one embodiment of a flow chart describing a method 2400 for adjusting a tool face orientation for slide drilling. FIG. 24 is a flow chart that shows steps that can be taken to adjust tool face. Method 2400 may begin at step 2410 by determining zone and BHA characteristics. At step 2412, an amount of tool face error correction indicated is determined. As step 2414, operating parameter changes to adjust reactive torque are determined. At step 2416, spindle adjustments to mitigate error are determined. At step 2418, it is determined if spindle position or reactional torque is preferred. The decision in step 2418 may be performed based on an evaluation of current drilling mechanics for the drill string. For example, if the tool face is indicated to go more to the left, the pipe could be rotated at the surface using the top drive, or the WOB could be increased (assuming a right hand drilling direction). In some embodiments, a combination of spindle position and reactional torque may be determined in step 2418.

By using a known break over torque (where the surface torque is effectively being delivered to the downhole BHA), a transition from rotation to sliding can be accomplished without having the BHA coming off-bottom. This can make for a more efficient transition and avoid the static friction issues associated with going back to bottom. Additionally, pipe squat can be reduced or eliminated.

Figure 25:
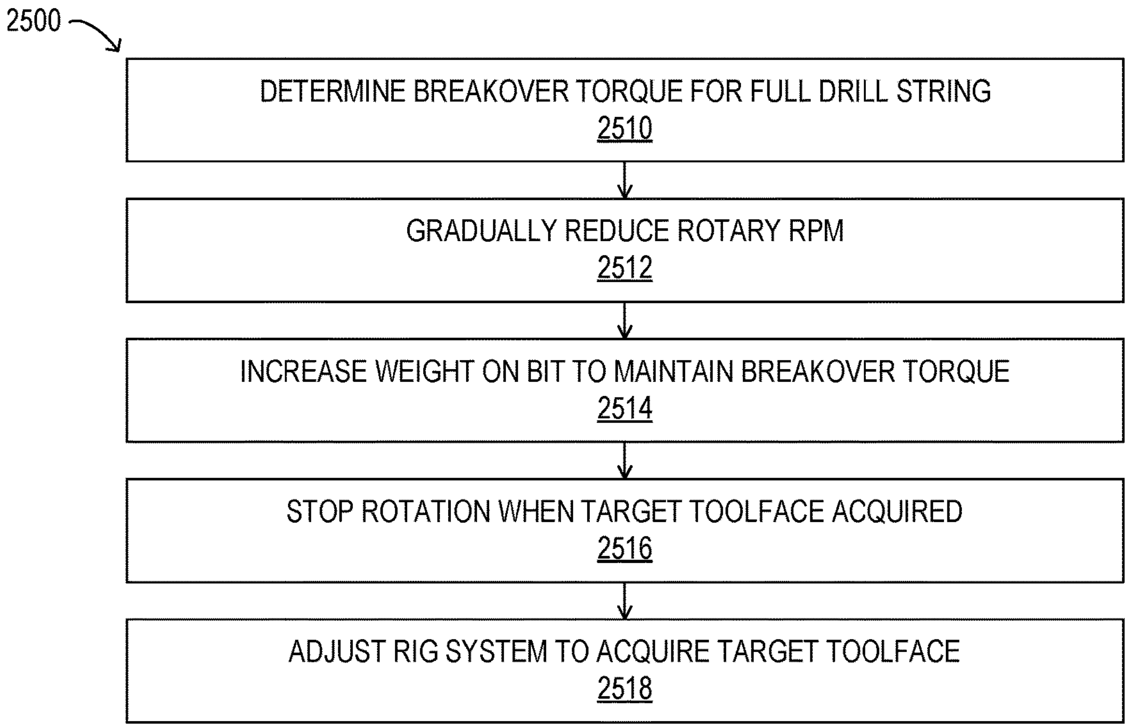
FIG. 25 illustrates one embodiment of a flow chart describing a method for reducing pipe squat for slide drilling.

FIG. 25 illustrates one embodiment of a flow chart describing a method 2500 for reducing pipe squat for slide drilling. Method 2500 may begin at step 2510 by determining break over torque for the full drill string. At step 2512, rotary RPM is gradually reduced. At step 2514, WOB is increased to maintain the break over torque. At step 2516, rotation is stopped when the target tool face is acquired. At step 2518, the rig system is adjusted to acquire the target tool face. The adjustments to the rig system in step 2518 may be based on a historical record of torque, and may be automatically implemented by the automated slide drilling system for a smooth transition from rotation to sliding without delay and without coming off-bottom. For example, a record of the break over torque from previous slides may be used to determine a weighted average of the break over torque from previous slides, such as by applying a weighting factor of 70% to the most recent slide, and 10% to each of the three previous slides. The weighted average for the break over torque can be applied as a favorable guess for the break over torque, in order to save time and effort to find the desired break over torque. Additionally, the automated slide drilling system may recognize certain formation characteristics and may compensate the break over torque for the formation characteristics at the slide location.

By using a known break over torque (where the surface torque is effectively being delivered to the downhole BHA), a transition from rotation to oscillation while sliding can be accomplished without coming off-bottom.

Figure 26:
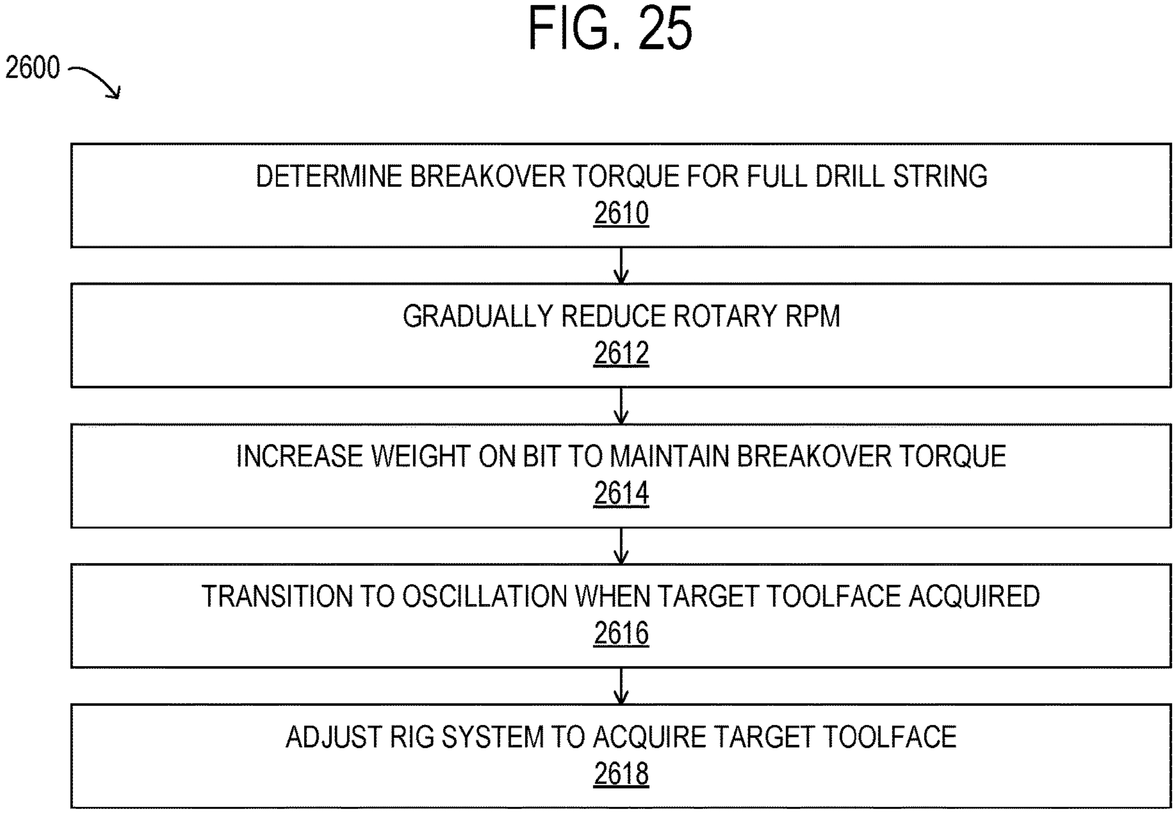
FIG. 26 illustrates one embodiment of a flow chart describing a method for transitioning from rotation to oscillation during slide drilling.

FIG. 26 illustrates one embodiment of a flow chart describing a method 2600 for transitioning from rotation to oscillation during slide drilling. Method 2600 may begin at step 2610 by determining break over torque for the full drill string. At step 2612, rotary RPM is gradually reduced. At step 2614, WOB is increased to maintain the break over torque. At step 2516, a transition to oscillation is performed when the target tool face is acquired. At step 2618, the rig system is adjusted to acquire the target tool face.

To determine ideal off-bottom tool face prior to going to bottom so that once engaged and reactive torque is present, the desired downhole tool face will be accomplished most efficiently.

Figure 27:
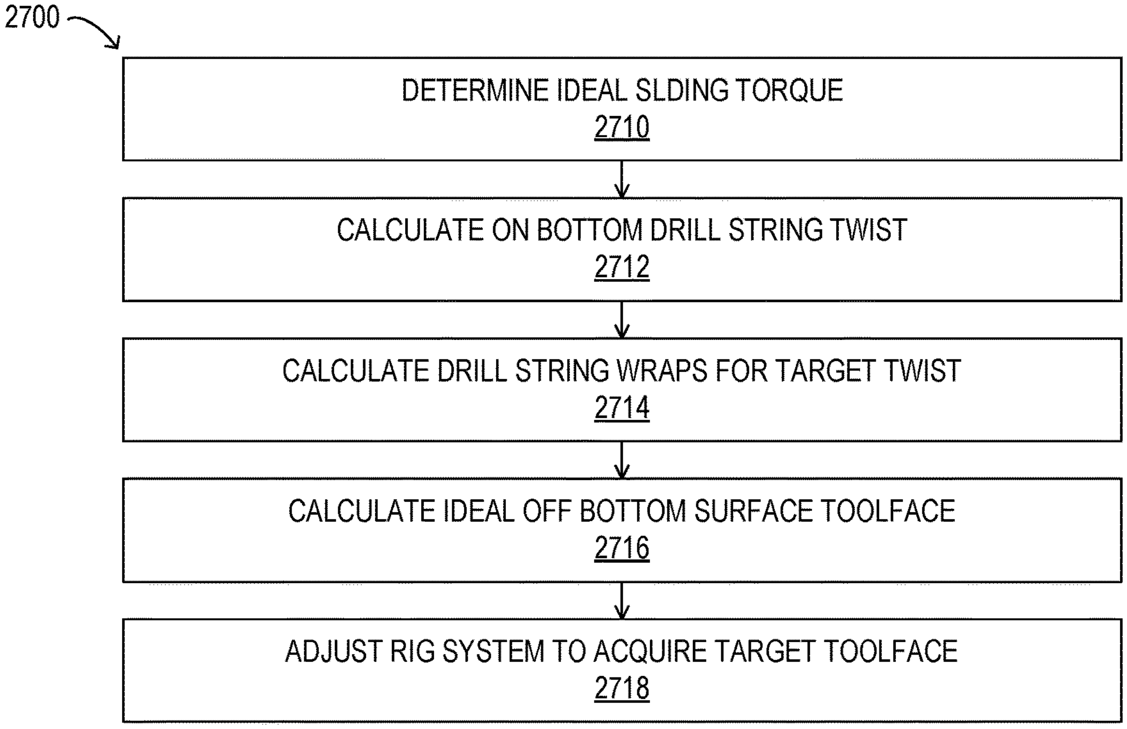
FIG. 27 illustrates one embodiment of a flow chart describing a method for determining an ideal off bottom tool face for slide drilling.

FIG. 27 illustrates one embodiment of a flow chart describing a method 2700 for determining an ideal off bottom tool face for slide drilling. Method 2700 may begin at step 2710 by determining an ideal sliding torque. At step 2712, on bottom drill string twist is calculated. At 2714, drill string wraps for a target twist are calculated. At step 2716, an ideal off-bottom surface tool face is calculated. At step 2718, the rig system is adjusted to acquire the target tool face. For example, at step 2718, an angular position adjustment may be performed using the spindle at the top drive.

Figure 28:
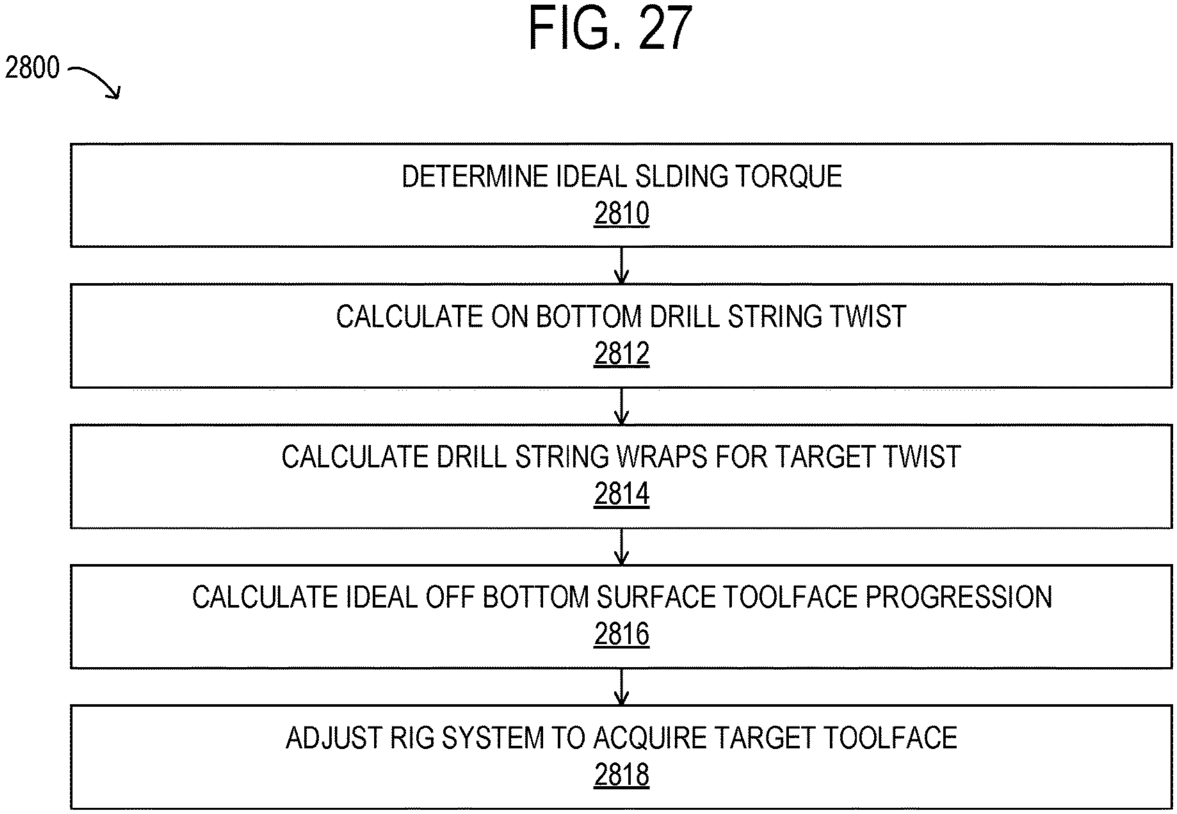
FIG. 28 illustrates one embodiment of a flow chart describing a method for determining an ideal off bottom tool face for slide drilling.

To determine ideal off-bottom tool face prior to going to bottom so that once engaged and reactive torque is present, the desired downhole tool face will be accomplished most efficiently, the steps of FIG. 28 may be used. In this example, the position of the tool face on surface will be gradually adjusted in phases or continuous increased as additional torque is applied from surface or from downhole. Progression of reactive torque and surface tool face adjustments can be staged or phased to reduce unnecessary well bore progress while downhole tool face away from target. Application of torque and tool face position adjustments can be in static operation or oscillation operation at the surface.

FIG. 28 illustrates one embodiment of a flow chart describing a method 2800 for determining an ideal off bottom tool face for slide drilling. Method 2800 may begin at step 2810 by determining an ideal sliding torque. At step 2812, on bottom drill string twist is calculated. At 2814, drill string wraps for a target twist are calculated. At step 2816, an ideal off-bottom surface tool face progression is calculated. At step 2818, the rig system is adjusted to acquire the target tool face.

Figure 29:
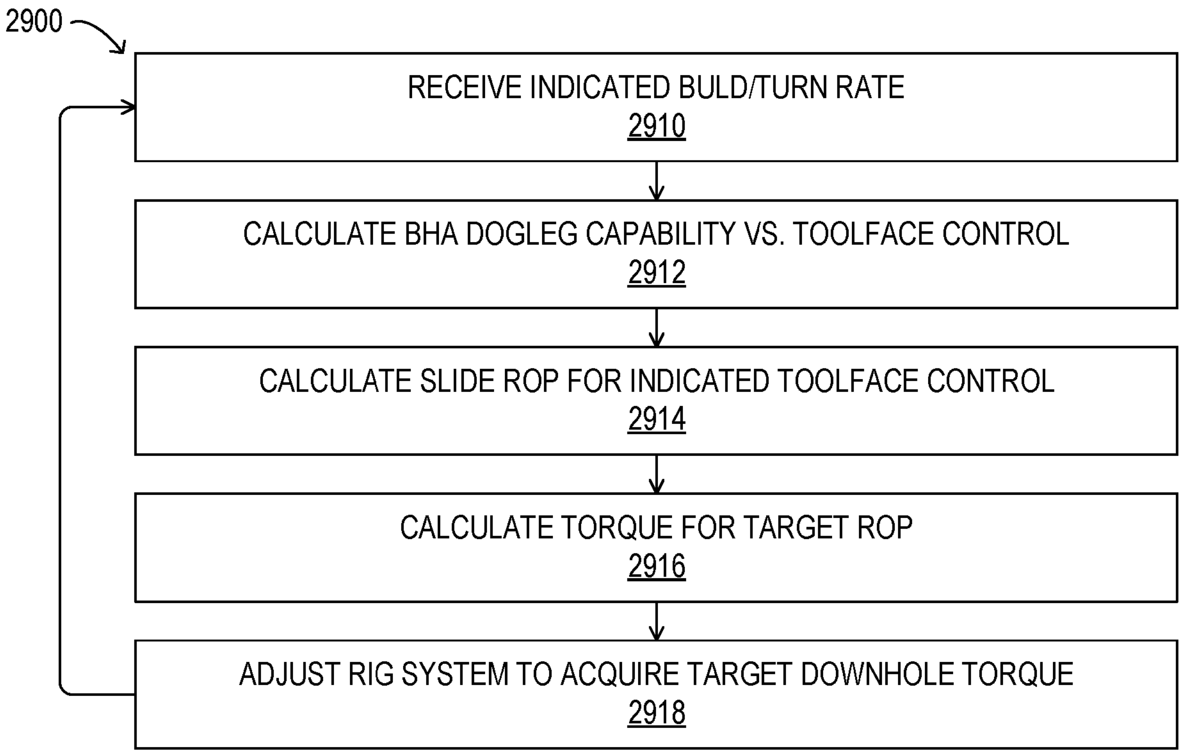
FIG. 29 illustrates one embodiment of a flow chart describing a method for determining an ideal rate of penetration (ROP) for slide drilling.

Steps shown in FIG. 29 may be used to determine when sliding slower is indicated to accomplish desired tool face control to accomplish geometric change. In many cases, faster, less controlled sliding will result in not only a poor quality well bore, but may involve one or more costly trips to acquire a more aggressive BHA. There is often an ideal ROP operational target based on formation and BHA that might be calculable using methods such as mean squared energy (MSE) to identify targets. These methods do not account for ideal slide quality to be considered and a faster but less controlled slide may require more slide footage and therefore cost more to execute in time and tortuosity induced in the wellbore. The economic ideal solution and lowest risk solution may not be the highest ROP potential. The system can calculate the tradeoffs in real time to determine the ideal target ROP to accomplish the slides, as explained above.

FIG. 29 illustrates one embodiment of a flow chart describing a method 2900 for determining an ideal rate of penetration (ROP) for slide drilling. Method 2900 may begin at step 2910 by receiving an indicated build/turn rate. At step 2912, BHA dogleg capability vs. tool face control is determined. At step 2914, slide ROP for the indicated tool face control is calculated. At step 2916, torque for the target ROP is calculated. At step 2918, the rig system is adjusted to acquire the target downhole torque. After step 2918 a loopback to step 2910 occurs.

Figure 30:
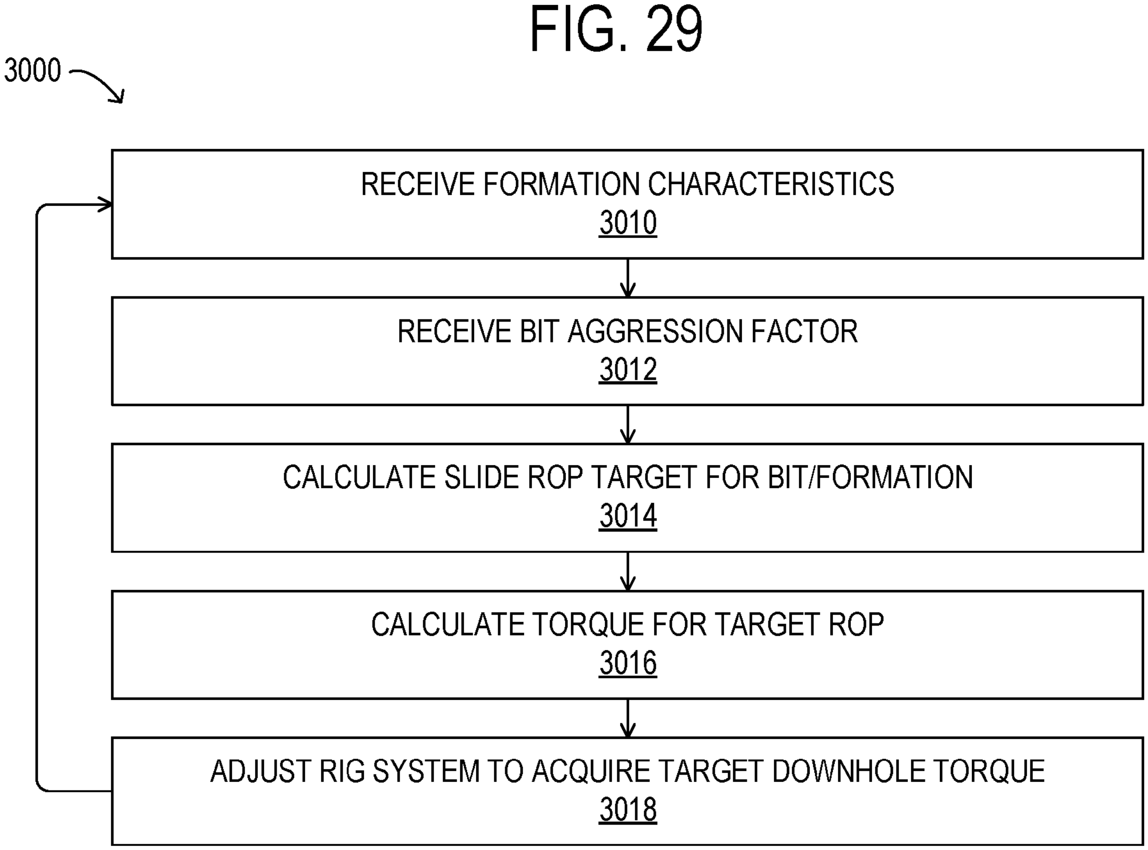
FIG. 30 illustrates one embodiment of a flow chart describing a method for determining an ideal bit torque for slide drilling.

To determine ideal bit torque that will accomplish optimized performance sliding, the steps of FIG. 30 may be used. Once ideal torque is determined, corresponding drill string torque and mud motor differential pressure targets can be determined. Once torque is established, off-bottom tool face prior to going to bottom can be determined to pre-plan for reactive torque on bottom. When combined with static frication limits, a sequence of go-to-bottom and target steady state operating parameters can be determined.

FIG. 30 illustrates one embodiment of a flow chart describing a method 3000 for determining an ideal bit torque for slide drilling. Method 3000 may begin at step 3010 by receiving formation characteristics. At step 3012, a bit aggression factor is received. At step 3014, a slide ROP target for the bit and formation is calculated. At step 3018, the rig system is adjusted to acquire the target downhole torque. After step 3018 a loopback to step 3010 occurs.

Figure 31:
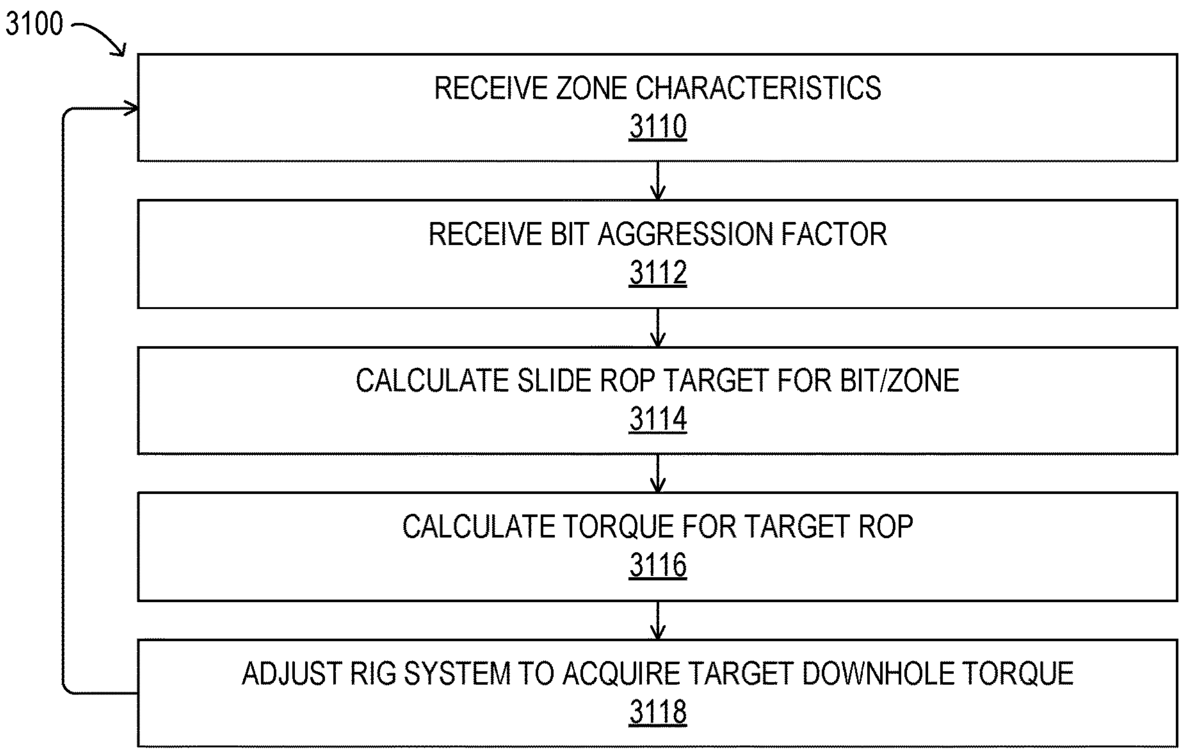
FIG. 31 illustrates one embodiment of a flow chart describing a method for determining an ideal bit torque for slide drilling.

To determine ideal bit torque that will accomplish optimized performance sliding, the steps of FIG. 31 may be used. Once ideal torque is determined, corresponding drill string torque and mud motor differential pressure targets can be determined. In this case, the zone can be considered as the geometry and the length of pipe in the hole contributing to drag will impact both the ideal ROP that can be controlled and the ability to control consistent weight transfer to the bit.

FIG. 31 illustrates one embodiment of a flow chart describing a method 3100 for determining an ideal bit torque for slide drilling. Method 3100 may begin at step 3110 by receiving zone characteristics. At step 3112, a bit aggression factor is received. At step 3114, the slide ROP target for the bit and the zone is calculated. At step 3116, the torque for the target ROP is calculated. After step 3118 a loopback to step 3110 occurs.

Figure 32:
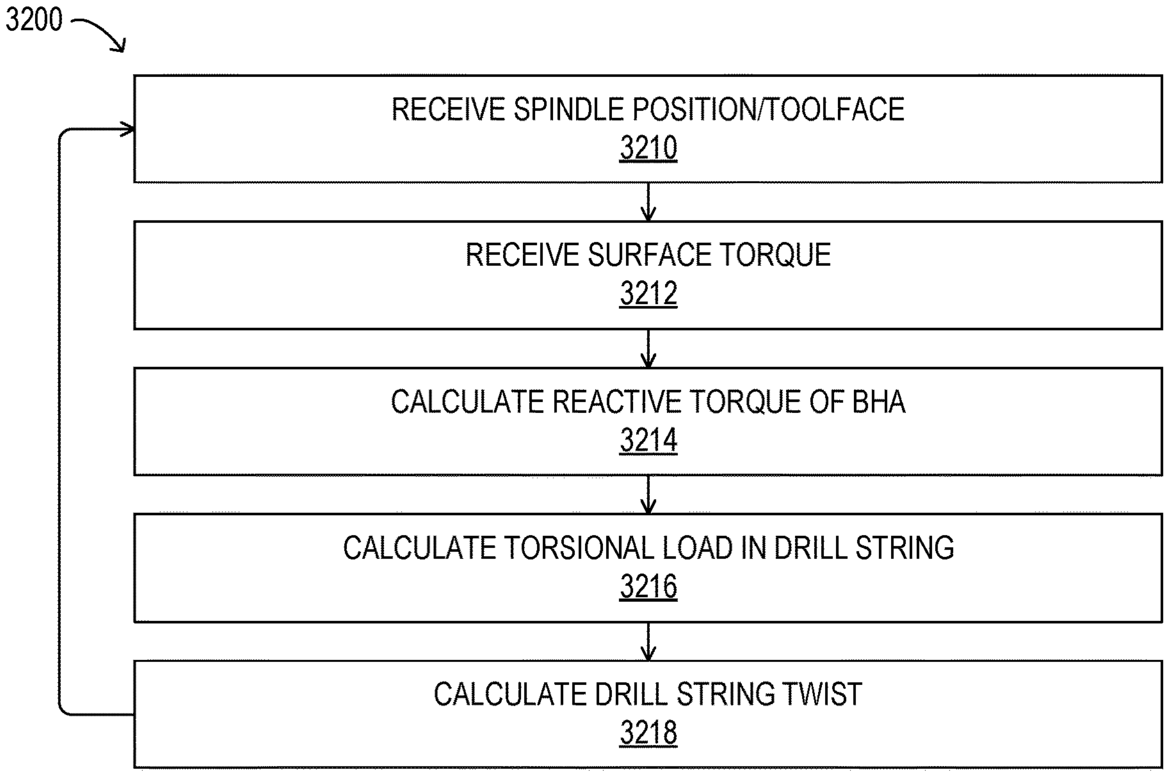
FIG. 32 illustrates one embodiment of a flow chart describing a method for determining a torsional transfer function of a drill string and a bottom hole assembly (BHA)

FIG. 32 is a high level explanation of the calculation with the goal of determining the torsional transfer function of the drill string and BHA. This knowledge can be used to predict drill string wind up and predetermine which way the BHA should be pointed prior to engaging with the rock and drill new hole to pre-compensate for the twisting of the drill string that will happen when torque is applied.

FIG. 32 illustrates one embodiment of a flow chart describing a method 3200 for determining a torsional transfer function of a drill string and a BHA. Method 3200 may begin at step 3210 by receiving spindle position and tool face. At step 3212, surface torque is received. At step 3214, reactive torque of the BHA is calculated. At step 3216, the torsional load in the drill string is calculated. At step 3218, the drill string twist is calculated. After step 3218 a loopback to step 3210 occurs.

Figure 33:
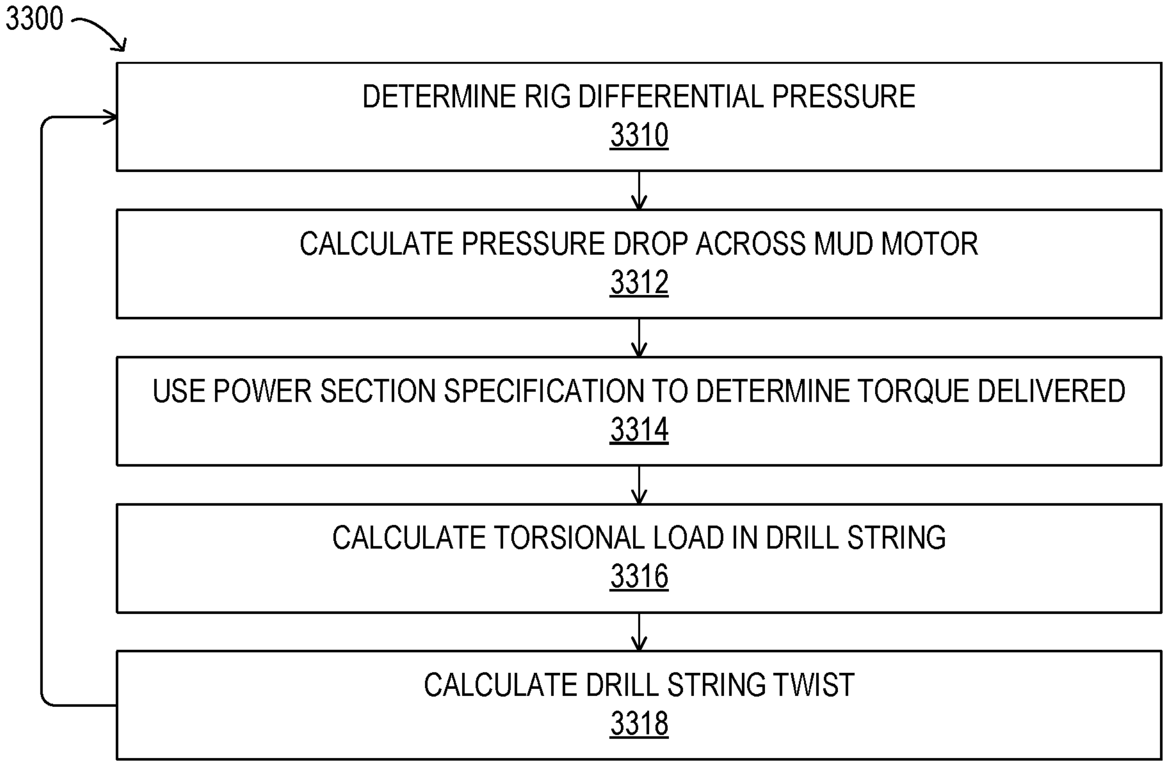
FIG. 33 illustrates one embodiment of a flow chart describing a method for determining reactive torque of a BHA mud motor as a function of differential mud pressure.

FIG. 33 is a high level example of a method to calculate reactive torque of a BHA mud motor as a function of differential mud pressure. If the torque being delivered by the BHA is known, it can be determined when the surface torque is making it to bottom and the amount of twist within the drill string.

FIG. 33 illustrates one embodiment of a flow chart describing a method 3300 for determining reactive torque of a BHA mud motor as a function of differential mud pressure. Method 3300 may begin at step 3310 by determining the rig differential pressure. At step 3312, the pressure drop across the mud motor is calculated. At step 3314, a power section specification is used to determine torque delivered. At step 3316, the torsional load in the drill string is calculated. At step 3318, the drill string twist is calculated. After step 3318 a loopback to step 3310 occurs.

Figure 34:
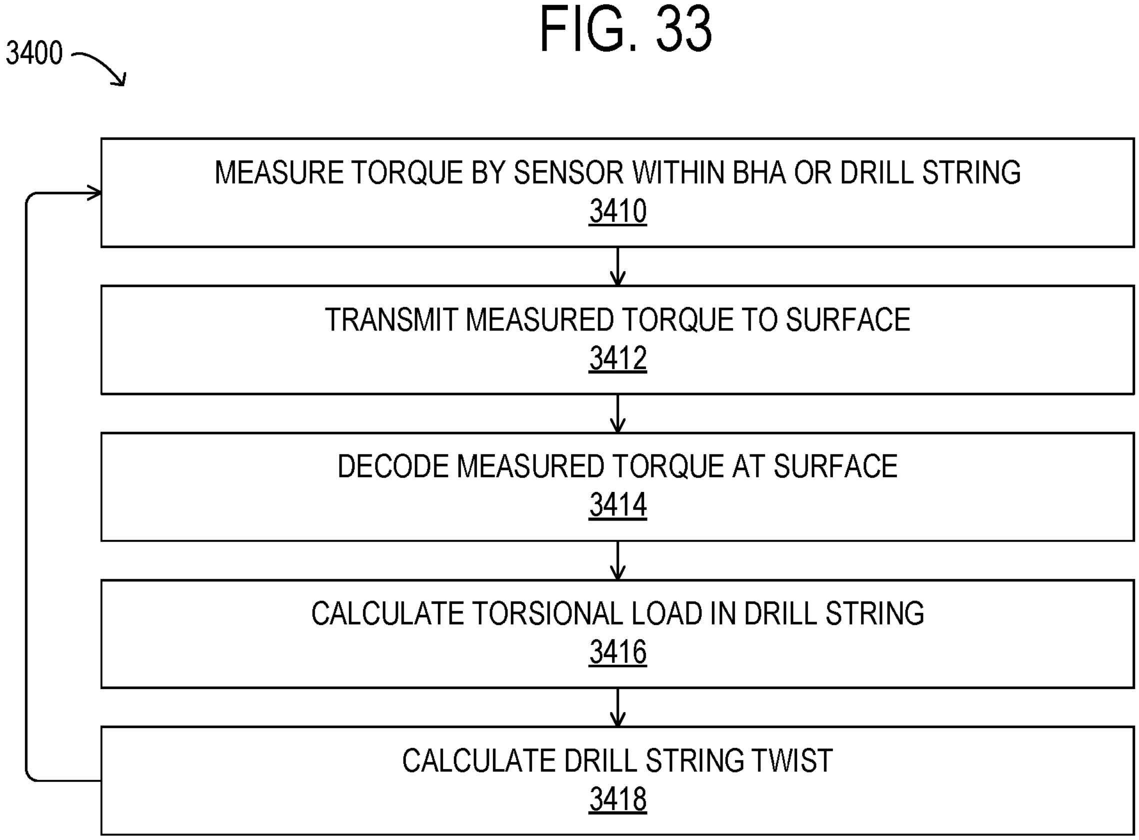
FIG. 34 illustrates one embodiment of a flow chart describing a method for determining reactive torque of a BHA using at least one downhole sensor.

FIG. 34 illustrates the steps of a high level method to calculate reactive torque of the BHA using downhole sensors that can be located in the mud motor, bit, drill pipe or other torque loaded devices in the BHA. Once the amount of torque being delivered by the BHA is determined, the automated slide drilling system can then determine when the surface torque is making it to bottom and the amount of twist within the drill string.

FIG. 34 illustrates one embodiment of a flow chart describing a method 3400 for determining reactive torque of a BHA using at least one downhole sensor. Method 3400 may begin at step 3410 by measuring torque by a sensor with the BHA or the drill string. At step 3412, the measured torque is transmitted to the surface. At step 3414, the measured torque is decoded at the surface. At step 3416, the torsional load in the drill string is calculated. At step 3418, the drill string twist is calculated. After step 3418 a loopback to step 3410 occurs.

Along with better rig operations alignment, an automated slide drilling system may be expected to abide by some or all of the following risk mitigation factors. As the first risk mitigation factor, prior to slide setup, the automated slide drilling system may be limited so that it cannot be initiated until the driller performs the necessary off-bottom actions to prepare for the slide. This can avoid the risk of moving the draw works while off-bottom, for instance, when trying to work the pipe to free trapped torque in the drill string from the previous rotate interval prior to setting up a slide. Therefore, the automated slide drilling system may be configured to have the driller control the draw works while off-bottom.

As the second risk mitigation factor, the automated slide drilling system may be configured to utilize only those controls that a driller would have access to. In this situation, the automated slide drilling system would use the rig's auto driller system exclusively to control the draw works as well as top drive orientation capabilities as provided by the existing rig controls. This approach allows the automated slide drilling system to include all safety measures that currently exist within the rig controls. The automated slide drilling system may be used with drilling rigs that do not have an auto drill control system. In such embodiments, the automated slide system may be coupled to one or more of the rig's drive works control system, the top drive control system, the oscillator control system, any combination thereof, and with other rig control systems, as indicated. The automated slide drilling system can be programmed to send one or more control signals as appropriate to any of such rig control systems to implement the automatic control and performance of the slide and related drilling rig operations described herein. For convenience, the following discussion focuses on exemplary embodiments that include a rig having an auto driller system. However, it will be understood that another control system, or a human operator, may replace the auto driller in different implementations.

On some drilling rigs, a primary human machine interface (HMI) is used that enables a driller to interact with various systems and controls on the rig. The HMI may include one or more touchscreens, for example. The automated slide drilling system can be programmed to expect or wait for a control handoff to occur explicitly from the driller, such as from this HMI. Additionally, the automated slide drilling system may have one or more separate displays presenting the status of the automated slide drilling system and drilling operations, as well as providing the ability to tune and adjust the slide process, before and during the slide.

When determining how best to control the tool face during a slide, the automated slide system may interface with one or more different control systems on the rig, such as the draw works control system, the top drive orientation control system, and the top drive oscillator control system.

The draw works control system may be the most impactful system to the progression of drilling due to its direct control of the rate at which drill string is lowered into the borehole, usually referred to as a "block velocity" or "block speed". The draw works control system, through its direct control of the block speed, also has an indirect impact on tool face control during sliding from the forces applied, based on WOB and differential pressure changes. Rig manufacturers commonly utilize an automated control system that provides higher precision control within the performance limitations of the physical equipment while attempting to optimize ROP. In the case of some rigs, the auto driller is the dedicated system that provides the means of controlling the block speed by translating result-driven set point changes to surface torque, WOB, differential pressure, and ROP to changes in block speed. A set point is considered the intended resulting value that the connected equipment adjusts to and maintains when signaled by the automated slide drilling system. As each set point is entered into the automated slide drilling system, the auto driller (or a suitable alternative or a human operator) may attempt to adjust the draw works control system to meet that set point. Since there are usually multiple set points, the auto driller may attempt to meet all set points up to the first set point being reached at which time the auto driller may consider that particular set point as the active control driver, or primary limiting set point, of the auto driller. In a similar way that drillers change set points to adjust draw works, the automated slide drilling system may interface with the rig controls to provide set point values to the auto driller.

The top drive orientation control system provides the ability to change the orientation of the top drive and can have a direct impact on tool face control during a slide. When the orientation is adjusted, the rotational displacement of the top drive is transferred to the drill string at the surface and propagates from the surface down towards the BHA at the bottom of the hole as a result of a change in torsional force. If enough rotational displacement is applied to overcome frictional forces along the drill string, the amount of transferred torsional force will propagate to the bit. Once the propagation reaches the bit, the tool face downhole will change. The automated slide drilling system may interface with this control system in order to adjust the orientation of the top drive to affect the tool face downhole during the slide.

The top drive oscillator control system provides repeated alternating top drive orientation changes with the purpose of reducing the effect of frictional forces on the drill string during sliding. On some rigs, the oscillator control system allows the control of several set points; top drive speed, the amount of clockwise and counter-clockwise rotation, and the neutral position or offset where the oscillation movements are centered. The automated slide drilling system may interface with the top drive oscillator control system, which may be only after determining that oscillation is optimal for use, and provide set point values based on multiple factors including, but not limited to, borehole geometry, prior slide control precision, and drill string torque modeling.

Prior to executing a slide, it may be desirable that the tool face be aligned such that, after tagging bottom, the tool face is aligned with the target orientation. In order for the automated slide system to perform slide control properly, the driller may be required to pick up off-bottom from any previous on-bottom activity and perform multiple actions, while off-bottom, before the automated system is to be engaged.

The following actions may be performed or specified to be performed before the automated slide drilling system is considered ready to execute the slide.

The first action is the driller working the pipe to bring torque into an operationally ready state. The automated slide system can be programmed to calculate the torque threshold window and present this to the driller. The action of working the pipe can be performed by the driller and may involve alternating the raising and lowering of the block position, or elevation of the draw works. It may be considered necessary to release built up, or trapped, torque in the drill string such that, by releasing torque from the drill string, rotational displacement on the surface is better transferred to the BHA.

The second action is the automated slide system calculating the orientation of the tool face of the BHA while off-bottom. The off-bottom tool face offset calculation can be based on one or more BHA, formation, and torque characteristics, measurements, or determinations, and may present an operational window within which the tool face is oriented.

The third action involves the driller orienting the top drive to bring the tool face of the BHA within the threshold window. Consequently, orienting the tool face is not mutually exclusive from the action of working the pipe. Working pipe before, during, and after orienting the tool face may give an indication to the driller that the effects of trapped torque on the alignment of the tool face are negligible, or neutral, and that alignment of the tool face at this neutral point increases the chance of successful control.

Following the slide setup actions above, the automated slide drilling system may then be engaged to begin executing the slide drilling operation.

Figure 35:
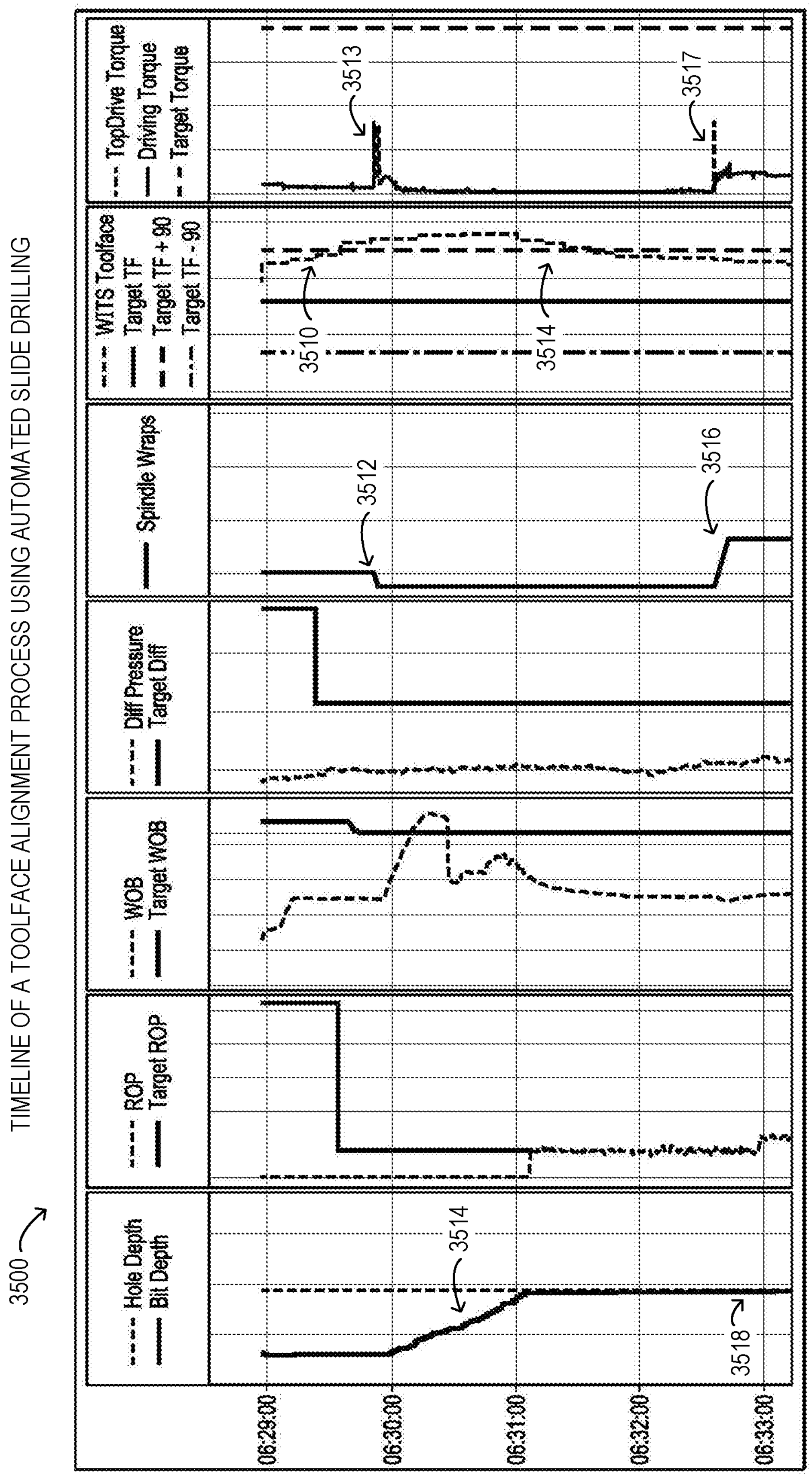
FIG. 35 illustrates one embodiment of a timeline of a tool face alignment process using automated slide drilling.

Using the data recording from a driller setting up a slide and tagging bottom, the trace diagram provided as FIG. 35 identifies an example of an order of events and identifies which steps may be performed by the driller and which steps may be performed by the automated slide system in one particular embodiment.

FIG. 35 illustrates one embodiment of a timeline of a tool face alignment process 3500 using automated slide drilling. Although process 3500 is depicted along a time axis, it will be understood that the time axis may be replaced with another scale, such as depth, distance, or another metric. Process 3500 may begin by identifying that the tool face is to be corrected. Specifically, the tool face values at 3510 show that the tool face is out of the target range. Then, at 3512, a top drive adjustment of 0.26 wraps left may be performed, also evident in the top drive torque at 3513. In this embodiment, upon engagement by the driller, the automated slide drilling system first, while off-bottom, calculates the expected reactionary torque and then performs the action of orienting the top drive at 3512 to compensate just before tagging bottom. This compensation applies additional rotational displacement from the top drive such that the net displacement transferred down the drill string to the tool face downhole results in alignment to the targeted tool face orientation.

The automated slide drilling system may then, at 3514, automatically control the draw works through the auto driller to lower the block until the bit is on-bottom, at 3518. In addition to lowering the block, the auto driller can automatically zero the WOB and differential pressure and transmit the zeroing event to the automated slide drilling system. WOB and differential pressure zeroing are useful for the automated slide system because it can set a reference point useful when later calculating appropriate adjustments.

Once the drill bit is on-bottom during slide control, the automated slide drilling system may apply continuous control system adjustments utilizing one or more data feeds from the surface or downhole sensors as well as from configuration and pre-planned data. The automated slide drilling system may determine the optimal control settings to adjust the drilling operations to maintain the tool face orientation at 3514 and optimize ROP. Additionally, the automated slide drilling system may determine whether use of the oscillator is optimal for slide control, set the appropriate oscillator set points, or enable the oscillator for use when needed. The automated slide drilling system may control top drive rotational adjustments, oscillator set points, and auto driller set points that include WOB, differential pressure, ROP, and surface torque parameters. Using this set of controls, the automated slide drilling system can be used to achieve and maintain tool face control with more consistent precision and improved accuracy throughout the slide. For example, the top drive may be adjusted by 0.89 wraps right to compensate for the reactive torque in the mud motor at 3516, also evident in the top drive torque at 3517.

Executing automated slide control can involve several steps that the automated slide system may perform. The automated slide drilling system may receive target tool face from the BGS and continuously receive the current downhole tool face. These data points can be used by the automated slide drilling system to maintain the orientation of the observed downhole tool face to the target orientation. The automated slide drilling system may also determine the differences between the downhole tool face and the target tool face orientation, in which direction that difference is occurring, and the impacts of that difference. In order to correct for such a difference, the automated slide drilling system may use various models and data inputs to evaluate the impact of control changes as each relates to performance. Once the automated slide drilling system determines the best corrective adjustments, it can apply those changes by interfacing with the rig controls to control one or components of the rig and their operation, as well as drilling operations. Following rig control adjustments by the automated slide drilling system, the automated slide drilling system may then continue to monitor the current downhole tool face orientation to the target tool face orientation and repeat the above steps as needed.

Figure 36A:
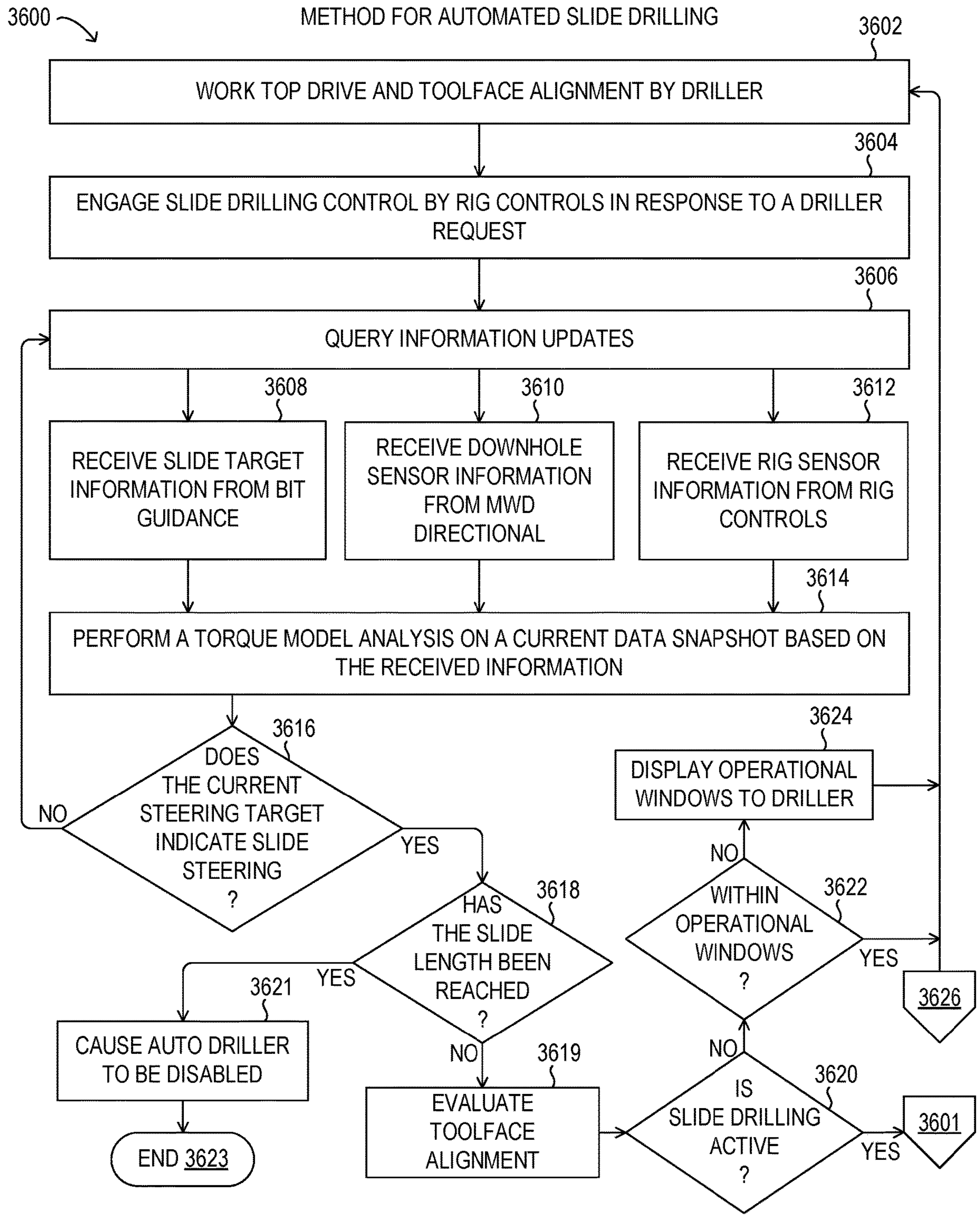
FIGS. 36A, 36B, and 36C illustrate one embodiment of a method for automated slide drilling.
Figure 36B:
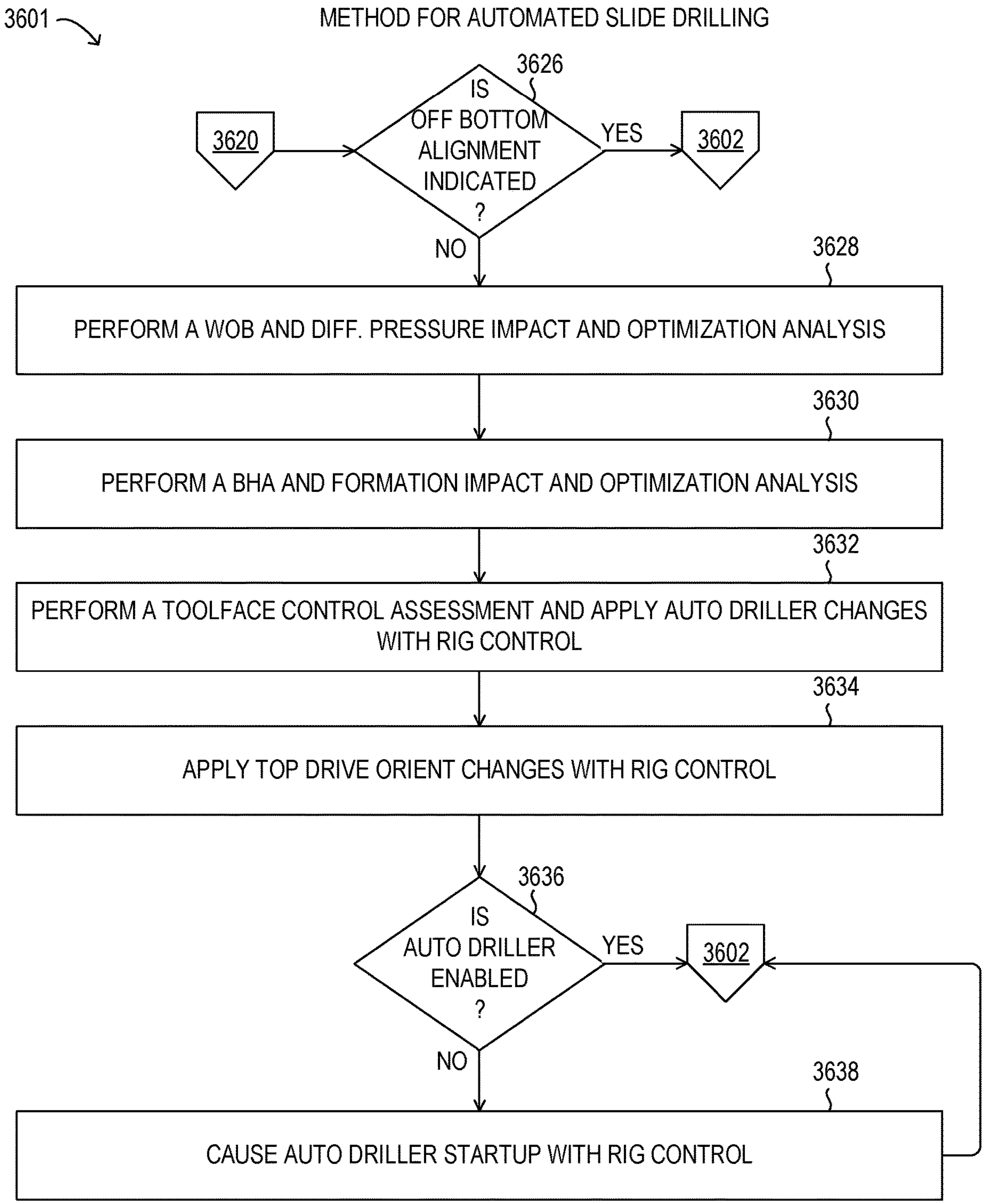
Figure 36C:
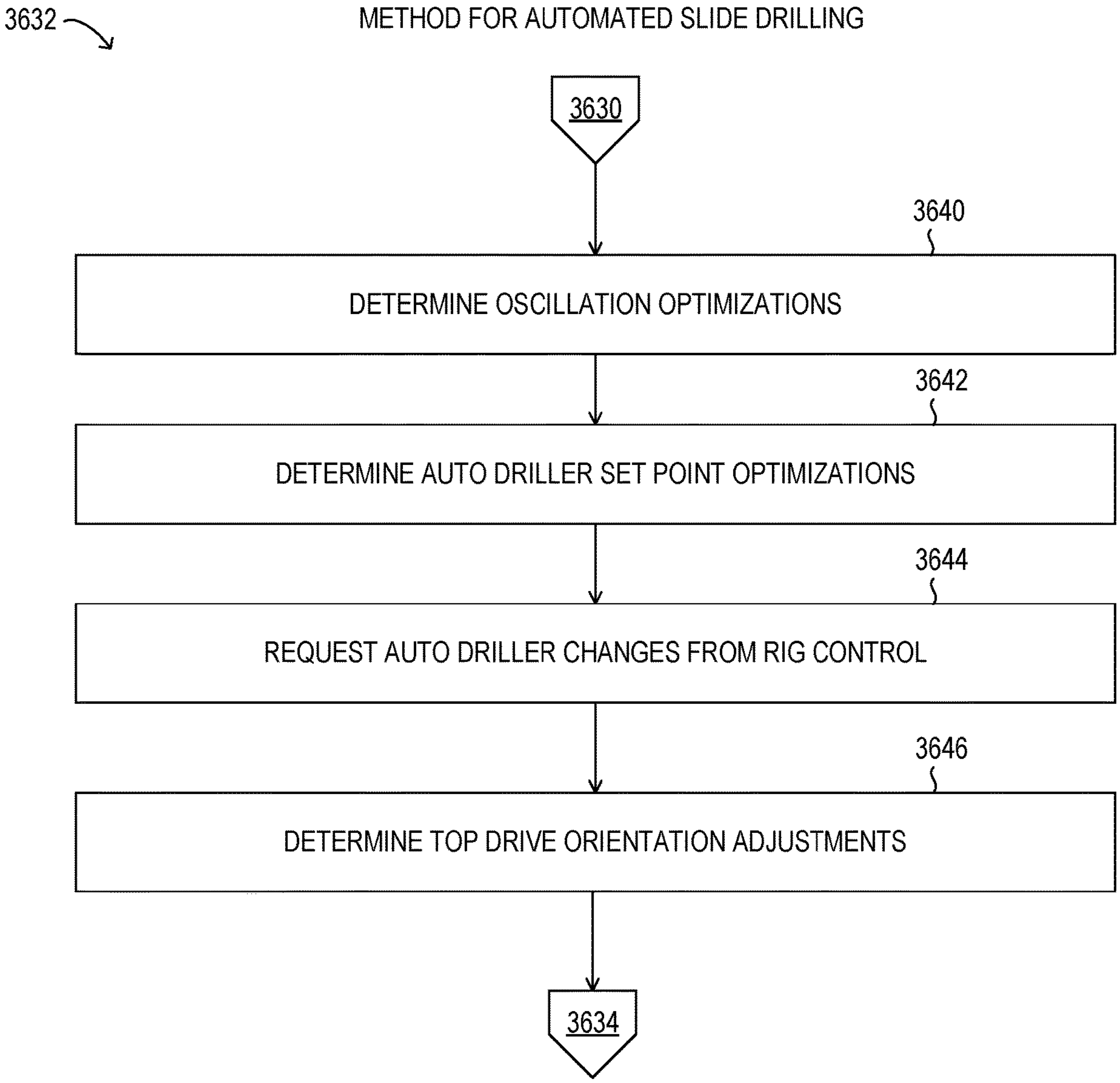

FIGS. 36A, 36B, and 36C illustrate one embodiment of a method for automated slide drilling. The automated slide drilling system may perform the function of "auto sliding," which may involve performing actions that meet the specifications by a rig listed in Table 1.

TABLE 1

Specifications associated with an automated slide drilling system

| High Level Action | Detailed BGS, Automated Slide System, Auto driller, and Driller Functional Specification |
|---|---|
| The automated slide drilling system determines that the drilling rig should enter slide mode. | The BGS provides recommended instructions regarding slide intervals (start and stop depths) and slide target orientation to the automated slide system. The automated slide drilling system has the capability to receive this data. The automated slide drilling system is programmed to perform slide execution based on that recommendation after control hand off signal from the driller. |
| The automated slide drilling system enters slide mode directly from rotary drilling operations or after a connection has been made, based on a software-determined recommendation. | The automated slide drilling system enters slide mode upon driller engagement of the system which occurs after receiving a slide target from the BGS and after the driller meets a specified operational ready state (e.g., working pipe to release a determined amount of torque), aligning the tool face while off-bottom within a prescribed window. |
| The automated slide drilling system establishes the correct torque in the drill string based on software-determined recommendation. | The automated slide drilling system automatically determines the offset tool face orientation based on the computed expected reactive torque when reaching bottom. |
| The automated slide drilling system engages the bottom of the wellbore with the drill bit. | The automated slide drilling system utilizes the auto driller to engage the bottom of the well bore and requires that the auto driller perform the action of zeroing WOB and Diff (Delta P). |
| The automated slide drilling system determines and achieves the target tool face orientation. | The automated slide drilling system determines and presents an off-bottom tool face orientation target window that compensates for reactive torque. The driller keeps the downhole tool face orientation within that target window prior to the bit engaging bottom. The automated slide drilling system has the capability to automate on-bottom tool face control to maintain the on-bottom target tool face orientation for the length of the slide target. |
| The automated slide drilling system controls the slide mode drilling until the slide is completed. | The automated slide drilling system maintains control of the necessary rig equipment and operations until the targeted slide is complete. The driller may have the capability to manually stop the slide automation and return to manual control. |

TABLE 1-continued

| Specifications associated with an automated slide drilling system | |
|---|---|
| High Level Action | Detailed BGS, Automated Slide System, Auto driller, and Driller Functional Specification |
| The automated slide drilling system resumes rotary drilling or prepares for a survey at the end of the current stand. | The automated slide drilling system may have the capability to automatically return control back to the driller to resume rotational drilling, prepare for a survey, or when reaching the end of a stand. |

In order to accurately maintain control of the tool face orientation, the automated slide drilling system may use rig surface sensor data at a higher rate and fidelity than what is typically delivered by a conventional electronic data recorder (EDR) over serial communications. One efficient method is to integrate the automated slide drilling system with the rig so the automated slide drilling system can transfer data directly to and from the rig programmable logic controllers (PLCs).

Currently, conventional rig PLCs may be housed in the driller's cabin and communicate over the industry standard Click protocol. Surface sensor data may be transmitted from the PLCs to the EDR via a protocol translator device (such as supplied by Red Lion Controls, Inc., York, PA, USA) which may be used to convert the data in real time from the Click protocol to other standard protocols. One of the available protocols is a Modbus protocol that provides a general transactional layer over Ethernet-based transmission control protocol (TCP). One advantage of using industry standard TCP-based communications is the ease of integration with various other common technologies and platforms used for modern applications. The Modbus TCP protocol provides both read and write transactions of a fixed set of data types including Boolean, integer (16-bit), and floating point (32-bit) values. Given the use of Modbus TCP from the protocol translator device to the EDR, the automated slide drilling system may also use the Modbus TCP protocol to send and receive sensor and control data between the automated slide drilling system and the rig PLCs.

In order to recognize tool face orientation variance and maintain accurate tool face control, the automated slide drilling system may receive downhole sensor data in addition to rig surface sensor data. Conventional measurement while drilling (MWD) systems may take the measurements from sensors downhole and communicate those data readings back to surface using various techniques. The downhole sensor data readings can then be distributed to user interfaces in the driller's cabin and to an EDR.

In one embodiment, the BGS may receive this data feed from an EDR via a serial communications link (e.g., RS-232), such as may be located in either the directional driller's cabin or the company man's cabin. The automated slide drilling system can be considered an active control system that performs tasks that the driller would otherwise perform through its interactions with and control of the rig controls and components. However, conventional EDR systems may add latency, thus delaying the MWD sensor data into the BGS and the automated slide drilling system. The EDR latency can be significant (e.g., anywhere from 5-15 seconds), such that the driller may be able respond to the directional user interface faster than the automated slide drilling system might respond using the EDR.

To avoid this latency, the automated slide drilling system can be integrated directly with the MWD directional systems. The MWD directional system may provide a data feed to the automated slide drilling system using an industry standard protocol, such as one based on Wellsite Information Transfer Specification (WITS), or possibly through another data transfer method.

The BGS and automated slide drilling system may comprise a single computer with at least one processor and memory, with computer software stored in memory that is executable by the processor to perform the steps and operations described in this disclosure for performing automated slide drilling operations. The BGS and automated slide drilling system also may comprise multiple computers, and processors and memories, which may be separate from one another, and may be any one of a number of conventional types of computer systems. The BGS and automated slide drilling system may be configured to receive and transmit information to and from the MWD directional system, a Modbus network system, and to provide a user interface to an operator or user.

The BGS software and the automated slide drilling software may be hosted on either a laptop workstation or on an industrial grade workstation with an integrated touchscreen display. These types of hosting machines are appropriate for mobile deployment between different rigs for multiple operators. However, when deploying an automation system on drilling rigs, a more streamlined approach may be desired by providing a fixed and integrated hosting system. Installed in most, if not all, driller's cabins on drilling rigs, is a half-rack sized server rack that allows for multiple servers and network switches to be mounted and connected to the rig and connected to dedicated touchscreen displays. The automated slide drilling system software may be deployed and executed by one or more such servers.

For the most effective experience utilizing the proposed automated slide drilling system, one potential deployment is for the software to be hosted on a server machine that is mounted and connected in the driller's cabin. This allows users on drilling rigs quick and simple access anywhere on rig-site using mobile device clients like a tablet, smartphone, or laptop computer to monitor or interact with the automated slide drilling system.

The system architecture on some rigs is based upon a system-of-systems approach that aggregates and integrates many different individual systems. These systems typically provide standalone capabilities that when used or integrated together achieve desired operational behavior. The driller benefits from this approach through reduction in workload, greater situational awareness, and quicker response times to events that occur during the use of the rig. The automated slide drilling system may build upon this architecture by providing additional features and capabilities to handle the task of sliding. In order for the automated slide drilling system to perform its tasks, it may be integrated with one or more of such systems on the rig. These systems may include the rig controls (inclusive of the auto driller), BGS, and MWD directional systems.

The automated slide drilling system and BGS may be combined with or may be connected to various other rig systems via TCP or WITS communication protocols. In addition, the automated slide drilling system and BGS may be connected to a display, which may be located on the rig site or may be located elsewhere remote from the rig site. The automated slide drilling system and BGS may be connected with wired or wireless network connections, such as to a local WiFi network, which may be secured, and to the Internet.

The BGS can output steering plans that consist of a series of sliding and rotating intervals (and tool face orientations) for the purposes of directing the best path to stay on the well plan. During drilling, the automated slide drilling system receives this information as inputs and responds to it when the driller engages the automated slide drilling system to follow one nor more slide sequences. A slide sequence controlled by the automated slide drilling system may be initiated by a direct command from the driller after completing the appropriate pre-slide tasks, if desired.

The MWD directional system may decode and distribute a feed of downhole sensor data to rig personnel as well as to other systems such as the EDR. The automated slide drilling system may receive this data feed and use it during slide control. The downhole sensor data may include, but is not limited to, trajectory station data, tool face orientation, and gamma resistivity (GR) data.

The rig control system is typically capable of outputting data from rig sensors and to accept control inputs from other systems, such as an automated slide drilling system of the present disclosure. A rig control system is usually made up of several different subsystems, such as PLCs, protocol translators, and an HMI.

The rig PLCs can be a set of devices that collect, interpret, and emit electrical signals to and from rig equipment. The rig PLCs may be programmable, specific devices that are dedicated to handling certain areas of control for the rig, such as safety checks for the draw works and the top drive. In order to communicate control signals to other systems, each rig PLC may be connected to a communications network using an industry standard protocol, such as the Click protocol. The automated slide drilling system may be connected to the rig PLCs over the protocol translator. The protocol translator provides a means of interfacing with the rig PLCs that connect over the Click protocol, which may be then translated to/from the Modbus protocol over TCP. The automated slide drilling system may communicate with the protocol translator over an Ethernet network using the Modbus protocol.

The primary interface for the driller to control and monitor rig equipment is usually the HMI. The HMI may be designed to handle touchscreen inputs from the driller and can be configured to support different capabilities. In one embodiment, the HMI can be used by the driller to engage the automated slide drilling system of the present disclosure.

Referring now to FIG. 36A, a method 3600 for slide drilling is presented in flow chart form. It is noted that certain operations in method 3600 may be optional or rearranged in different implementations. Unless otherwise indicated or described, operations and steps described in method 3600 may be performed by the automated slide drilling system described herein. Method 3600 may describe how a driller uses the automated slide drilling system to execute a slide. Method 3600 may be performed when BGS recommends a slide target and driller wants to execute a slide using automated slide drilling system. Certain preconditions for executing method 3600 may include having the rig control system, MWD directional system, BGS, and the automated slide drilling system be operational. Upon completion of method 3600, the automated slide drilling system may complete the slide and hand off control to the driller.

In method 3600, after being prompted by the BGS to perform a slide, the automated slide drilling system presents the torque operational threshold and the tool face orientation operational window to use the automated slide drilling system to control the slide. Once the driller takes action to work the torque within the threshold as well as the tool face orientation downhole within the operational window, the driller may interact with the rig controls to communicate to the automated slide drilling system that it is now in control and can begin executing the slide. In some situations, or as configured for operation, the automated slide drilling system may take control without any input from the driller or another operator or user. The automated slide drilling system then actively adjusts the top drive rotational displacement and auto driller set points based on a tool face assessment. The adjustments are repeated as indicated to maintain on bottom slide control until the slide is completed when the automated slide drilling system hands control back to the driller.

Method 3600 may begin at step 3602 by working the top drive and tool face alignment by the driller. At step 3604, slide drilling control is engaged by rig controls in response to a driller request. At step 3606, information updates are queried. At step 3608, slide target information is received from bit guidance. At step 3610, downhole sensor information is received from MWD directional. At step 3612, rig sensor information is received. At step 3614, a torque model analysis is performed on a current data snapshot based on the received information. The current data snapshot may represent the newest information queried at step 3606. At step 3616, a decision is made whether the current steering target does indicate slide steering. When the result of step 3616 is NO, and the current steering target does not indicate slide steering, method 3600 loops back to step 3606. When the result of step 3616 is YES, and the current steering target does indicate slide steering, at step 3618, a further decision is made whether the slide length has been reached. When the result of step 3618 is YES, and the slide length has been reached, at step 3621, the auto driller is caused to be disabled, and method 3600 ends at step 3623. When the result of step 3618 is NO, and the slide length has not been reached, at step 3619, the tool face alignment is evaluated. At step 3620 a decision is made whether slide drilling is active. When the result of step 3620 is YES, and slide drilling is active, method 3600 proceeds to method 3601 (see FIG. 36B). When the result of step 3620 is NO, and slide drilling is not active, at step 3622, a further decision is made whether rig parameters are within operational windows. When the result of step 3622 is YES, and rig parameters are within operational windows, method 3600 loops back to step 3602. When the result of step 3622 is NO, and rig parameters are not within operational windows, at step 3624, operational windows are displayed to the driller, after which, method 3600 loops back to step 3602.

Referring now to FIG. 36B, a method 3601 continues method 3600 from FIG. 36A. Specifically, from step 3620, a decision is made at step 3626 whether off bottom alignment is indicated. When the result of step 3626 is YES, and off bottom alignment is indicated, method 3600 loops back to step 3602. When the result of step 3626 is NO, and off bottom alignment is not indicated, at step 3628, a WOB and differential pressure impact and optimization analysis is performed. At step 3630, a BHA and formation impact and optimization analysis is performed. In one example, the analyses in steps 3628 and 3630 may be performed using a mathematical model indicative of the physical drill string using an expected transfer function to model the mechanical behavior of the drill string, as well as formation characteristics. In another example, historical reference data for similar drill string configurations and well plans, if available or accessible, including data from the same well bore, may be used instead of, or together with, mathematical models for the analyses in steps 3628 or 3630. At step 3632, a tool face control assessment is performed, and auto driller changes are applied with rig control. At step 3634, to drive orient changes are applied with rig control. At step 3636, a decision is made whether the auto driller is enabled. When the result of step 3636 is YES, and the auto driller is enabled, method 3600 loops back to step 3602. When the result of step 3636 is NO, and the auto driller is not enabled, at step 3638, the auto driller is caused to startup with rig control.

Referring now to FIG. 36C, method 3632 shows further details in one embodiment of the step 3632 from FIG. 36B. At step 3640, oscillation optimizations are determined. At step 3642, auto driller set point optimizations are determined. At step 3644, auto driller changes are requested from rig control. At step 3646, top drive orientation parameters are determined.

Figure 37:
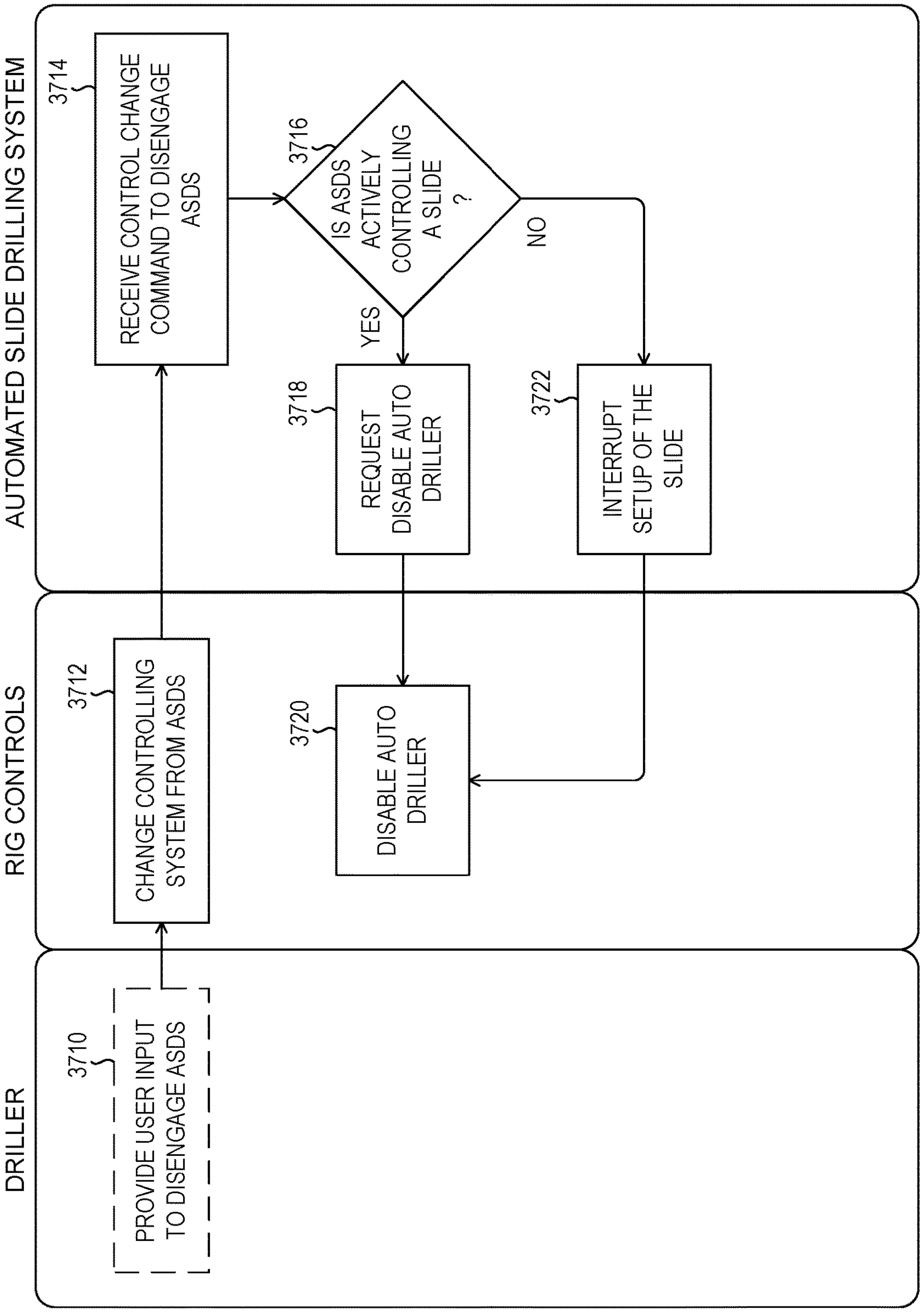
FIG. 37 illustrates one embodiment of a method for disengaging automated slide drilling.

FIG. 37 illustrates one embodiment of a method for disengaging automated slide drilling. In FIG. 37, method steps are shown arranged by an executor of the method steps, selected from DRILLER, RIG CONTROLS, AND AUTOMATED SLIDE APPARATUS (i.e., the automated slide drilling system). It is noted that certain operations in FIG. 37 may be optional or rearranged in different implementations. The method in FIG. 37 may be used when the driller disengages the automated slide drilling system from the HMI, the driller moves or adjusts the stick controlling draw works, or when the driller adjusts any other controls while the automated slide drilling system is engaged, among others. Alternatively, the method in FIG. 37 may be used for disengagement from the automated slide drilling system when reaching the end of a pipe stand supply, when a mechanical issue or failure arises, or when a sensor is tripped for violating a specific threshold or limit. The method in FIG. 37 describes how when the driller wants to disengage the automated slide drilling system, the rig controls provide the ability to communicate the control hand off. Alternatively, the method in FIG. 37 describes how when the automated slide drilling system is engaged, the rig controls system can disengage the automated slide drilling system to take back control (e.g., without direction by the driller at step 3710). The method may be indicated when the driller wants to disengage the automated slide drilling system. Alternatively, the method may be indicated when rig controls asserts control back from the automated slide drilling system. Prior to the method, the automated slide drilling system is engaged and operating. After the method, automated slide drilling system and the auto driller are disengaged.

The method in FIG. 37 may begin without user input at step 3712 by changing the controlling system, back to rig controls, from the automated slide drilling system. Alternatively, the method may begin with user input at 3710 by the driller providing user input to disengage the automated slide drilling system, after which step 3712 is executed. After step 3712, at step 3714, a control change command to disengage the automated slide drilling system is received by the automated slide drilling system. At step 3716 a decision is made whether the automated slide drilling system is actively controlling a slide. When the result of step 3716 is YES, and the automated slide drilling system is actively controlling a slide, at step 3718 auto driller disable is requested from rig controls by the automated slide drilling system. At step 3720, rig controls disables the auto driller. When the result of step 3716 is NO, and the automated slide drilling system is not actively controlling a slide, at step 3722 setup of the slide is interrupted by the automated slide drilling system. After step 3722, step 3720 is performed by rig controls.

Figure 38:
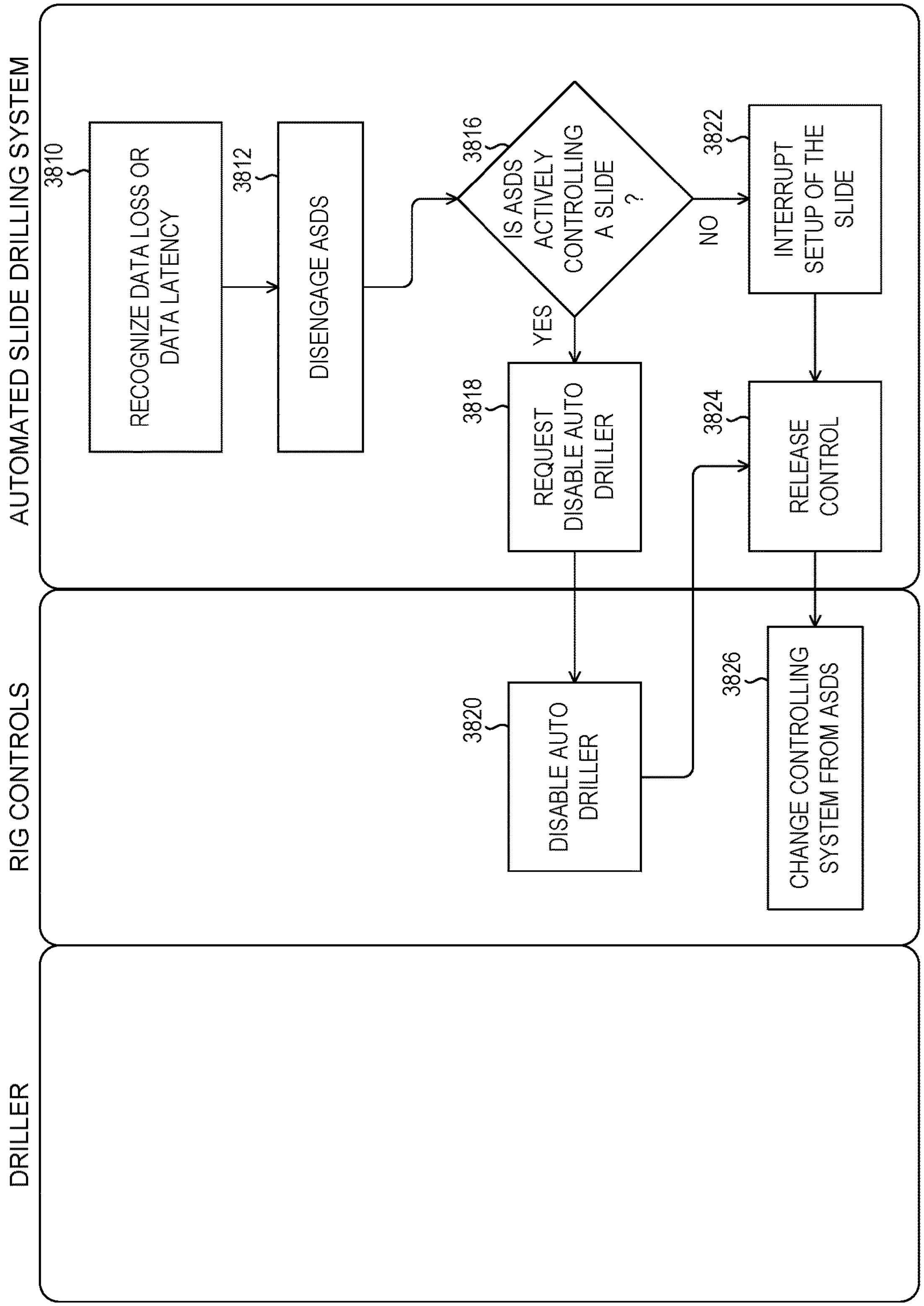
FIG. 38 illustrates one embodiment of a method for disengaging automated slide drilling responsive to data loss or data latency.

FIG. 38 illustrates one embodiment of a method for disengaging automated slide drilling upon data latency or data loss. In FIG. 38, method steps are shown arranged by an executor of the method steps, selected from DRILLER, RIG CONTROLS, AND AUTOMATED SLIDE APPARATUS (i.e., the automated slide drilling system). It is noted that certain operations in FIG. 38 may be optional or rearranged in different implementations. The method in FIG. 38 may be used when data loss or data latency is caused by disconnected cables, network infrastructure or equipment malfunction, or when data rates for tool face updates degrade beyond a threshold for accurate and reliable control loop operation. The method in FIG. 38 describes how, at any point in time when a loss of data or a high latency of data occurs and automated slide drilling system cannot continue operating normally, the automated slide drilling system may be programmed to disengage in order to avoid any possible damage to the path of the borehole. Prior to the method, the automated slide drilling system is engaged and operating. After the method, automated slide drilling system and the auto driller are disengaged.

FIG. 38 may begin at step 3810 with the automated slide drilling system recognizing data loss or data latency. At step 3812, the automated slide drilling system is disengaged. At step 3816 a decision is made whether the automated slide drilling system is actively controlling a slide. When the result of step 3816 is YES, and the automated slide drilling system is actively controlling a slide, at step 3818 auto driller disable is requested from rig controls by the automated slide drilling system. At step 3820, rig controls disables the auto driller. When the result of step 3816 is NO, and the automated slide drilling system is not actively controlling a slide, at step 3822 setup of the slide is interrupted by the automated slide drilling system. After step 3822 and after step 3820, at step 3824, the automated slide drilling system releases control of drilling. At step 3826, the controlling system is changed from the automated slide drilling system by rig controls.

The automated slide drilling system software may be hosted on a server located in the driller's cabin with the desired connections to the rig controls and MWD Directional system. The software comprising the automated slide drilling system can also be co-hosted alongside or even integrated with the BGS software on the same server. The automated slide drilling system software may be implemented utilizing the Java programming language and may make use of object-oriented design practices. The automated slide drilling system software may include one or more software modules, each module representing a group of functionality that meets one or more requirements. The automated slide drilling system software design approach can be divided into two major groups of modules: data input/output modules 3902, and algorithm modules 3903. The data input/output modules may be focused on interfacing with other systems and provide data handling and storage. Additionally, the data input/output modules 3902 may also provide higher level control modules for more complicated control transactions (e.g., orient top drive, change oscillator offset, etc.). The algorithm modules 3903 may comprise the logical components that more directly relate to the automated slide drilling system.

Figure 39:
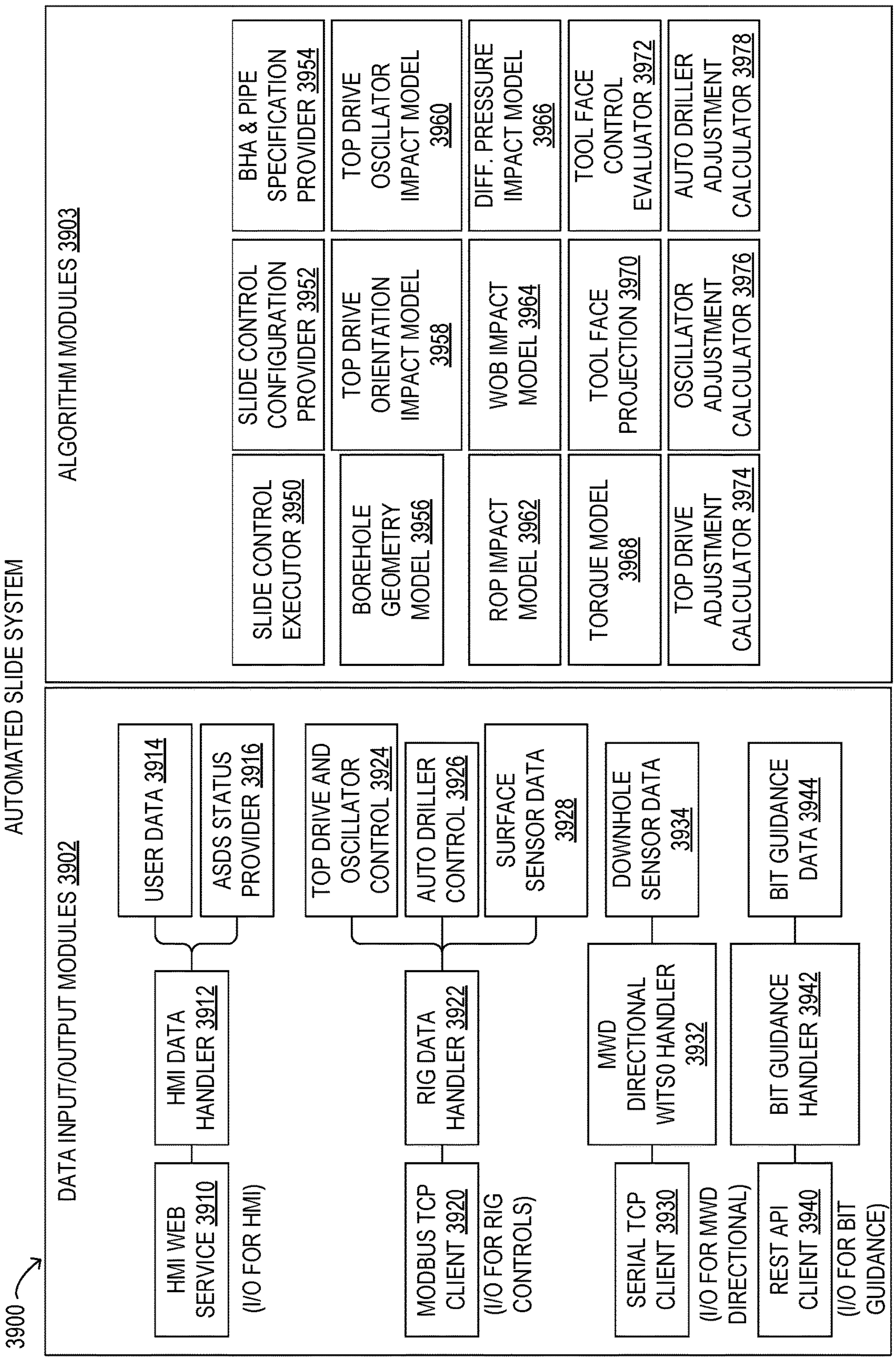
FIG. 39 illustrates one embodiment of a software architecture and algorithms used to implement an automated slide system.

FIG. 39 illustrates one embodiment of a software architecture and algorithms used to implement an automated slide system. FIG. 39 depicts one example of a logical breakdown of software modules per functional allocations. The data input/output modules 3902 of FIG. 39 include various system interfaces, including a HMI web service 3910 that can provides a web service application programmable interface (API) to exchange data with the Motive HMI; a Modbus TCP client 3920 for an interface with the rig controls (e.g., MWD directional WITS0 data stream via the protocol translator) using the Modbus TCP protocol; a serial TCP client 3930 that is enabled to provide a stream of data based on a TCP or serial data stream; a representational state transfer (REST) API client 3940 that is enabled to provide the web based transactional behavior for the bit guidance data handler.

Additionally, in FIG. 39, a layer of data handlers interfaces with the system interfaces. Specifically, data input/output modules 3902 include an HMI data handler 3912 that is enabled to handle data requests and data formatting for HMI web service 3910; a rig data handler 3922 that is enabled to handle data requests and data updates for the Modbus TCP client 3920; a MWD directional WITS0 handler 3932 that is enabled to handle the WITS0 tags received from the serial TCP client 3930; and a bit guidance data handler 3942 that is responsible for making requests for data from the BGS and putting the data in the data store.

Additionally, in FIG. 39, data input/output modules 3902 include data storage & high-level controllers: user data 3914 stores any data that is user entered from the HMI; an automated slide drilling system status provider 3916 is responsible for providing status for slide execution behavior; top drive & oscillator control 3924 is responsible for compartmentalizing control sequences required to orient the top drive and control the oscillator; auto driller control 3926 is responsible for compartmentalizing control sequences required to change auto driller set points and respond to auto driller changes; surface sensor data 3928 stores and manages surface sensor data received from the rig data handler; downhole sensor data 3934 stores and manages downhole sensor data from MWD directional; and bit guidance data 3944 stores and manages data from bit guidance (BGS).

The algorithm modules 3903 of FIG. 39 include: a slide control executor 3950 that is responsible for managing the execution of the slide control algorithms; a slide control configuration provider 3952 that is responsible for validating, maintaining, and providing configuration parameters for the other software modules; a BHA & pipe specification provider 3954 that is responsible for managing and providing details of the BHA and drill pipe characteristics; a borehole geometry model 3956 that is responsible for keeping track of the borehole geometry and providing a representation to other software modules; a top drive orientation impact model 3958 that is responsible for modeling the impact that the top drive orientation changes have had on the tool face control; a top drive oscillator impact model 3960 that is responsible for modeling the impact that the top drive oscillator has had on the tool face control; an ROP impact model 3962 that is responsible for modeling the effect on the tool face control of a change in ROP or a corresponding set point; a WOB impact model 3964 that is responsible for modeling the effect on the tool face control of a change in WOB or a corresponding set point; a differential pressure impact model 3966 that is responsible for modeling the effect on the tool face control of a change in differential pressure or a corresponding set point; a torque model 3968 that is responsible for modeling the comprehensive representation of torque for surface, downhole, break over, and reactive torque, modeling impact of those torque values on tool face control, and determining torque operational thresholds; a tool face control evaluator 3972 that is responsible for evaluating all factors impacting tool face control and whether adjustments need to be projected, determining whether re-alignment off-bottom is indicated, and determining off-bottom tool face operational threshold windows; a tool face projection 3970 that is responsible for projecting tool face behavior for top drive, oscillator, and auto driller adjustments; a top drive adjustment calculator 3974 that is responsible for calculating top drive adjustments resultant to tool face projections; an oscillator adjustment calculator 3976 that is responsible for calculating oscillator adjustments resultant to tool face projections; and an auto driller adjustment calculator 3978 that is responsible for calculating auto driller adjustments resultant to tool face projections.

In one embodiment, an automated slide drilling system may be used to provide detailed instructions to an operator who may then control the rig components and operations. For example, once a slide is indicated (such as determined by the BGS), the automated slide drilling may receive the information about the upcoming slide from the BGS, obtain information about the BHA, its location, tool face orientation, etc., and then may provide either or both of (1) instructions or directions for an operator to control the rig and drilling operations to perform the slide, and (2) detailed parameters for operation of the rig components and operations for performance of the slide. Examples of the former (1) might include providing the operator with an appropriate target ROP and slide duration for a given tool face orientation. Examples of the latter (2) might include providing the operator with specific parameters for controlling the top drive, draw works, and the like. In the latter (2) case, the operator thus maintains control over the drilling operations, but the automated slide drilling system may provide specific parameters to be followed by the operator. In addition, the automated slide drilling system may obtain information from downhole and surface sensors during drilling, and use such information to compare the actual rig operations to those provided by the automated slide drilling system to the operator to determine if the drilling operations are within acceptable thresholds and provide an appropriate display or alert to the operator and one or more other systems or devices, such as by text message, email, or other alert.

In yet another embodiment, the automated slide drilling system may be configured to have a tutor mode of operation. In a tutor mode, the automated slide drilling system may be connected to a drilling rig or may be configured as a simulator, and may be used by operators to obtain training for control of various types of drilling operations, conditions, events, and the like.

Figure 40A:
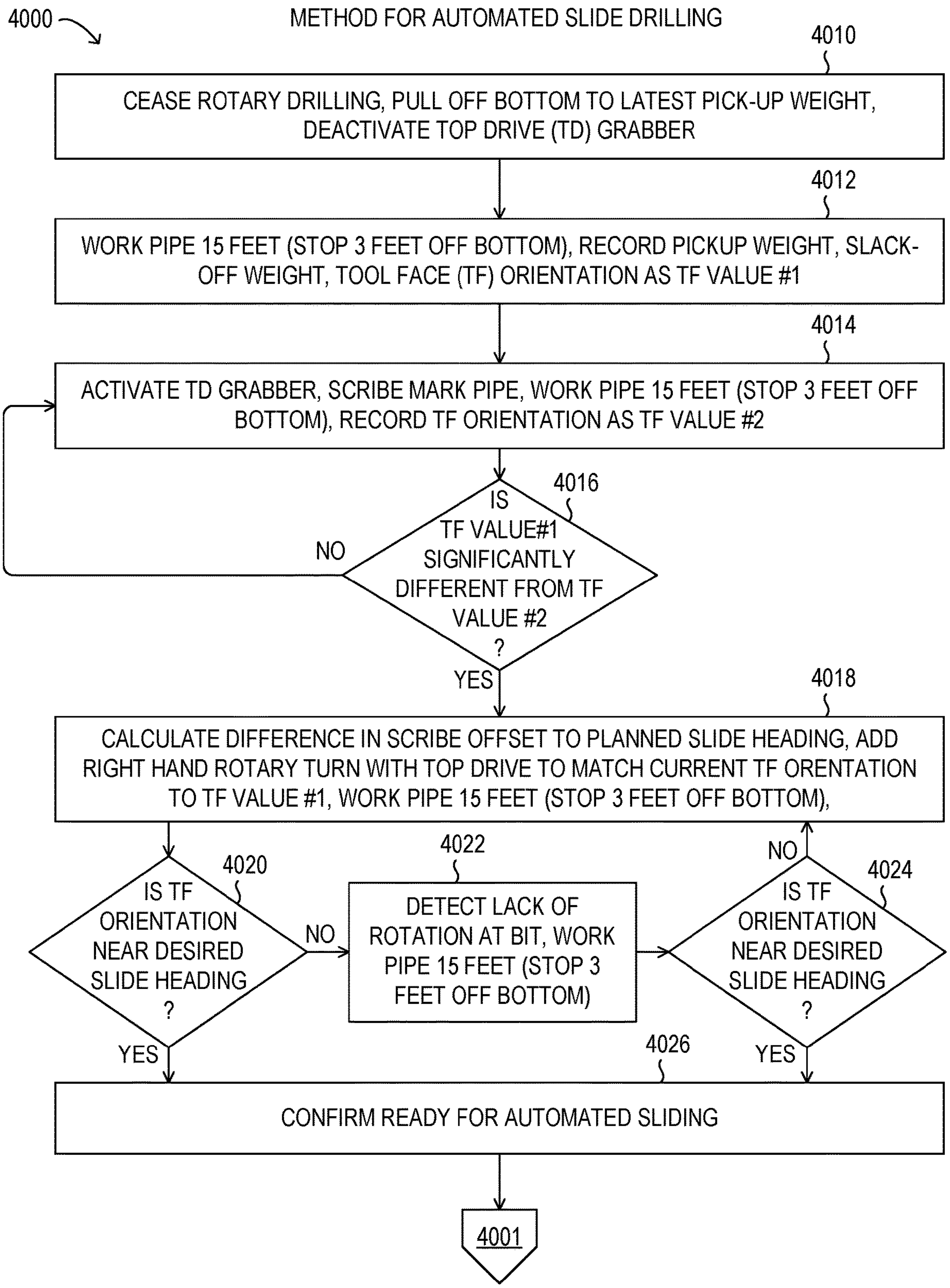
FIGS. 40A and 40B illustrate one embodiment of a method for automated slide drilling.
Figure 40B:
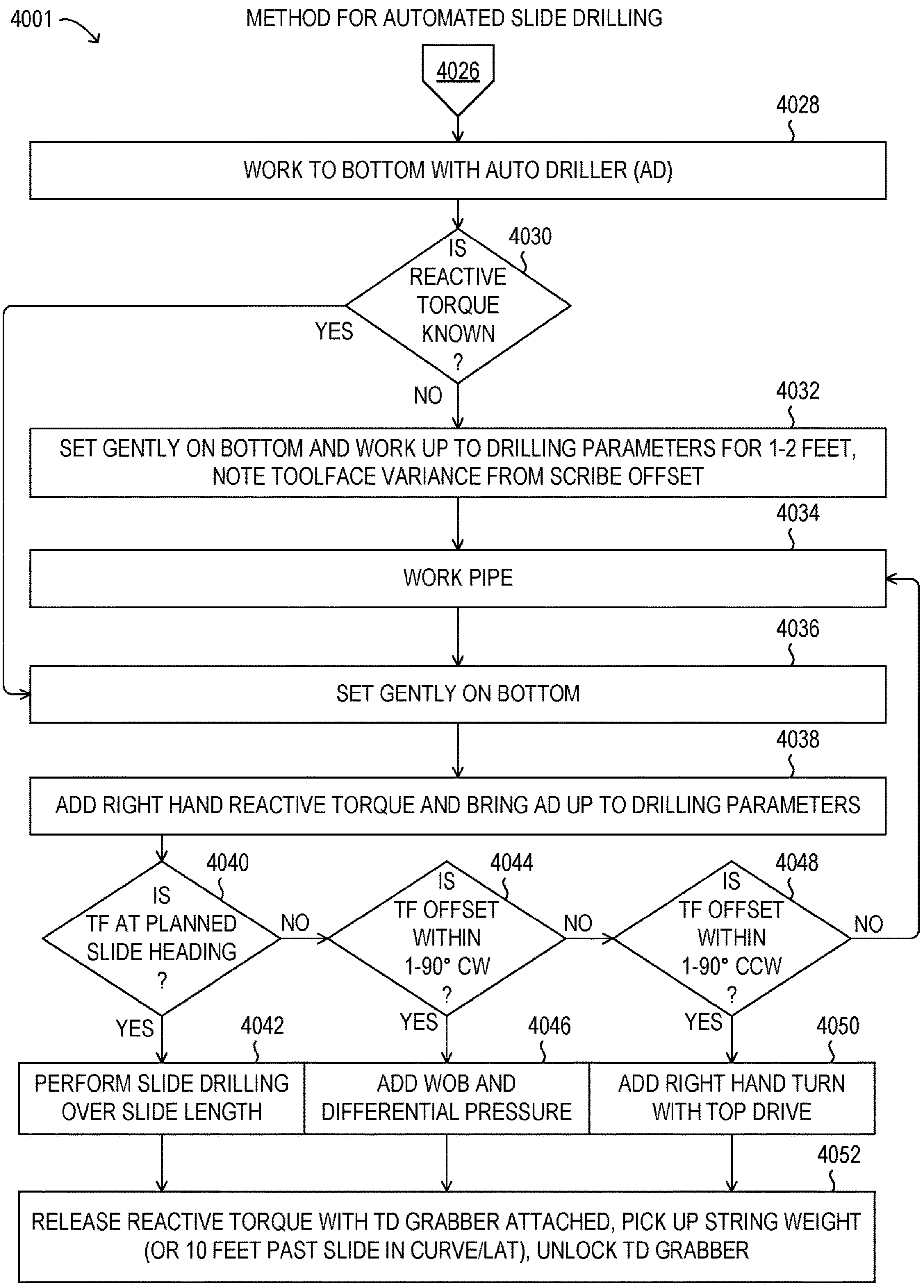

FIGS. 40A and 40B illustrate one embodiment of a method 4000, 4001 for automated slide drilling. Method 4000, 4001 provide a flow chart illustrating a slide drilling process that may be followed by an operator using the automated slide drilling system either for drilling operations or for simulating drilling operations in order to obtain training for controlling a rig and its components and operations during drilling. It is noted that the operations in methods 4000, 4001 may be optional or rearranged in different embodiments. Methods 4000, 4001 provide specific examples with certain values for descriptive purposes, however, it will be understood that in different implementations different values and ranges of values may be used. For example, although fixed values are described in methods 4000 and 4001, the values may be variable or dynamically adapted based on wellbore conditions or placement, tool conditions or composition, formation conditions, wellbore orientation or depth, angular position in the wellbore, location along with wellbore, and other factors.

Method 4000 may begin at step 4010 by ceasing rotary drilling, pulling off bottom to the latest pick-up weight, and deactivating the top drive grabber. At step 4012, the pipe is worked 15 feet (stop 3 feet off bottom), the pickup weight and the slack off weight are recorded, and the tool face orientation is recorded as TF value #1. At step 4014, the top drive grabber is activated, the pipe is scribe marked, the pipe is worked 15 feet (stop 3 feet off bottom), and the tool face orientation is recorded at TV value #2. At step 4016 a decision is made whether TF value #1 is significantly different from TF value #2. When the result of step 4016 is NO, and TF value #1 is not significantly different from TF value #2, method 4000 loops back to step 4014. When the result of step 4016 is YES, and TF value #1 is significantly different from TF value #2, at step 4018, a difference in the scribe offset to the planned slide heading is calculated, a right hand rotary turn with the top drive is added to match current tool face orientation to TF value #1, and the pipe is worked 15 feet (stop 3 feet off bottom).

With respect to step 4016, although not shown in FIG. 40A, a confidence level value for each toolface reading may be provided and may be used. For example, a toolface confidence value may be derived from a surface decoder of the information provided, such as by mud telemetry, for the toolface, based on the interference, noise, and other potential problems in the signals provided from downhole with respect to the toolface. The toolface confidence value may be a number from 0 to 100, for example, and may be used by the ASDS to determine whether and to what extent a particular toolface value is likely to be a correct or incorrect reading, and whether and to what extent further action or corrective action may be appropriate. For example, the ASDS may be programmed so that a toolface value that varies significantly from a prior value, especially if coupled with a low confidence level value, may be ignored. The ASDS also may be programmed to wait for another toolface reading before taking corrective action. Alternatively, if a toolface value is similar or close to a prior toolface value, and is associated with a high confidence level, the ASDS may be programmed to accept the current toolface reading, and either take action or no action, as appropriate. And if the toolface value varies significantly from a previous toolface reading, and is associated with a high confidence level, the ASDS may be programmed to take corrective action or provide an alert to an operator.

In addition, a toolface score (indicated by TF Score in FIG. 41) may be provided. The toolface score for the slide operation can be calculated by the ASDS as a function of the mean of toolface readings to target toolface, the mean of toolface readings, the statistical distribution of toolface readings throughout the slide operation, or as a function of time, depth, drill string length, squat of the drill string, or a combination of some or all of the foregoing. For example, the relative value of the component for the toolface score that is associated with certain points of the slide operation may be more important than the component of the toolface score associated with other points during a slide operation (e.g., the toolface score determined at the beginning of a slide operation while there is squat in the drill string may be less important than the toolface score determined once the slide drilling has begun).

At step 4020, a decision is made whether the tool face orientation is near the desired slide heading. When the result of step 4020 is NO, and the tool face orientation is not near the desired slide heading, at step 4022, a lack of rotation at the bit is detected, and the pipe is worked 15 feet (stop 3 feet off bottom). At step 4024, a decision is made whether the tool face orientation is near the desired slide heading. When the result of step 4024 is NO, and the tool face orientation is not near the desired slide heading, method 4000 loops back to step 4018. When the result of step 4020 or step 4024 is YES, and the tool face orientation is near the desired slide heading, at step 4026, ready for automated sliding is confirmed. After step 4026, method 4000 proceeds to method 4001 in FIG. 40B.

In FIG. 40B, method 4001 begins from step 4026 in method 4000 at step 4028 by working to the bottom with the auto driller. At step 4030 a decision is made whether the reactive torque is known. When the result of step 4030 is YES, and the reactive torque is known, method 4000 loops ahead to step 4036. When the result of step 4030 is NO, and the reactive torque is not known, at step 4032, the drill pipe is set gently on bottom and the rig is worked up to drilling parameters for 1-2 feet, and the tool face variance is noted from the scribe offset. At step 4034, the pipe is worked. At step 4036, the pipe is set gently on bottom. At step 4038, right hand reactive torque is added, and the rig is brought up to drilling parameters. At step 4040, a decision is made whether the tool face is at the planned slide heading. When the result of step 4040 is NO and the tool face is not at the planned slide heading, a decision is made at step 4044 whether the tool face offset is within 1-90° clockwise. When the result of step 4044 is NO and the tool face offset is not within 1-90° clockwise, a decision is made at step 4048 whether the tool face offset is within 1-90° counterclockwise. When the result of step 4048 is NO and the tool face offset is not within 1-90° counterclockwise, method 4000 loops back to step 4034. When the result of step 4040 is YES and the tool face is at the planned slide heading, at step 4042, slide drilling is performed over the slide length. When the result of step 4044 is YES and the tool face offset is within 1-90° clockwise, at step 4046, WOB and pressure differential are added. When the result of step 4048 is YES and the tool face offset is within 1-90° counterclockwise, at step 4050 a right hand turn is added with the top drive. After steps 4042, 4046, or 4050, at step 4052, reactive torque is released with the top drive grabber attached, string weight is picked up (or 10 feet past slide in curve/lat), and the top drive grabber is unlocked.

Figure 41:
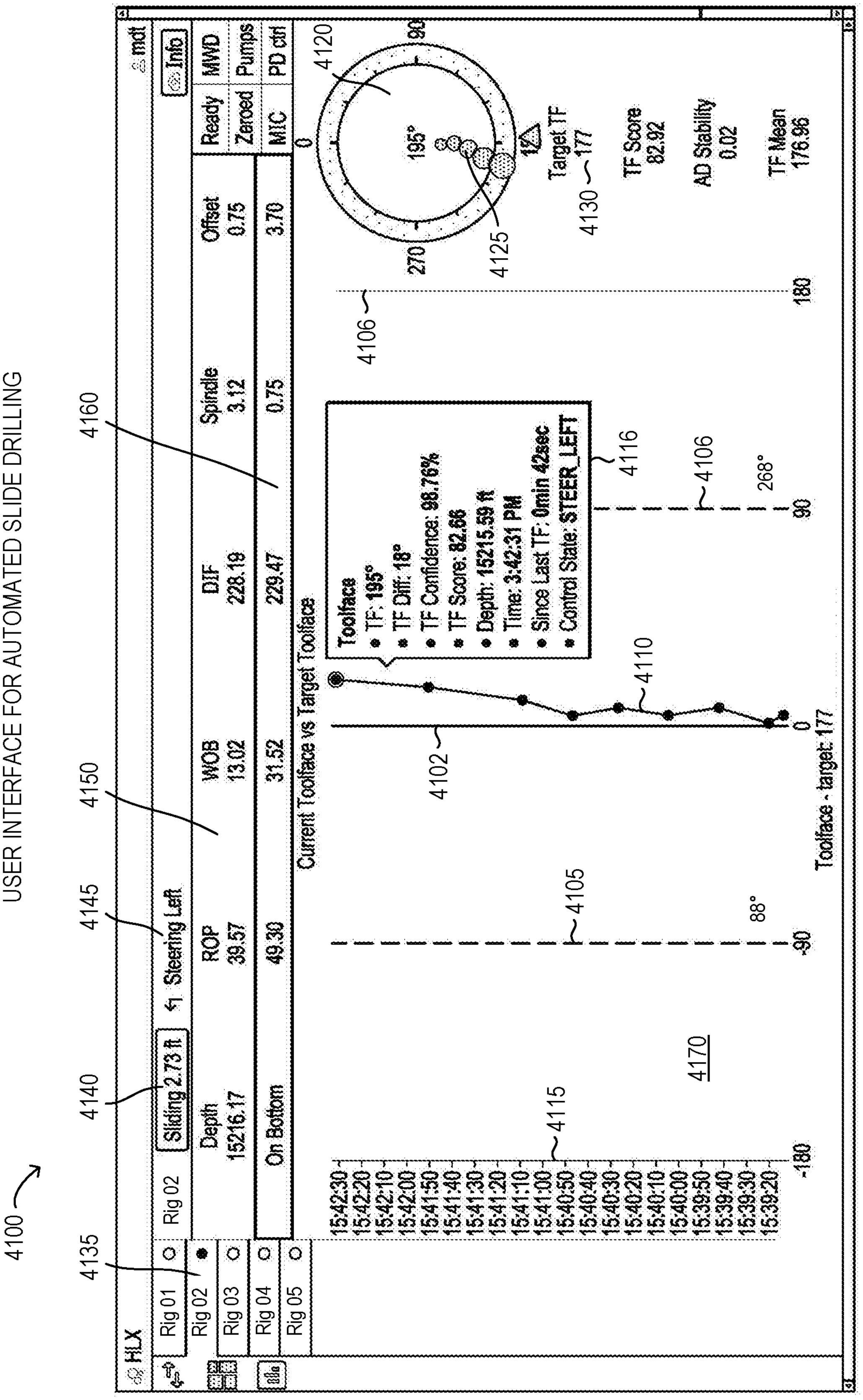
FIG. 41 illustrates one embodiment of a user interface generated by an automated slide drilling system.

A helpful and intuitive graphical user interface may be helpful for an operator using an Automated slide drilling system in accordance with the present disclosure. The automated slide drilling system may include software executable to provide one or more updated, real-time displays during drilling. FIG. 41 provides an exemplary user interface that the automated slide drilling system can provide. In FIG. 41, a center line 4102 is provided as a target for the desired tool face orientation during a slide drilling operation. Spaced apart from the target line 4102 in the center of a display portion on opposing sides are dashed lines indicating a tool face orientation of −90 degrees and +90 degrees from the desired tool face orientation on the left and right hand sides of the target line 4102, respectively. Even further to the sides are light lines indicating that the tool face orientation is −180 degrees (line 4115) and +180 degrees from the desired tool face orientation on the left and right sides, respectively, of the center, target line 4102 shown in FIG. 41. The user interface 4100 shown in FIG. 41 provides specific examples with certain values for descriptive purposes, however, it will be understood that in different implementations different values and ranges of values may be used. For example, although specific exemplary values are described in user interface 4100, the values may be variable or dynamically adapted based on wellbore conditions or placement, tool conditions or composition, formation conditions, wellbore orientation or depth, angular position in the wellbore, location along with wellbore, and other factors.

The user interface of the automated slide drilling system, as illustrated in FIG. 41, may contain additional information. A series of dots 4125 are shown on the user interface in FIG. 41. In this example, each dot represents a measurement or determination of tool face orientation at a given time, with the most recent measurement or determination at the top of the user interface. In addition, a time sequence is provided on the left hand side of the user interface so that an operator can see when each of the tool face measurements or determinations was made. Moreover, the user interface can also provide a variety of rig parameters 4150, such as ROP, WOB, differential pressure, and the like, and can provide a current tool face target 4130, a score indicating how well the automated slide drilling system and operator are doing in staying on target with the tool face orientation during the slide, and the like.

In general, it may be more cost effective to drill a well faster, and therefore it is generally desirable that a slide be performed quickly. However, increasing ROP during a slide can present problems with maintaining or controlling tool face orientation during the slide. As a general proposition, the automated slide drilling system, as well as a human operator, can on balance maintain more precise control over a slide, including the tool face orientation during the slide, with a slower optimal ROP than with the fastest ROP possible. In situations when it is important to precisely control the slide and the tool face orientation during the slide, it may be appropriate to decrease ROP. Conversely, if the slide to be performed is such that a wider margin is appropriate, it may be desirable to perform the slide with a faster ROP.

Increasing ROP or decreasing ROP for a slide can result in destabilizing the tool face orientation. For example, increasing ROP (such as by increasing WOB and/or differential pressure) may result in destabilizing the tool face orientation in a counterclockwise direction during a slide. Conversely, decreasing ROP during a slide (such as by decreasing WOB and/or differential pressure) may result in destabilizing the tool face orientation in a clockwise direction. For purposes of this discussion, destabilizing the tool face orientation may be considered a movement of the orientation away from the target or desired orientation. Similarly, stabilizing the tool face orientation can be considered as keeping the orientation on or close to the target or desired orientation, or within a desired range of the tool face orientation.

Adjustments to the angular position of the top drive can be made in angular increments, such as a move from 20 degrees to 30 degrees. The angular position may be defined and used in units of a "wrap," which is a 360 degree movement of the top drive. Adding a wrap in a clockwise or counterclockwise direction may be done to control tool face orientation. However, increasing or decreasing wraps without corresponding changes to ROP can also destabilize the tool face orientation. For example, increasing wraps without an offsetting change to ROP will likely result in destabilizing the tool face orientation in a clockwise direction. Decreasing wraps without an offsetting change to ROP will likely result in destabilizing the tool face in a counterclockwise direction.

In order to reach an ideal ROP and still maintain appropriate control over a slide, it may be important to adjust various drilling parameters. For example, if it is desired to increase ROP while sliding, an operator or the automated slide system described above can increase WOB and/or differential pressure. The operator or automated slide drilling system can also make appropriate adjustments to the wraps in the appropriate direction in order to maintain tool face orientation and avoid destabilizing the tool face, such as by sending one or more control signals to the rig's auto driller. Such adjustments may be made in a desired sequence. For example, the automated slide drilling system can be programmed such that, when an increase in ROP is indicated or desired, the automated slide drilling system may first send one or more control signals to the auto driller (or to the rig's top drive control system) to increase the wraps by a value related to and based upon the changes to be made to WOB and/or differential pressure to increase the ROP. The automated slide drilling system may include or may use one or more databases which include data that correlates increases and/or decreases in WOB, differential pressure, wraps, and/or ROP with one another. The automated slide drilling system can also be programmed to either request or receive input from an operator before implementing any changes in WOB, differential pressure, ROP, and/or wraps during a slide. In addition, the data used to correlate changes in WOB, ROP, and/or differential pressure with corresponding changes in wraps can be based on empirical data, historical data (such as from other wells, from other operators, etc.), data input by an operator, other data sources, or combinations thereof.

Various control sequences may be used as either open or closed loop control of tool face. For example, the automated slide drilling system can be programmed to send appropriate control signals to the top drive control system, the draw works control system, the oscillator, and/or the mud pump control system to increase wraps first, then wait a predetermined amount of time, then increase either or both WOB and differential pressure to increase ROP by an appropriate amount corresponding to the amount of the increased wraps. The amount of time between sending the control signals for increasing wraps and the control signals for increasing ROP can be based on a number of factors, including the length of the drill string and the time needed for an increase in wraps to propagate down the drill string to the bit. Alternatively, the automated slide drilling system can be programmed so that the automated slide drilling system monitors data from one or more surface and/or downhole sensors after sending a control signal to increase wraps and, after determining from the data received from such sensors that the wraps have been propagated, then send appropriate control signals to increase WOB and/or differential pressure. In like fashion, the automated slide drilling system can be programmed to automatically, or upon input from an operator, decrease wraps, allow a time period to elapse, and then decrease WOB and/or differential pressure by amounts which correspond to the amount of the decrease in wraps in order to decrease ROP without destabilizing the tool face orientation. If desired, the automated slide drilling system can be programmed to increase or decrease ROP, such as by increasing or decreasing WOB and/or differential pressure, respectively, then increase or decrease wraps, respectively, by an amount corresponding to the amount by which the ROP has been increased or decreased.

In an alternative embodiment, the automated slide drilling system may be coupled to a database which may include historical data from other wells, data from earlier in the same well, and/or a combination thereof. The data in the database may include information such as measured depth of the well, most recent tool face orientation, and a target tool face orientation, and may also include additional information, including one or more control data elements. In one embodiment, the automated slide drilling system obtains measured depth for a wellbore while drilling, and then searches the database for a data set with the same or substantially similar (e.g., within +/−90 feet or so) measured depth value. The automated slide drilling system can also be programmed to search for and select a dataset with the closest measured depth value. In addition, the automated slide drilling system may be programmed to search the database and select the control data set for the entry at that measured depth with the same or substantially similar difference between the most recent tool face and the target tool face orientation as determined in the wellbore being drilled. The control data set corresponding to each measured depth may include any one or more of ROP, WOB, differential pressure, surface torque, spindle position, oscillation control, and the like. Likewise, information relating to formation characteristics, the bore hole assembly, and other parameters with historic information can be used as part of the control data set.

Once the appropriate control data set has been selected by the automated slide drilling system from the database, the automated slide drilling system can compare the control data set against various rules or limits to be sure that application of the control data set will not cause other problems. Such rules or limits may include parameters such as minimum and/or maximum ROP or WOB values, minimum or maximum differential pressure values, and/or maximum spindle or oscillation values. If the control data set does not violate such rules or limits, then the automated slide drilling system may send appropriate control signals to the rig control systems to implement appropriate adjustments to change from current ROP, WOB, differential pressure, and the like to the corresponding ROP, WOB, differential pressure, and the like, respectively, of the selected control data set. If the drilling rig has an auto driller, then the automated slide drilling system can be coupled to the auto driller and send appropriate control signals to the auto driller for implementation. If one or more of the data elements in the selected control data set violate one or more of the rules or limits, then the automated slide drilling system can be programmed to select the control data set with the next closest measured depth and/or difference between most recent tool face orientation and target tool face orientation. If the database contains a sufficiently large enough amount of data, then the automated slide drilling system may be programmed to select a control data set based on one or more algorithms, such as linear or polynomial regression based on one or more parameters of the data sets in the database.

A generalizable set of models can be used to help model and control downhole drill string dynamics. For example, in many situations the mud motor and drill bit relate translational weight or energy applied down the drill string controlled by the draw works. The reactional torque induced through the mud motor and drill bit drilling against the formation may create a corresponding force in the rotational axis. This force can be counterbalanced by the torsion in the drill string and can be controlled from the top drive at the top of the drill string. Two simple models such as a mass-spring-damper system representing translational effects from the drill string, and a mass-spring-damper system representing torsional effects on the drill string, can be used to estimate how to best balance or offset these forces. When these forces are in balance, a well-controlled, steady state tool face can be maintained to allow for precise well bore steering. Furthermore, various sensors can be used for providing real-time information that can be used to assess the system dynamics of the model. For example, sensors can determine information such as: ROP, WOB, differential pressure, and downhole tool face, and this information can be used as measures of energy in the translational axis. Sensors can also determine information such as: top drive torque, net spindle wraps measured from surface induced into the drill string from a neutral state, differential pressure, and down hole tool face. This information can be used as measures of energy contributions in the rotational axis. More elaborate system models, like a larger system of ordinary differential equations, a set of stochastic differential equations, a neural network, and/or a finite element model could also be employed to improve the accuracy and precision of a system model.

A method for modeling drill string dynamics can be used to model energy induced into the drill string in steady state conditions or in conditions involving controlled dynamic movements of tool face. The model can also incorporate the non-linear effect of break over when the drill string moves from static to dynamic friction both in the translational and rotational axis. When attempting to control the tool face orientation, it may be important to overcome these break over forces before the desired control of drill string is achieved. Anticipating the necessary differential pressure, WOB in the translational axis, and the necessary torque or wraps required in the rotational axis, can be used in optimizing a controller to maintain tool face orientation as desired.

Using the state of the two system models described, the balance and intentioned imbalance of the models can be used to optimally control for both tool face orientation and drill string stability. For example, it is not uncommon for a formation of hard rock or other external influences to destabilize the drill string and/or tool face orientation. By monitoring the information obtained from sensors, the automated slide drilling system can observe the instability in system mismatches and oscillatory effects on sensors. Using the balance model, the automated slide drilling system can either delay additional control maneuvers to allow transient effects to subside, or it can automatically send appropriate control signals to induce the proper counter balancing effect, such as by sending control signals for increasing/decreasing ROP, WOB, differential pressure, and/or adding/removing spindle wraps, to have a stabilizing effect.

For a case involving moving the tool face orientation to a new tool face target, the intentional control of the draw works and top drive control to temporarily destabilize the drill string in a manner to steer the drill string in the desired direction to achieve the new target orientation can be an initial step. The subsequent step after some intentioned period of time or series of time steps which can be applied by either a prescribed amount of time, or by actively computing the error to target and feeding that to the system controller until the target is reached, can properly actuate the stabilizing effect of draw works and top drive control. The automated slide drilling system in such cases can be managed in a simple open loop control, state machine style control, a classical control style such as a proportional-derivate-integral controller, or LQR, or any number of modern control techniques.

In FIG. 41, an example of a graphical user interface (GUI) 4100, or simply user interface 4100, useful in connection with the systems and methods disclosed herein is provided. The GUI 4100 is one example of a user-friendly, intuitive visual presentation of the operation of the systems and methods described herein for automated sliding operations. In FIG. 41, it can be seen that the GUI may be divided into several different areas, such as areas 4135, 4150, 4160, and 4170. In area 4170, a list of times next to line 4115 is displayed, with the most recent time displayed at the top of display area 4170. It is noted that the time scale in area 4170 may be replaced with another scale, such as depth, distance, or another metric. In addition, a comparison of the determined tool face 4110 to the target tool face 4102 is provided. The comparison may also include a box 4116 which may include details corresponding to each of the points plotted on the line depicting determined tool face 4110. Such details for each point may include information such as the tool face in degrees, the difference in degrees between the determined tool face 4110 at that point versus the target tool face 4102, the confidence level in the determined tool face, a tool face score, a depth measured in feet (which may be measured depth or true vertical depth), the elapsed time of the slide drilling operation, the elapsed time since the last determination of actual tool face 4110, and a control status, such as a status corresponding to that shown in area 4145. Alternatively, the user interface 4100 may be configured so that a user may "hover" a cursor over the point on line 4110 of interest, at which point the box 4116 may appear and be displayed so long as the cursor remains over the point. Alternatively, the system may be programmed to display the box 4116 and related information when a user clicks on a tool face point on line 4110.

Area 4170 of the GUI may include two lines 4105 and 4106 to the left and right, respectively, of the plot of actual tool face 4110 versus target tool face 4102, and each of the lines 4105 and 4106 may correspond to a tool face orientation that is 90 degrees in either direction from the target tool face orientation, such as minus 90 degrees on the left for line 4105 and plus 90 degrees on the right for line 4106. The lines 4105 and 4106 help provide a visual cue as to the relationship between the actual tool face and the target tool face.

The area 4135 may include a list of rig identifiers, and may indicate the rig that is currently drilling a well borehole, such as by shading, highlighting, or the like. As indicated in the GUI 4100 of FIG. 41, rig no. HP 427 is highlighted as the rig being used. The rig identifier can also be provided in one or more other areas of the GUI 4100.

At the top of the GUI 4100, a highlighted area 4140 is provided, which indicates the current drilling operation. In this particular screen display example, the operation is shown as "Sliding 2.73 ft." In addition, the control status area 4145 may display a current control status; in this particular example, the control status "Steering Left" is shown.

The area 4170 may also include a visual display of the actual tool face 4110 versus the target tool face orientation 4102 in an alternative configuration 4120. In the display area 4120, the current actual tool face of 195 degrees is identified in the middle of a circle with the degrees indicated around the circle. The actual tool face may be shown as a series of dots 4125 extending from the exterior of the circle to the interior of the circle to indicate the difference between the actual tool face and the target tool face at various points. Immediately below the circle may be an arrow or other indicator showing the target tool face orientation (in this example, the target tool face is 177 degrees). Below the circular display 4120, another display area 4130 may be provided. In the display area 4130, several different items of information may be provided. In this example, the target tool face of 177 degrees is listed, as is a tool face score, a value for AD stability, and a value for tool face mean. The series of dots 4125 and/or the dots 4110 can vary in size, color, shape, style, and so forth based on toolface confidence level values, although in FIG. 41 the series of dots 4125 are shown as varying in size only based on the time sequence.

Still referring to FIG. 41, additional display areas 4150 and 4160 may be provided above display area 4170. In this particular example, the display area 4150 is used to display several different items of information regarding drilling operations and drilling parameters prior to the immediate slide drilling operations. In this example, area 4150 displays depth, ROP, WOB, differential pressure (DIF), the spindle location, and the amount of offset. Display area 4160 may be used to provide information regarding current drilling operations and parameters. The display areas 4150 and 4160 may each display the values for the same parameters, albeit under different drilling conditions and at different times, such as shown in FIG. 41. Alternatively, the display areas 4150 and/or 4160 may be adapted to provide a first set of parameters for prior conditions and a second set of parameters for current conditions. Alternatively, the displays areas 4150 and/or 4160 may be adapted to provide a first set of parameters for rotary drilling operations and a second set of parameters for slide drilling operations.

As drilling operations continue, the system may be programmed to provide and display updated information at selected intervals, such as every 10 seconds, 20 seconds, 30 seconds, or such longer or shorter intervals as may be desired. As updated information becomes available, the updated tool face information may be provided as an additional point in one or both of the displays of actual tool face 4110 and 4125 and older points may be deleted from the display. In addition, as drilling operations continue, the display of actual tool face 4110 versus target tool face 4102 may be adjusted to correspond to the time indicators in display field 4115. Moreover, as drilling operations continue, one or both of the displays 4115 and 4110 may scroll downward automatically, so that more recent information is provided at the top of display area 4170. In addition, the values for the current drilling parameters, such as those shown in data field 4160, may be automatically updated as new information is provided or may be updated at the same or different intervals as those for the tool face data plot updates.

The GUI 4100 thus provides an effective and simple display by which ongoing drilling operations can be monitored by visual inspection.

The following guide explains the use of various acronyms in the foregoing disclosure and/or the figures.

| Acronym | Name | Description |
|---|---|---|
| API | application programmable interface | A set of clearly defined methods of communication between various software components. |
| BGS | bit guidance system | The BGS may automatically perform all standard calculations done by the directional driller, but performs them faster and more consistently. The system also may perform a great deal of additional engineering and economic analyses. The system may perform steering decisions based on these improved calculations, while being informed by operator-defined parameters and accurately considering all the costs to the asset associated with each decision. The BGS may provide slide and rotate start and stop depths along with target tool face orientation to automated slide system. |
| BHA | bottom hole assembly | A collection of tools that, as an aggregate, assists in the process of drilling a borehole. Usually consists of tools that include drill bits, mud motors, drill collars, stabilizers, and drill pipe. |
| DD | directional driller | The individual with the responsibility of directional steering of the BHA that follows a given well plan. |
| EDR | electronic data recorder | A device that records the decoded mud pulse telemetry from the down hole sensors and provides it to other systems. |
| GR | gamma resistivity | A measurement of naturally occurring gamma radiation to characterize rock or sediment in a borehole. |
| HMI | human machine interface | An interface that facilitates user interactions to a machine. |
| MWD | measurement while drilling | A system that provides measurements of directional drilling information as the well is drilled. |
| PLC | programmable logic controller | A device that can be programmed to control output signals based on logical evaluation of input signals. |
| REST | representational state transfer | An interface design approach that provides interoperability between computer systems; predominantly used for transacting data on the internet. |
| ROP | rate of penetration | The speed at which a drill bit breaks the rock under it to deepen the borehole. |
| TCP | transmission control protocol | A communications protocol to exchange streams of data over Ethernet based network adapters between two or more systems. |
| WITS | wellsite information transfer specification | A communications protocol to exchange drilling data. |
| WOB | weight on bit | The amount of downward force exerted on the drill bit. |

Figure 42:
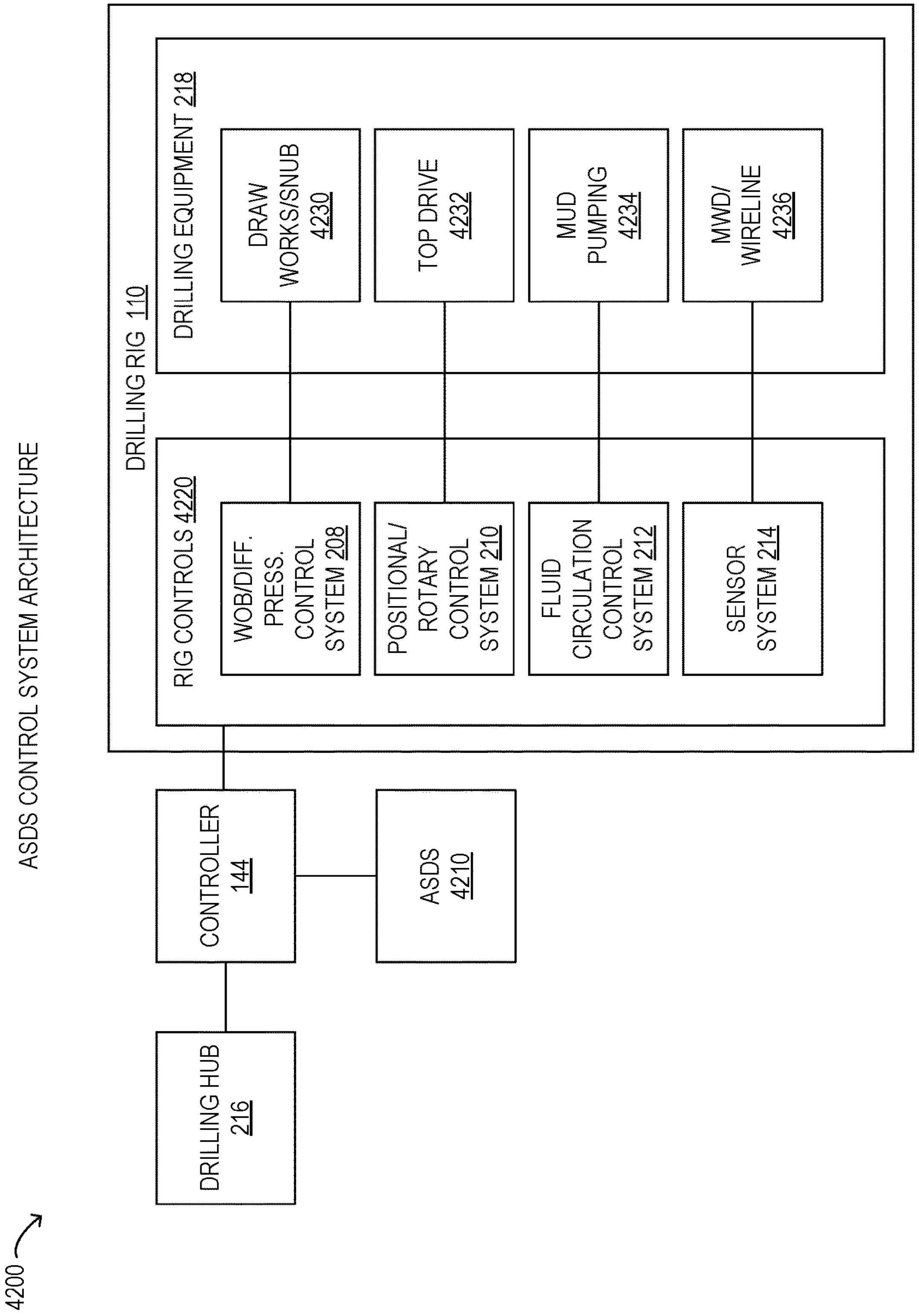
FIG. 42 illustrates one embodiment of an automated slide drilling system control architecture.

Referring now to FIG. 42, an example of an automated slide drilling system (ASDS) control system architecture 4200 is illustrated in schematic form. It is noted that ASDS control system architecture 4200 may include fewer or more elements in different embodiments. As shown, ASDS control system architecture 4200 includes drilling hub 216, controller 144, and ASDS 4210, which may each represent an instance of a processor having an accessible memory storing instructions executable by the processor, such as computer system 1300 shown in FIG. 13 and described above. Controller 144 may represent hardware that executes instructions to implement a surface steerable system that provides feedback and automation capability to the driller. For example, controller 144 may execute the bit guidance system (BGS) described above as functionality of surface steerable system. In particular implementations, controller 144 may be enabled to provide a user interface during slide drilling, such as the user interface 250 depicted and described above with respect to FIG. 2B, or the user interfaces shown in FIGS. 15-18. Accordingly, controller 144 may interface with rig controls 4220 to facilitate manual and automatic operation of drilling equipment 218 included in drilling rig 110. It will be understood that rig controls 4220 may accordingly be enabled for manual or user-controlled operation of drilling, and may include certain levels of automation with respect to drilling equipment 218.

In ASDS control system architecture 4200 of FIG. 42, rig controls 4220 is shown including various controllers and systems in the drilling rig 110, including a WOB/differential pressure control system 208, a positional/rotary control system 210, a fluid circulation control system 212, and a sensor system 214. It will be understood that each of the systems included in rig controls 4220 may be a separate controller, such as a PLC, and may autonomously operate, at least to a degree. The WOB/differential pressure control system 208 may be interfaced with a draw works/snubbing unit 4230 to control WOB of the drill string. The positional/rotary control system 210 may be interfaced with a top drive 4232 to control rotation of the drill string. The fluid circulation control system 212 may be interfaced with mud pumping 4234 to control mud flow and may also receive mud telemetry signals. The sensor system 214 may be interfaced with MWD/wireline 4236, which may represent various BHA sensors and instrumentation equipment, among other sensors that may be downhole or at the surface.

In ASDS control system architecture 4200 of FIG. 42, ASDS 4210 may represent an automated slide drilling system and may be used for controlling slide drilling, as disclosed, and described above. Accordingly, ASDS 4210 may automate operation of rig controls 4220 during a slide, and may return control to controller 144 for rotary drilling, as indicated in the well plan. In particular implementations, ADSD 4210 may be enabled to provide a user interface during slide drilling, such as the user interfaces depicted and described above with respect to FIGS. 15-18 and 41.

Figure 43:
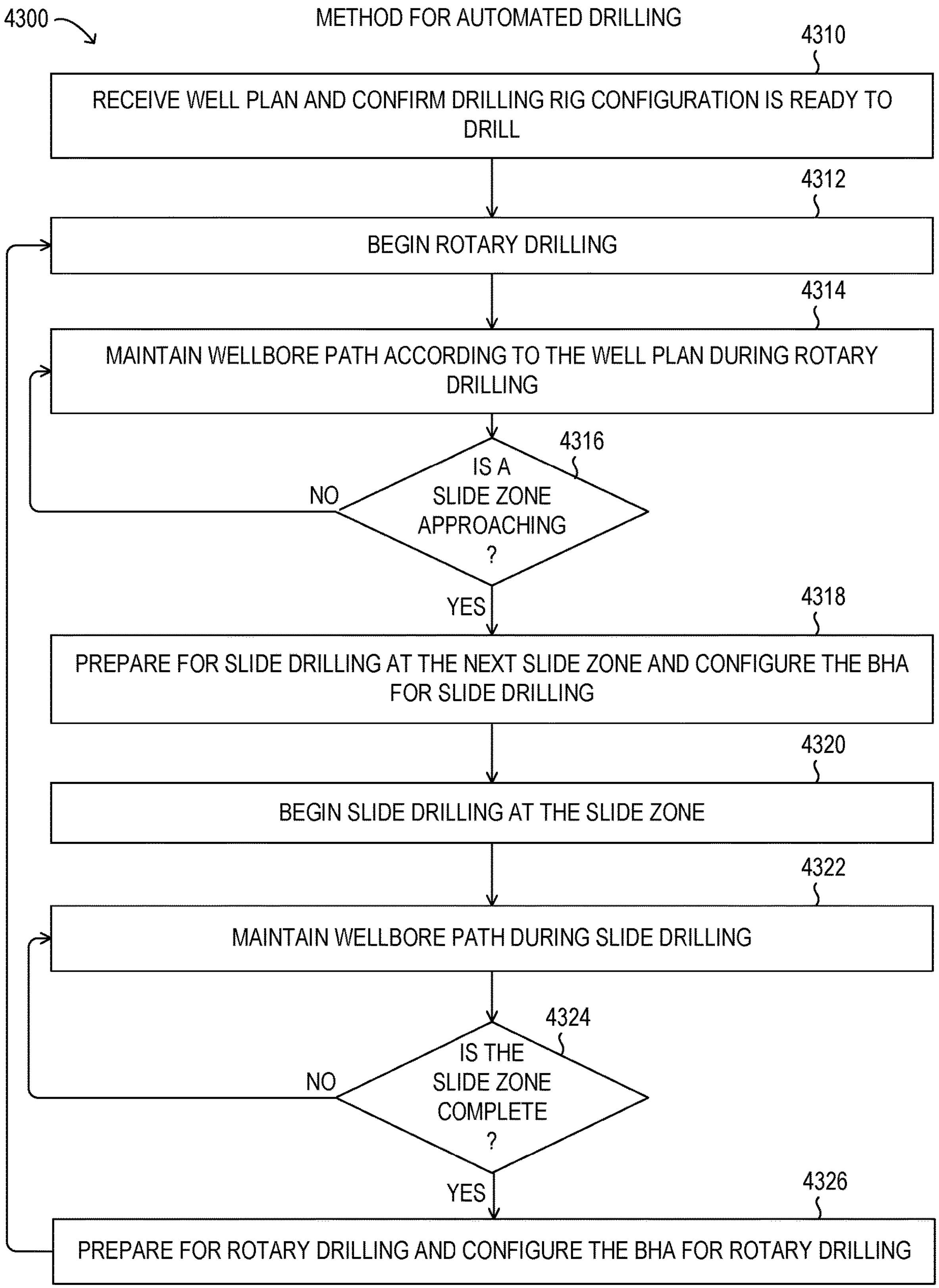
FIG. 43 illustrates one embodiment of a method for automatic drilling.

Referring now to FIG. 43, a method 4300 for automated drilling is shown in flow chart form. Method 4300 may be executed by ASDS 4210 to automatically control both rotary and slide drilling, without user input to interact with rig controls 4220, for example. In other implementations, operations described below in method 4300 may be performed in response to user input, initiated by user input, or in response to polling for user input. Operations described below in method 4300 may involve various notifications to the user or logging of activity by ASDS 4210 for later analysis. In method 4300, it is assumed that a well plan comprises different drilling zones alternating between rotary drilling and slide drilling, and that initially rotary drilling is performed.

Method 4300 may begin at step 4310 by receiving a well plan and confirming that the drilling rig configuration is ready to drill. At step 4312, rotary drilling begins. At step 4314, the wellbore path is maintained according to the well plan during rotary drilling. As noted above, a well plan may change while the well is being drilled. For example, it may be that an unanticipated fault is encountered that places the target formation higher or lower than expected and as set forth in the original well plan. A correction to the wellbore trajectory and accompanying change in the well plan may be desired to help position the wellbore in the target formation. Similarly, it may be that drilling through a particular formation should be done at a higher or lower angle (relative to the formation) than initially planned in the well plan in order to avoid having a bit stuck in an undesired formation or to avoid missing a nearby target formation; a well plan may be updated to take account of such things. The well plan may be updated during the drilling of the wellbore for a variety of reasons, and the updated well plan may be provided, such as at step 4310. At step 4316, a decision is made whether a slide zone is approaching; e.g., a portion of the wellbore is to be drilled in a slide drilling mode according to the well plan, or a correction of the wellbore path should be made so the wellbore stays on plan. When the result of step 4316 is NO, and no slide zone is approaching, method 4300 loops back to step 4314. When the result of step 4316 is YES, and a slide zone is approaching, at step 4318, slide drilling (e.g., such as at the next slide zone in the well plan) is prepared for and the BHA is configured for slide drilling. At step 4320, slide drilling begins at the slide zone. At step 4322, the wellbore path is drilled using slide drilling. At step 4324, a decision is made whether the slide zone is complete. When the result of step 4324 is NO, and the slide zone is not complete, method 4300 loops back to step 4322. When the result of step 4324 is YES, and the slide zone is complete, at step 4326, rotary drilling is prepared for and the BHA may be configured for rotary drilling, or rotary drilling may begin.

As disclosed herein, an automated slide drilling system (ASDS) may be used with a surface steerable drilling system to control slide drilling. The ASDS may autonomously control slide drilling in a drilling rig without user input during the slide drilling. The ASDS may further support a transition from rotary drilling to slide drilling to rotary drilling without user input during the transitions. The ASDS may also support user input and user notifications for various steps to enable manual or semi-manual control of slide drilling by a driller or an operator.

It will be appreciated by those skilled in the art having the benefit of this disclosure that this system and method for surface steerable drilling provides a way to plan a drilling process and to correct the drilling process when either the process deviates from the plan, or the plan is modified. It should be understood that the drawings and detailed description herein are to be regarded in an illustrative rather than a restrictive manner, and are not intended to be limiting to the particular forms and examples disclosed. It will be understood that although specific values for different examples have been provided in the disclosure, such specific values are merely examples for descriptive purposes and are not limiting. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A drilling control system, the system comprising:

a processor; and a memory coupled to the processor, wherein the memory comprises instructions executable by the processor to:

receive, during drilling of a wellbore, well plan information for the wellbore and information from a bottom hole assembly (BHA) located in the wellbore, wherein the BHA comprises a drill bit at one end thereof, determine that the BHA is approaching a first zone during drilling of the wellbore, wherein the first zone comprises a wellbore portion in which a first slide drilling operation is to occur;

receive first zone characteristics associated with the first zone;

determine an on bottom time to orient the BHA to have a desired toolface in the first zone when the drill bit contacts rock at a distal end of the wellbore and responsive to the information from the BHA and the first zone characteristics;

determine whether the on bottom time to orient includes an additional time for the first slide drilling operation in the first zone to compensate for expected poor sliding responsive to the on bottom time to orient the BHA;

determine an off bottom time to orient the BHA to have the desired toolface prior to reaching the first zone when the drill bit is not in contact with the rock at the distal end of the wellbore and responsive to the well plan information and the information from the BHA;

compare the additional time for the first slide drilling operation in the first zone to the off bottom time to orient the BHA to have the desired toolface prior to reaching the first zone; and send one or more control signals to orient the BHA to have the desired toolface either prior to reaching the first zone or at the first zone based at least in part on the comparison.

2. The drilling control system according to claim 1, wherein the instructions are further executable by the processor to:

determine a cost associated with the on bottom time to orient the BHA to have the desired toolface in the first zone; and determine a cost associated with the off bottom time to orient the BHA to have the desired toolface prior to reaching the first zone.

3. The drilling control system according to claim 2, wherein the comparison further comprises comparing the cost associated with the on bottom time to orient the BHA to have the desired toolface in the first zone to the cost associated with the off bottom time to orient the BHA to have the desired toolface prior to reaching the first zone.

4. The drilling control system according to claim 1, wherein the additional time is a first additional time, wherein the desired toolface is a first zone desired toolface, wherein the on bottom time is a first zone on bottom time, wherein the off bottom time is a first zone off bottom time, wherein the first zone is one of a plurality of zones, wherein the one or more control signals are one or more first control signals, and wherein the instructions are further executable by the processor to:

determine the BHA is approaching a second zone of the plurality of zones during drilling of the wellbore, wherein the second zone comprises a second wellbore portion in which a second slide drilling operation is to occur;

receive second zone characteristics associated with the second zone;

determine a second on bottom time to orient the BHA to have a second zone desired toolface in the second zone when the drill bit contacts rock at the distal end of the wellbore and responsive to the information from the BHA and the second zone characteristics;

determine whether the second on bottom time to orient the BHA to have the second zone desired toolface includes a second additional time for the second slide drilling operation in the second zone to compensate for expected poor sliding responsive to the second zone on bottom time to orient the BHA;

determine a second zone off bottom time to orient the BHA to have the second zone desired toolface prior to reaching the second zone when the drill bit is not in contact with the rock at the distal end of the wellbore and responsive to the information from the BHA and the first zone characteristics;

compare the second additional time for the second slide drilling operation in the second zone to the second zone off bottom time to orient the BHA to have the second zone desired toolface prior to reaching the second zone; and send one or more second control signals to orient the BHA to the second zone desired toolface either prior to reaching the second zone or at the second zone based at least in part on the comparison.

5. The drilling control system according to claim 1, wherein the off bottom time to orient the BHA to have the desired toolface prior to reaching the first zone is determined responsive to the additional time for the first slide drilling operation in the first zone exceeding a threshold value.

6. The drilling control system according to claim 1, wherein the instructions are further executable by the processor to:

determine a target toolface range for the first slide drilling operation, wherein the one or more control signals are sent responsive to the desired toolface being outside the target toolface range.

7. The drilling control system according to claim 1, wherein the first zone is one of a plurality of zones, wherein each zone of the plurality of zones corresponds to a different wellbore portion according to the well plan information.

8. A method for drilling, the method comprising:

receiving, by a drilling control system during drilling of a wellbore, well plan information for the wellbore and information from a bottom hole assembly (BHA) located in the wellbore, wherein the BHA comprises a drill bit at one end thereof, determining, by the drilling control system, that the BHA is approaching a first zone during drilling of the wellbore, wherein the first zone comprises a wellbore portion in which a first slide drilling operation is to occur;

receiving, by the drilling control system, first zone characteristics associated with the first zone;

determining, by the drilling control system, an on bottom time to orient the BHA to have a desired toolface in the first zone when the drill bit contacts rock at a distal end of the wellbore and responsive to the information from the BHA and the first zone characteristics;

determining, by the drilling control system, whether the on bottom time to orient includes an additional time for the first slide drilling operation in the first zone to compensate for expected poor sliding responsive to the on bottom time to orient the BHA;

determining, by the drilling control system, an off bottom time to orient the BHA to have the desired toolface prior to reaching the first zone when the drill bit is not in contact with the rock at the distal end of the wellbore and responsive to the well plan information and the information from the BHA;

comparing, by the drilling control system, the additional time for the first slide drilling operation in the first zone to the off bottom time to orient the BHA to have the desired toolface prior to reaching the first zone; and sending, by the drilling control system, one or more control signals to orient the BHA to the desired toolface either prior to reaching the first zone or at the first zone based at least in part on the comparison.

9. The method according to claim 8, the method further comprising:

determining a cost associated with the on bottom time to orient the BHA to have the desired toolface in the first zone; and determining a cost associated with the off bottom time to orient the BHA to have the desired toolface prior to reaching the first zone.

10. The method according to claim 9, wherein the comparison further comprises comparing the cost associated with the on bottom time to orient the BHA to have the desired toolface in the first zone to the cost associated with the off bottom time to orient the BHA to have the desired toolface prior to reaching the first zone.

11. The method according to claim 8, wherein the additional time is a first additional time, wherein the desired toolface is a first zone desired toolface, wherein the on bottom time is a first zone on bottom time, wherein the off bottom time is a first zone off bottom time, wherein the first zone is one of a plurality of zones, wherein the one or more control signals are one or more first control signals, and wherein the method further comprises:

determining, by the drilling control system, the BHA is approaching a second zone of the plurality of zones during drilling of the wellbore, wherein the second zone comprises a second wellbore portion in which a second slide drilling operation is to occur;

receiving, by the drilling control system, second zone characteristics associated with the second zone;

determining, by the drilling control system, a second zone on bottom time to orient the BHA to have a second zone desired toolface in the second zone when the drill bit contacts rock at the distal end of the wellbore and responsive to the information from the BHA and the second zone characteristics;

determining, by the drilling control system, whether the second zone on bottom time to orient the BHA to have the second zone desired toolface includes a second additional time for the second slide drilling operation in the second zone responsive to the second zone on bottom time to orient the BHA;

determining, by the drilling control system, a second zone off bottom time to orient the BHA to have the second zone desired toolface prior to reaching the second zone when the drill bit is not in contact with the rock at the distal end of the wellbore and responsive to the information from the BHA and the first zone characteristics;

comparing, by the drilling control system, the second additional time for the second slide drilling operation in the second zone to the second zone off bottom time to orient the BHA to have the second zone desired toolface prior to reaching the second zone; and sending, by the drilling control system, one or more second control signals to orient the BHA to the second zone desired toolface either prior to reaching the second zone or at the second zone based at least in part on the comparison.

12. The method according to claim 8, wherein the off bottom time to orient the BHA to have the desired toolface prior to reaching the first zone is determined responsive to the additional time for the first slide drilling operation in the first zone exceeding a threshold value.

13. The method according to claim 8, the method further comprising:

determining, by the drilling control system, a target toolface range for the first slide drilling operation, wherein the one or more control signals are sent responsive to the desired toolface being outside the target toolface range.

14. The method according to claim 8, wherein the first zone is one of a plurality of zones, wherein each zone of the plurality of zones corresponds to a different wellbore portion according to the well plan information.

15. A non-transitory computer readable storage medium storing instructions that, upon execution by one or more processors, cause the one or more processors to perform operations comprising:

receiving, during drilling of a wellbore, well plan information for the wellbore and information from a bottom hole assembly (BHA) located in the wellbore, wherein the BHA comprises a drill bit at one end thereof;

determining that the BHA is approaching a first zone during drilling of the wellbore, wherein the first zone comprises a wellbore portion in which a first slide drilling operation is to occur;

receiving first zone characteristics associated with the first zone;

determining an on bottom time to orient the BHA to have a desired toolface in the first zone when the drill bit contacts rock at a distal end of the wellbore and responsive to the information from the BHA and the first zone characteristics;

determining whether the on bottom time includes an additional time for the first slide drilling operation in the first zone responsive to the on bottom time to orient the BHA;

determining an off bottom time to orient the BHA to have the desired toolface prior to reaching the first zone when the drill bit is not in contact with the rock at the distal end of the wellbore and responsive to the well plan information and the information from the BHA;

comparing the additional time for the first slide drilling operation in the first zone to the off bottom time to orient the BHA to have the desired toolface prior to reaching the first zone; and sending one or more control signals to orient the BHA to the desired toolface either prior to reaching the first zone or at the first zone based at least in part on the comparison.

16. The non-transitory computer readable storage medium of claim 15, storing further instructions that, upon execution by the one or more processors, cause the one or more processors to perform additional operations comprising:

determining a cost associated with the on bottom time to orient the BHA to have the desired toolface in the first zone; and determining a cost associated with the off bottom time to orient the BHA to have the desired toolface prior to reaching the first zone.

17. The non-transitory computer readable storage medium of claim 16, wherein the comparison further comprises comparing the cost associated with the on bottom time to orient the BHA to have the desired toolface in the first zone to the cost associated with the off bottom time to orient the BHA to have the desired toolface prior to reaching the first zone.

18. The non-transitory computer readable storage medium of claim 15, wherein the additional time is a first additional time, wherein the desired toolface is a first zone desired toolface, wherein the on bottom time is a first zone on bottom time, wherein the off bottom time is a first zone off bottom time, wherein the first zone is one of a plurality of zones, wherein the one or more control signals are one or more first control signals, and wherein the non-transitory computer readable storage medium further comprises instructions that, upon execution by the one or more processors, cause the one or more processors to perform additional operations comprising:

determining the BHA is approaching a second zone of the plurality of zones during drilling of the wellbore, wherein the second zone comprises a second wellbore portion in which a second slide drilling operation is to occur;

receiving second zone characteristics associated with the second zone;

determining a second zone on bottom time to orient the BHA to have a second zone desired toolface in the second zone when the drill bit contacts rock at the distal end of the wellbore and responsive to the information from the BHA and the second zone characteristics;

determining whether the second zone on bottom time to orient the BHA to have the second zone desired toolface in the second zone includes a second additional time for the second slide drilling operation in the second zone responsive to the second zone on bottom time to orient the BHA;

determining a second zone off bottom time to orient the BHA to have the second zone desired toolface prior to reaching the second zone when the drill bit is not in contact with the rock at the distal end of the wellbore and responsive to the information from the BHA and the first zone characteristics;

comparing the second additional time for the second slide drilling operation in the second zone to the second zone off bottom time to orient the BHA to have the second zone desired toolface prior to reaching the second zone; and sending one or more second control signals to orient the BHA to the second zone desired toolface either prior to reaching the second zone or at the second zone based at least in part on the comparison.

19. The non-transitory computer readable storage medium of claim 15, wherein the off bottom time to orient the BHA to have the desired toolface prior to reaching the first zone is determined responsive to the additional time for the first slide drilling operation in the first zone exceeding a threshold value.

20. The non-transitory computer readable storage medium of claim 15, storing further instructions that, upon execution by the one or more processors, cause the one or more processors to perform additional operations comprising:

determining a target toolface range for the first slide drilling operation, wherein the one or more control signals are sent responsive to the desired toolface being outside the target toolface range.

* * * * *